United States Patent
Fokoua et al.

(10) Patent No.: US 11,034,607 B2
(45) Date of Patent: Jun. 15, 2021

(54) HOLLOW-CORE PHOTONIC BANDGAP FIBERS AND METHODS OF MANUFACTURING THE SAME

(71) Applicant: University of Southampton, Southampton (GB)

(72) Inventors: Eric Rodrigue Numkam Fokoua, Southampton (GB); Francesco Poletti, Southampton (GB); David John Richardson, Southampton (GB); Yong Chen, Southampton (GB); Natalie Violet Wheeler, Southampton (GB); John Richard Hayes, Fordingbridge (GB); Marco Petrovich, Southampton (GB)

(73) Assignee: University of Southampton, Southampton (GB)

( * ) Notice: Subject to any disclaimer, the term of this patent is extended or adjusted under 35 U.S.C. 154(b) by 0 days.

(21) Appl. No.: 15/023,541

(22) PCT Filed: Sep. 19, 2014

(86) PCT No.: PCT/EP2014/070048
§ 371 (c)(1),
(2) Date: Mar. 21, 2016

(87) PCT Pub. No.: WO2015/040189
PCT Pub. Date: Mar. 26, 2015

(65) Prior Publication Data
US 2016/0236964 A1  Aug. 18, 2016

(30) Foreign Application Priority Data

Sep. 20, 2013 (GB) ...................................... 1316793
Sep. 20, 2013 (GB) ...................................... 1316795

(51) Int. Cl.
*C03B 37/012* (2006.01)
*C03B 37/027* (2006.01)
*G02B 6/02* (2006.01)

(52) U.S. Cl.
CPC .... *C03B 37/0122* (2013.01); *C03B 37/02781* (2013.01); *G02B 6/02328* (2013.01);
(Continued)

(58) Field of Classification Search
CPC ........... G02B 6/02328; G02B 6/02347; C03B 37/0122; C03B 37/0253; C03B 37/02781;
(Continued)

(56) References Cited

U.S. PATENT DOCUMENTS 3,990,874 A * 11/1976 Schulman ............. C03B 37/028
65/393
4,551,162 A * 11/1985 Hicks, Jr. ................ C03B 23/07
385/126
(Continued)

FOREIGN PATENT DOCUMENTS

EP 1845397 A 10/2007
EP 1947492 A 7/2008
(Continued)

OTHER PUBLICATIONS

R Amezcua-Correa et al.: "Control of surface modes in low loss hollow-core photonic bandgap fibers", Opt. Express, Jan. 15, 2008, pp. 1142-1149 as Viewed at https://www.osapublishing.org/DirectPDFAccess/A6FBAF4C-DE24-9F99-7AD97BDBEBBE71F7_176053/oe-17-3-1268.pdf?da=1&id=176053&seq=0&mobile=no on Mar. 7, 2017.*
(Continued)

*Primary Examiner* — Jason L Lazorcik
(74) *Attorney, Agent, or Firm* — Renner, Otto, Boisselle & Sklar, LLP

(57) ABSTRACT

A method of fabricating a hollow-core photonic-bandgap fiber, comprising the steps of: providing a stack of capillar-
(Continued)

ies, wherein the stack has a hollow core and the capillaries at a boundary of the core comprise a plurality of first, corner core capillaries and a plurality of second, intermediate core capillaries; applying a pressure differential between the corner core capillaries and the intermediate core capillaries, whereby a size of the corner core capillaries can be controlled in relation to the intermediate core capillaries; and reducing the stack to a fiber, wherein the fiber has a hollow core and a cladding which surrounds the core at a core boundary and comprises a lattice or network of struts and interstitial nodes which together define an array of cavities.

7 Claims, 43 Drawing Sheets

(52) U.S. Cl.
CPC ..... *G02B 6/02347* (2013.01); *G02B 6/02357* (2013.01); *G02B 6/02371* (2013.01); *C03B 2203/04* (2013.01); *C03B 2203/16* (2013.01); *C03B 2203/42* (2013.01)

(58) Field of Classification Search
CPC .......... C03B 37/01208; C03B 2203/16; C03B 2203/42; C03B 2205/10; C03B 2205/12
See application file for complete search history.

(56) References Cited

U.S. PATENT DOCUMENTS

| | | | |
|---|---|---|---|
| 5,907,652 A | 5/1999 | DiGiovanni et al. | |
| 6,444,133 B1 | 9/2002 | Fajardo | |
| 6,795,635 B1* | 9/2004 | Fajardo | C03B 37/0122 385/100 |
| 6,888,992 B2* | 5/2005 | Russell | C03B 37/02709 385/125 |
| 7,280,730 B2* | 10/2007 | Dong | G02B 6/02009 385/123 |
| 9,810,837 B2* | 11/2017 | Benabid | B29D 11/00663 |
| 10,393,956 B2* | 8/2019 | Russell | C03B 37/0122 |
| 2002/0118938 A1* | 8/2002 | Hasegawa | G02B 6/29376 385/125 |
| 2003/0230118 A1* | 12/2003 | Dawes | G02B 6/02357 65/379 |
| 2003/0231846 A1* | 12/2003 | Fajardo | G02B 6/02357 385/125 |
| 2004/0022508 A1 | 2/2004 | Belardi et al. | |
| 2005/0074215 A1* | 4/2005 | Sanghera | C03B 37/02781 385/125 |
| 2005/0185908 A1* | 8/2005 | Roberts | C03B 37/02781 385/125 |
| 2005/0226578 A1* | 10/2005 | Mangan | G02B 6/02328 385/125 |
| 2005/0276556 A1 | 12/2005 | Williams et al. | |
| 2006/0010921 A1 | 1/2006 | Mori | |
| 2007/0041083 A1 | 2/2007 | Di Teodoro | |
| 2007/0201801 A1* | 8/2007 | Provost | G02B 6/02357 385/125 |
| 2007/0204656 A1* | 9/2007 | Gallagher | C03B 37/02781 65/379 |
| 2008/0094636 A1 | 4/2008 | Jin et al. | |
| 2008/0310806 A1 | 12/2008 | Mukasa | |
| 2009/0080845 A1 | 3/2009 | Imamura | |
| 2009/0168149 A1* | 7/2009 | Petersson | G02B 6/02323 359/339 |
| 2009/0245718 A1 | 10/2009 | Li et al. | |
| 2010/0202743 A1* | 8/2010 | Bayya | C03C 13/048 385/125 |
| 2010/0247046 A1* | 9/2010 | Dong | B29D 11/00663 385/123 |
| 2010/0303429 A1* | 12/2010 | Gibson | G02B 6/02314 385/125 |
| 2011/0085769 A1* | 4/2011 | Dong | B29D 11/00663 385/123 |
| 2011/0121474 A1 | 5/2011 | Russell | |
| 2011/0267612 A1* | 11/2011 | Roberts | G02B 6/021 356/301 |
| 2013/0016022 A1* | 1/2013 | Heiks | G02B 6/4415 343/791 |
| 2014/0003778 A1* | 1/2014 | Lyngsoe | G02B 6/02 385/127 |
| 2015/0198764 A1* | 7/2015 | Digiovanni | C03B 37/01217 385/125 |
| 2018/0093912 A1* | 4/2018 | Gibson | B29C 48/11 |
| 2018/0339931 A1* | 11/2018 | Simonsen | G02B 6/032 |
| 2019/0011634 A1* | 1/2019 | Lyngsoe | G02B 6/02328 |
| 2020/0079680 A1* | 3/2020 | Corrado | G02B 6/02328 |
| 2020/0103587 A1* | 4/2020 | Lyngsoe | G02B 6/02328 |

FOREIGN PATENT DOCUMENTS

| | | |
|---|---|---|
| GB | 2408812 A | 6/2005 |
| JP | 2002/029769 | 1/2002 |
| JP | 2005084202 A | 3/2005 |
| JP | 2006083037 A | 3/2006 |
| JP | 2011170173 A | 9/2011 |
| JP | 2013-127503 A | 6/2013 |
| JP | 5242582 B2 | 7/2013 |
| WO | 2000049436 A1 | 8/2000 |
| WO | 2001088578 A2 | 11/2001 |
| WO | 2004/057391 | 7/2004 |
| WO | 2004/057392 | 7/2004 |
| WO | 2004/057393 | 7/2004 |
| WO | 2004/057394 | 7/2004 |
| WO | 2005/012197 A2 | 2/2005 |
| WO | 2011142849 A2 | 11/2011 |
| WO | 2014031176 A1 | 2/2014 |

OTHER PUBLICATIONS

Kiarash Zamani Aghaie et al.; "Experimental Assessment of the Accuracy of an Advanced Photonic-Bandgap-Fiber Model", Journal of Lightwave Technology, vol. 31, No. 7, Apr. 1, 2013, pp. 1015-1022.
R. Amezcua-Correa et al.; "Optimizing the usable bandwidth and loss through core design in realistic hollow-core photonic bandgap fibers", Optics Express, vol. 14, No. 17, Aug. 21, 2006, pp. 7974-7985.
R. Amezcua-Correa et al.; "Design of 7 and 19 cells core air-guiding photonic crystal fibers for low-loss, wide bandwidth and dispersion controlled operation", Optics Express, vol. 15, No. 26, Dec. 24, 2007, pp. 17577-17586.
R. Amezcua-Correa et al.; "Control of surface modes in low loss hollow-core photonic bandgap fibers", Optics Express, vol. 16, No. 2, Jan. 21, 2008, pp. 1142-1149.
R. Amezcua-Correa et al.; "Control of Surface Modes in Low Loss Hollow-Core Photonic Bandgap Fibers", IEEE Conference on Lasers and Electro-Optics, 1-2 (2008).
M.H. Frosz et al.; "Five-ring hollow-core photonic crystal fiber with 1.8 dB/km loss", Optics Letters, vol. 28, No. 13, Jul. 1, 2013, pp. 2215-2217.
Y. Jung et al.; "First Demonstration of a Broadband 37-cell Hollow Core Photonic Bandgap Fiber and Its Application to High Capacity Mode Division Multiplexing", Proceedings of the Optical Fiber Communications conference (2013), paper PDP5A.3.
Ming-Jun Li et al.; "Modeling Effects of Structural Distortions on Air-Core Photonic Bandgap Fibers", Journal of Lightwave Technology, vol. 25, No. 9, Sep. 2007, pp. 2463-2468.
B.J. Mangan et al.; "Low loss (1.7 dB/km) hollow core photonic bandgap fiber", Proceedings of Optical Fiber Communication Conference (2004), paper PDP24.
Tadashi Murao et al.; "Structural Optimization of Air-Guiding Photonic Bandgap Fibers for Realizing Ultimate Low Loss Waveguides", Journal of Lightwave Technology, vol. 26, No. 12, Jun. 15, 2008.

(56) References Cited

OTHER PUBLICATIONS

Eric Numkam Fokoua et al.; "Analysis of light scattering from surface roughness in hollow-core photonic bandgap fibers", Optics Express, vol. 20, No. 19, Sep. 10, 2012, pp. 20980-20991.

F. Poletti et al.; "Advances and limitations in the modeling of fabricated photonic bandgap fibers", Optical Fiber Communication Conference and Exposition and The National Fiber Optic Engineers Conference, Technical Digest (CD) (Optical Society of America, 2006), paper OFC2.

Francesco Poletti; "Hollow core fiber with an octave spanning bandgap", Optics Letters, vol. 35, No. 17, Sep. 1, 2010, pp. 2837-2839.

Francesco Poletti et al.; "Understanding the Physical Origin of Surface Modes and Practical Rules for their Suppression", accepted for oral presentation at ECOC 2013.

F. Poletti et al.; "Towards high-capacity fibre-optic communications at the speed of light in vacuum", Nature Photonics Letters online, Mar. 24, 2013, pp. 279-284.

P.J. Roberts et al.; "Ultimate low loss of hollow-core photonic crystal fibres", Optics Express, vol. 13, No. 1, Jan. 10, 2005, pp. 236-244.

P.J. Roberts et al.; "Realizing low loss air core photonic crystal fibers by exploiting an antiresonant core surround", Optics Express, vol. 13, No. 20, Oct. 3, 2005, pp. 8277-8285.

Kunimasa Saitoh et al.; "Leakage loss and group velocity dispersion in air-core photonic bandgap fibers", Optics Express, vol. 11, No. 23, Nov. 17, 2003, pp. 3100-3109.

Charlene M. Smith et al.; "Low-loss hollow-core silica/air photonic bandgap fibre", Nature, vol. 424, Aug. 7, 2003, pp. 657-659.

Rosalind M. Wynne; "A Fabrication Process for Microstructured Optical Fibers", Journal of Lightwave Technology, vol. 24, No. 11, Nov. 2006, pp. 4304-4313.

Noble, Robert J. *Hollow-core photonic band gap fibers for particle acceleration.* Physical Review Special Topics Accelerators and Beams. 14, 121303 (2011).

Shephard, Jonathan D., Couny, Francois, Russell Phillip St. J., Jones, Julian D. C., Knight, Jonathan C., Hand, Duncan P. *Improved hollow-core photonic crystal fiber design for delivery of nanosecond pulses in laser micromachining applications.* Applied Optics. vol. 44 No. 21, Jul. 20, 2015.

* cited by examiner (a)

(b)

(c)

(d)

(e)

(a)

(b)

(c)

(d)

(e)

HOLLOW-CORE PHOTONIC BANDGAP FIBERS AND METHODS OF MANUFACTURING THE SAME

This application is a national phase of International Application No. PCT/EP2014/070048 filed Sep. 19, 2014 and published in the English language.

The present invention relates to hollow-core photonic bandgap fibers (HC-PBGFs), for example, for application in data transmission and high-power laser pulse delivery, and methods of manufacturing the same.

As illustrated in FIG. 1, HC-PBGFs comprise an elongate fiber body having a hollow core 3 and a cladding 5 which surrounds the core 3 at a boundary 7 and comprises a silica lattice of relatively-thin struts 9 and relatively-large interstitial nodes 11, which together define an array of air holes of cavities 15 which are arranged in packed relation around the core 3, with the core 3 being formed by omitting a number of capillaries at the center of the structure. FIG. 1 illustrates a prior art HC-PBGF design which is considered to be most optimized or ideal, in preserving a perfect cladding periodicity of nodes 11' at the boundary 7 of the core 3 and the cladding 5.

It is the optical resonance properties of these nodes that primarily determine the photonic bandgap or range of optical frequencies over which light can be effectively confined and guided within the core.

It is desirable in many applications to achieve a wide photonic bandgap over which light can be guided with low loss. The termination of the microstructured cladding around the core forms a continuous boundary which consists of nodes interconnected by struts. As loss is predominantly dictated by the overlap of the guided-mode field with this boundary through scattering at the air-glass interfaces, optimizing its configuration is important in loss reduction.

Owing to recent progress in the development of HC-PBGFs, these fibers are now emerging as a credible alternative to the all-solid optical fibers as used in telecom applications [1, 2]. Indeed, the highly-desirable features of low-latency, ultralow nonlinearity and potentially lower transmission loss make these fibers suitable for next generation data-carrying fibers. However, the attenuation levels which are fundamentally limited by scattering from surface roughness have yet to be reduced to theoretically predicted levels [3-4].

Numerous efforts in loss reduction have aimed at optimizing the fiber design to reduce the overlap of the guided-mode field with the scattering surfaces.

Notably, the introduction of an anti-resonant core surround has led to the lowest reported loss value of 1.7 dB/km [5]. However, the resulting "thick" core supports a multitude of surface modes within the photonic bandgap, which restrict the usable bandwidth.

It has also been demonstrated that, for fibers with a seven cell (7c) core defect, making the core wall half as thin as the struts in the cladding eliminates surface modes, thereby increasing the operational bandwidth [8-10].

In an attempt to expand the usable bandwidth and further reduce loss in fibers with larger core defects, a number of recently-reported HC-PBGFs have been produced without a core tube. This fabrication procedure has, however, resulted in more prominent structural distortions, notably, more enlarged core defects, including oversized air holes on the six "corners" around the core and compressed claddings with different periodicity along the main symmetry axes [1, 2, 11].

Significant theoretical efforts have already been devoted to understanding and predicting the attenuation that could be obtained from a given HC-PBGF design. This work has, however, either neglected the scattering loss contribution, and hence considerably underestimated the total loss, or considered only "ideal" structures with perfectly periodic lattices, which are visibly different from fabricated lattices [12].

Another strand of activity has focused on modeling fiber geometries obtained from scanning electron micrographs of fabricated fibers; however, instrument resolution imposes a constraint on the accuracy of such studies [13, 14]. For a full fiber cross-section, the width of a single glass strut is only a few pixels wide, making it difficult for edge-detection routines to determine accurately the boundaries of the cladding air holes, and even more so to estimate thickness and impact of the metallic coating necessary to acquire the images. Good quantitative agreement between measured and simulated modal properties, such as dispersion and mode-field diameter of current commercial HC-PBGFs, has been obtained using this approach, although any reasonable comparison of loss values is foregone by the omission of part of the cladding [15].

Contrary to the common understanding in the art, the present inventors have recognized that an exact periodicity in the cladding is not a strict requirement for air-guidance. From this recognition, the present inventors have devised improved fiber designs which are less susceptible to surface-mode induced bandwidth degradation, exhibit a considerable reduction in loss and advantageously allow the core wall thickness to be increased.

In one aspect the present invention provides a method of fabricating a hollow-core photonic-bandgap fiber, comprising the steps of: providing a stack of capillaries, wherein the stack has a hollow core and the capillaries at a boundary of the core comprise a plurality of first, corner core capillaries and a plurality of second, intermediate core capillaries; applying a pressure differential between the corner core capillaries and the intermediate core capillaries, whereby a size of the corner core capillaries can be controlled in relation to the intermediate core capillaries; and reducing the stack to a fiber, wherein the fiber has a hollow core and a cladding which surrounds the core at a core boundary and comprises a lattice or network of struts and interstitial nodes which together define an array of cavities.

In another aspect the present invention provides a method of fabricating a hollow-core photonic-bandgap fiber, comprising the steps of: providing a stack of capillaries, wherein the stack has a hollow core and the capillaries at a boundary of the core comprise a plurality of first, corner core capillaries and a plurality of second, intermediate core capillaries, wherein the corner core capillaries have a non-circular section, and optionally an elongated section; and reducing the stack to a fiber, wherein the fiber has a hollow core and a cladding which surrounds the core at a core boundary and comprises a lattice or network of struts and interstitial nodes which together define an array of cavities.

In a further aspect the present invention provides a method of fabricating a hollow-core photonic-bandgap fiber, comprising the steps of: providing a stack of capillaries, wherein the stack has a hollow core and the capillaries at a boundary of the core comprise a plurality of first, corner core capillaries and a plurality of second, intermediate core capillaries, wherein the corner core capillaries have a non-circular section and a different section to the intermediate core capillaries, optionally in size and/or shape, and the corner core capillaries optionally have an elongated section;

and reducing the stack to a fiber, wherein the fiber has a hollow core and a cladding which surrounds the core at a core boundary and comprises a lattice or network of struts and interstitial nodes which together define an array of cavities.

In another further aspect the present invention provides a method of fabricating a hollow-core photonic-bandgap fiber, comprising the steps of: providing a stack of capillaries, wherein the stack has a hollow core and the capillaries at a boundary of the core comprise a plurality of first, corner core capillaries and a plurality of second, intermediate core capillaries, wherein the corner core capillaries include an additional mass segment at a surface thereof which is arranged to face the core between adjacent intermediate core capillaries; and reducing the stack to a fiber, wherein the fiber has a hollow core and a cladding which surrounds the core at a core boundary and comprises a lattice or network of struts and interstitial nodes which together define an array of cavities.

In a yet further aspect the present invention provides a method of fabricating a hollow-core photonic-bandgap fiber, comprising the steps of: providing a stack of capillaries, wherein the stack has a hollow core and the capillaries at a boundary of the core comprise a plurality of first, corner core capillaries and a plurality of second, intermediate core capillaries, wherein the intermediate core capillaries include a reduced mass segment at a surface thereof which is arranged to face the core; and reducing the stack to a fiber, wherein the fiber has a hollow core and a cladding which surrounds the core at a core boundary and comprises a lattice or network of struts and interstitial nodes which together define an array of cavities.

In a still further aspect the present invention provides a method of fabricating a hollow-core photonic-bandgap fiber, comprising the steps of: providing a stack of capillaries about a core tube, wherein the stack has a hollow core as defined by the core tube and the capillaries at a boundary of the core tube comprise a plurality of first, corner core capillaries and a plurality of second, intermediate core capillaries, wherein the core tube includes additional mass segments at a surface thereof in correspondence to the positions of the corner core capillaries; and reducing the stack to a fiber, wherein the fiber has a hollow core and a cladding which surrounds the core at a core boundary and comprises a lattice or network of struts and interstitial nodes which together define an array of cavities.

In a still yet further aspect the present invention provides a method of fabricating a hollow-core photonic-bandgap fiber, comprising the steps of: providing a stack of capillaries about a core tube, wherein the stack has a hollow core as defined by the core tube and the capillaries at a boundary of the core tube comprise a plurality of first, corner core capillaries and a plurality of second, intermediate core capillaries, wherein the core tube is hexagonal in section which provides six planar side members, adjacent ones of which meet at corner junctions, which correspond in position to the corner core capillaries; and reducing the stack to a fiber, wherein the fiber has a hollow core and a cladding which surrounds the core at a core boundary and comprises a lattice or network of struts and interstitial nodes which together define an array of cavities.

In still another aspect the present invention provides a method of fabricating a hollow-core photonic-bandgap fiber, comprising the steps of: providing a stack of capillaries, wherein the stack has a hollow core and the capillaries at a boundary of the core comprise a plurality of first, corner core capillaries and a plurality of second, intermediate core capillaries, wherein the corner core capillaries have a substantially hexagonal outer section, and the intermediate core capillaries have a substantially frusto-hexagonal outer section; and reducing the stack to a fiber, wherein the fiber has a hollow core and a cladding which surrounds the core at a core boundary and comprises a lattice or network of struts and interstitial nodes which together define an array of cavities.

In yet another aspect the present invention provides a method of fabricating a hollow-core photonic-bandgap fiber, comprising the steps of: providing a stack of capillaries, wherein the stack has a hollow core and the capillaries at a boundary of core are located on a circle of predetermined diameter, about which outer, cladding capillaries are packed; and reducing the stack to a fiber, wherein the fiber has a hollow core and a cladding which surrounds the core at a core boundary and comprises a lattice or network of struts and interstitial nodes which together define an array of cavities.

In still another aspect the present invention provides a method of fabricating a hollow-core photonic-bandgap fiber, comprising the steps of: providing a stack of capillaries, wherein the stack has a hollow core and the capillaries at a boundary of the core comprise a plurality of first, corner core capillaries and a plurality of second, intermediate core capillaries, wherein the corner core capillaries are formed of a material having a higher viscosity at a fiber drawing temperature than a material of the intermediate core capillaries, whereby a size of the corner core capillaries can be regulated in relation to the intermediate core capillaries; and reducing the stack to a fiber, wherein the fiber has a hollow core and a cladding which surrounds the core at a core boundary and comprises a lattice or network of struts and interstitial nodes which together define an array of cavities.

In yet another aspect the present invention provides a method of fabricating a hollow-core photonic-bandgap fiber, comprising the steps of: providing a stack of capillaries, wherein the stack has a hollow core and the capillaries at a boundary of the core comprise a plurality of first, corner core capillaries and a plurality of second, intermediate core capillaries, wherein additional mass segments are located at unfilled junctions between the core capillaries, whereby the mass of the additional mass segments supplements the mass of the corner core capillaries in relation to the intermediate core capillaries, and also supplements the mass at the core boundary; and reducing the stack to a fiber, wherein the fiber has a hollow core and a cladding which surrounds the core at a core boundary and comprises a lattice or network of struts and interstitial nodes which together define an array of cavities.

In a still further aspect the present invention provides a method of fabricating a hollow-core photonic-bandgap fiber, comprising the steps of: providing a core former; providing a stack of capillaries to the core former, wherein the stack has a hollow core as defined by the core former, and the capillaries at a boundary of the core comprise a plurality of first, corner core capillaries and a plurality of second, intermediate core capillaries, wherein the core capillaries, and optionally outer, cladding capillaries, are sealed such that each has an enclosed volume; providing the stack of capillaries in a mold; heating the stack of capillaries, whereby the core capillaries expand and fill voids at the surface of the core former; and reducing the stack to a fiber, wherein the fiber has a hollow core and a cladding which surrounds the core at a core boundary and comprises a lattice or network of struts and interstitial nodes which together define an array of cavities.

In a yet still further aspect the present invention provides a pre-form stack for use in the fabrication of a hollow-core photonic-bandgap fiber in accordance with any of the above-described methods.

In one embodiment a ratio between a difference in a length of a longest and shortest pitch spacing of the nodes at the core boundary to an average pitch spacing at the core boundary is less than about 0.25, optionally less than about 0.2, optionally less than about 0.1.

In one embodiment a ratio between a difference in a length of a longest and shortest pitch spacing of the nodes at the core boundary to an average pitch spacing at the core boundary is less than about 0.05.

In one embodiment a ratio between a difference in a length of a longest and shortest pitch spacing of the nodes at the core boundary to an average pitch spacing at the core boundary is less than about 0.02.

In one embodiment a ratio between a difference in a length of a longest and shortest pitch spacing of the nodes at the core boundary to an average pitch spacing at the core boundary is less than about 0.01.

In one embodiment the core is gas filled, wherein the gas is one of air, argon, xeon, helium or hydrogen.

In another embodiment the core is a vacuum.

In one embodiment the core is substantially circular in section.

In one embodiment the network is formed of glass.

In one embodiment the cavities comprise gas-filled holes, wherein the gas is one of air, argon, xeon, helium or hydrogen.

In another embodiment the cavities comprise a vacuum.

In one embodiment the cavities are arranged in triangular-packed relation, square-packed relation or hexagonal-packed relation.

In one embodiment a ratio of the average cross-sectional area of the nodes at the core boundary to the average cross-sectional area of the nodes within a body of the cladding is from about 0.8 to about 1.2.

In one embodiment a ratio of the average cross-sectional area of the nodes at the core boundary to the average cross-sectional area of the nodes within a body of the cladding is from about 0.9 to about 1.1.

In one embodiment a ratio of the average cross-sectional area of the nodes at the core boundary to the average cross-sectional area of the nodes within a body of the cladding is from about 0.95 to about 1.05.

In one embodiment the nodes at the core boundary and the nodes within a body of the cladding are substantially equi-sized.

In one embodiment a ratio of the average cross-sectional area of the nodes at the core boundary to the average cross-sectional area of the nodes within a body of the cladding is from about 1.4 to about 2.0.

In one embodiment the struts at the core boundary have substantially equal thickness.

In one embodiment a ratio of a thickness of the struts at the core boundary to a thickness of the struts within a body of the cladding is from about 0.4 to about 3.5, optionally from about 0.4 to about 1.0.

In one embodiment a ratio of a thickness of the struts at the core boundary to a thickness of the struts within a body of the cladding is from about 0.6 to about 1.0.

In one embodiment a ratio of a thickness at the core boundary to a thickness of the struts within a body of the cladding is from about 0.7 to about 1.0.

In one embodiment a ratio of a thickness at the core boundary to a thickness of the struts within a body of the cladding is from about 0.8 to about 1.0.

In one embodiment an average spacing of the cavities has a variance outside of the range of from 0.98 to 1.02.

In one embodiment the fiber has a three cell ($3c$) core defect, a seven cell ($7c$) core defect, a nineteen cell ($19c$) core defect, a thirty-seven cell ($37c$) core defect or a sixty-one cell ($61c$) core defect.

In one embodiment the effective diameter of the core is greater than about 1.05 $n\Lambda$, where n is the number of cells removed to form the core along the diagonal and $\Lambda$ is the average spacing of the cavities.

In one embodiment the effective diameter of the core is from about 1.05 $n\Lambda$ to about 1.35 $n\Lambda$, optionally from about 1.1 $n\Lambda$ to about 1.35 $n\Lambda$, optionally from about 1.15 $n\Lambda$ to about 1.30 $n\Lambda$.

In one embodiment the effective diameter of the core is from about 1.05 $n\Lambda$ to about 1.25 $n\Lambda$.

In one embodiment a ratio of a thickness of the struts to an average spacing of the nodes is less than about 0.05.

In one embodiment a ratio of a thickness of the struts to an average spacing of the nodes is less than about 0.02.

In one embodiment a ratio of a cross-sectional area of the struts to a cross-sectional area of the nodes is from about 1 to about 30.

In one embodiment a ratio of a cross-sectional area of the struts to a cross-sectional area of the nodes is from about 1 to about 20, optionally from about 2 to about 20, optionally from about 4 to about 13.

In one embodiment a ratio of a cross-sectional area of the struts to a cross-sectional area of the nodes is from about 4 to about 10, optionally from about 6 to about 10.

In one embodiment a ratio of the effective diameter of the core to the effective diameter of the cladding is at least about 0.33 when five rings of cavities surround the core.

In one embodiment a ratio of the effective diameter of the core to the effective diameter of the cladding is at least about 0.3 when six rings of cavities surround the core.

In one embodiment a ratio of the effective diameter of the core to the effective diameter of the cladding is at least about 0.35 when six rings of cavities surround the core.

In one embodiment a ratio of the effective diameter of the core to the effective diameter of the cladding is at least about 0.27 when seven rings of cavities surround the core.

By providing that the nodes at the core boundary are substantially equi-spaced, the modal overlap with the scattering surfaces, and hence fiber loss, is minimized.

In addition, providing the core boundary with nearly equidistant nodes is effective in eliminating surface modes, without causing significant bandwidth or loss penalty, even in fibers with a thickened core wall or which incorporate a core tube, which can present advantages in fabrication.

With the present invention, it is predicted that for a fiber with a nineteen cell ($19c$) core defect, in an optimum configuration, losses can be reduced to less than 0.5 dB/km at a wavelength of 1.55 μm over a 450 nm bandwidth, with it being possible to reduce loss further, for example, by a factor greater than 2 by operating at a wavelength of 2 μm or by more than 2.7 times using a fiber with a thirty-seven cell ($37c$) or greater core defect.

Furthermore, for laser delivery applications, dispersion engineering is easily achieved through control of the size of the core nodes.

Preferred embodiments of the present invention will now be described hereinbelow by way of example only with reference to the accompanying drawings, in which.

Figure 3:
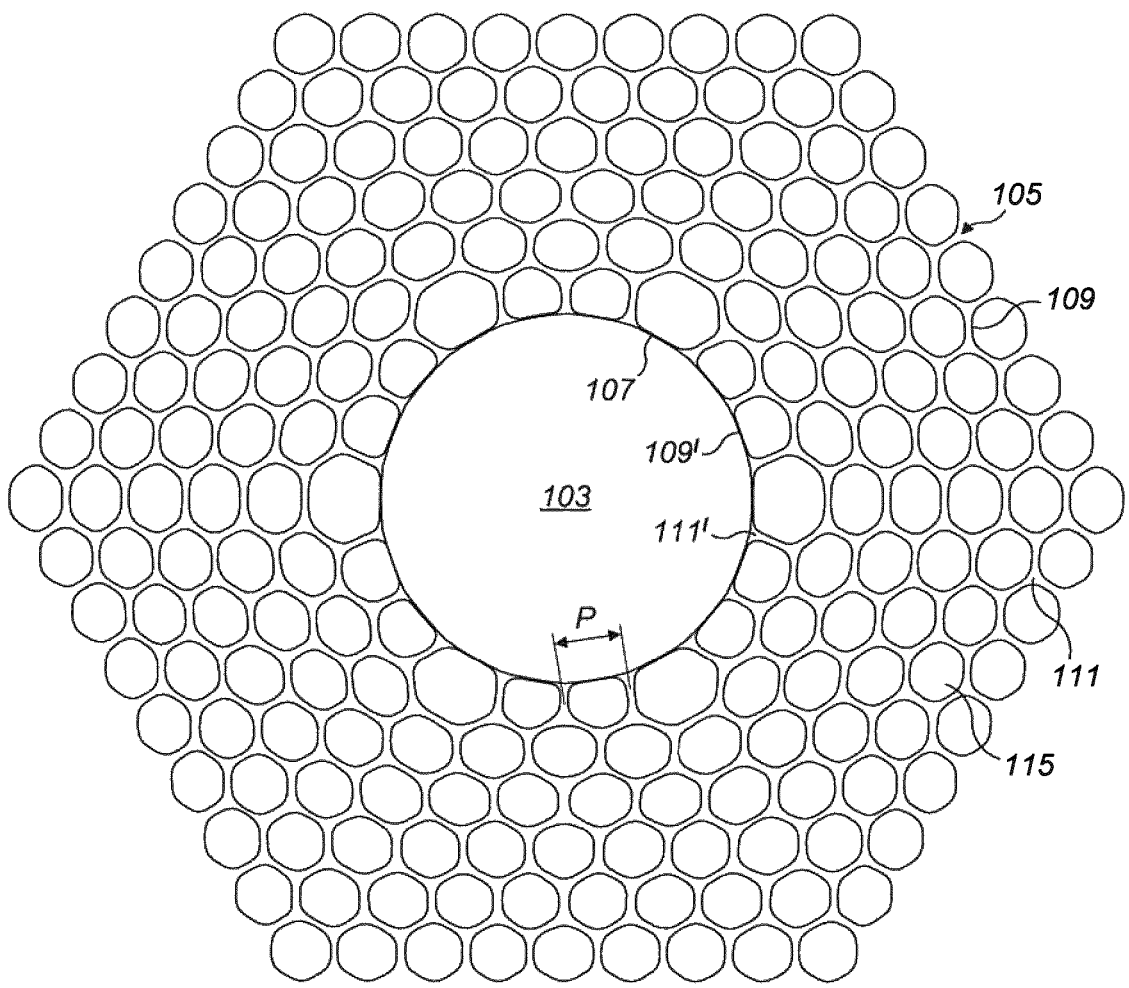
FIG. 3 illustrates a lateral cross-section through a HC-PBGF in accordance with a second embodiment of the present invention.
Figure 10A:
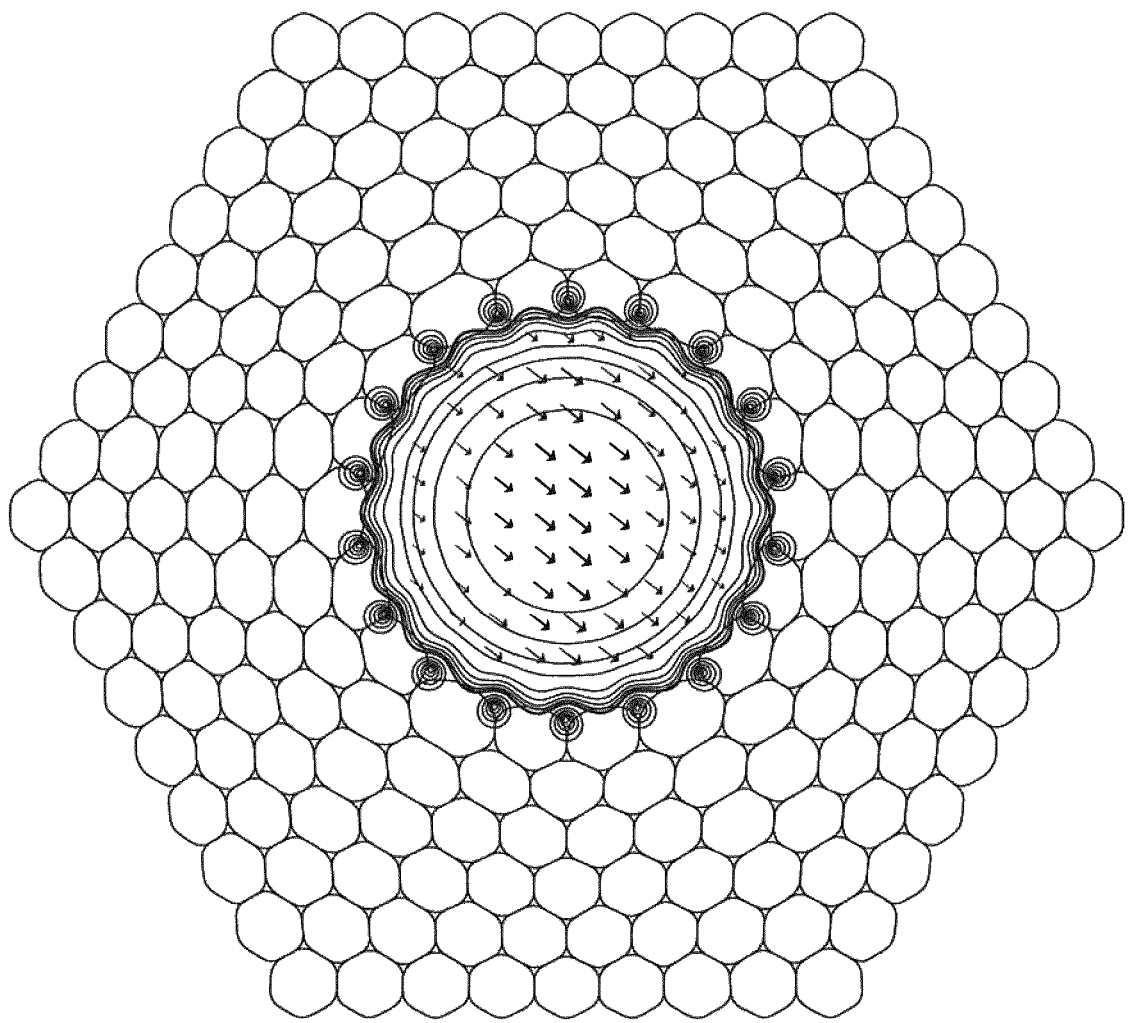
Figure 10B:
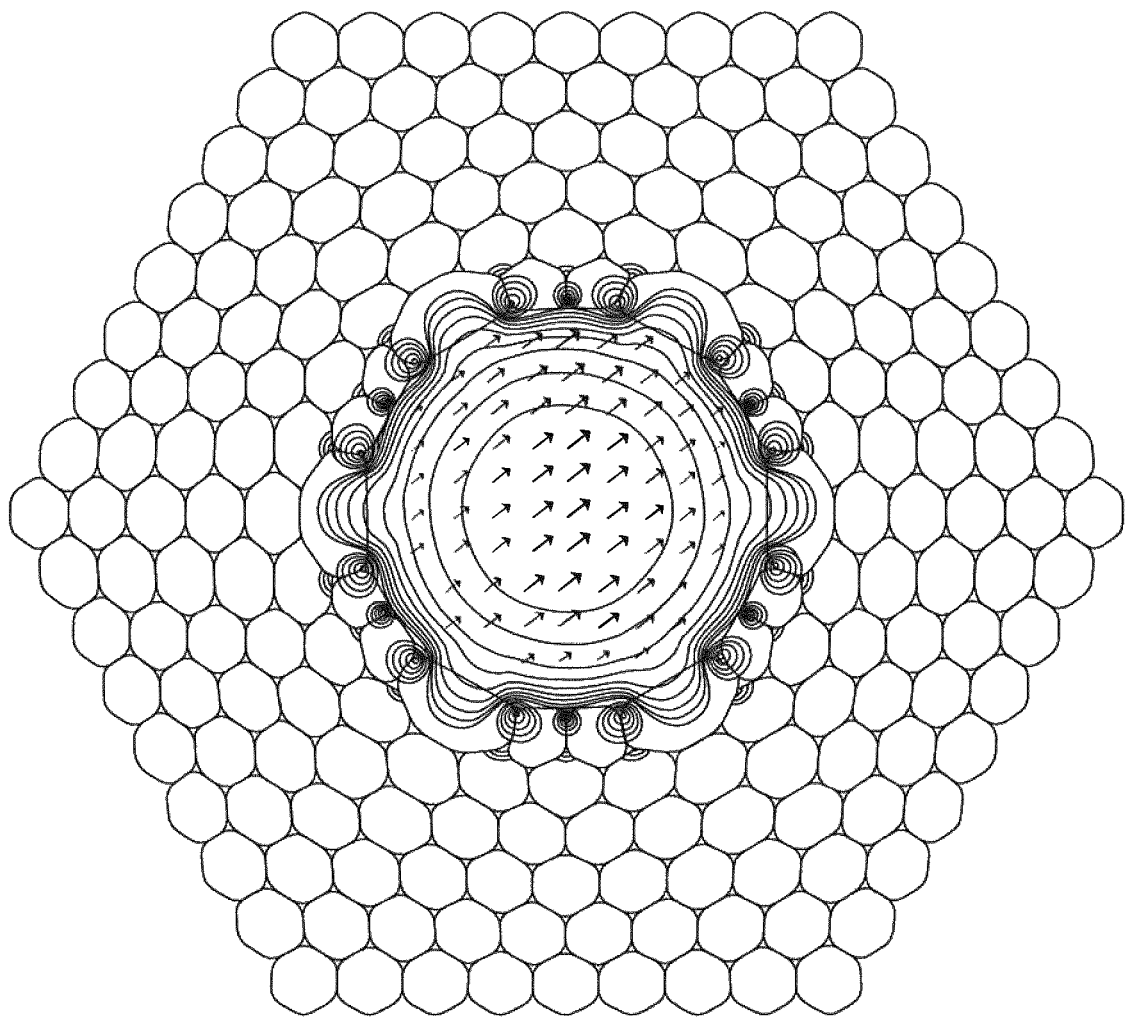
Figure 11:
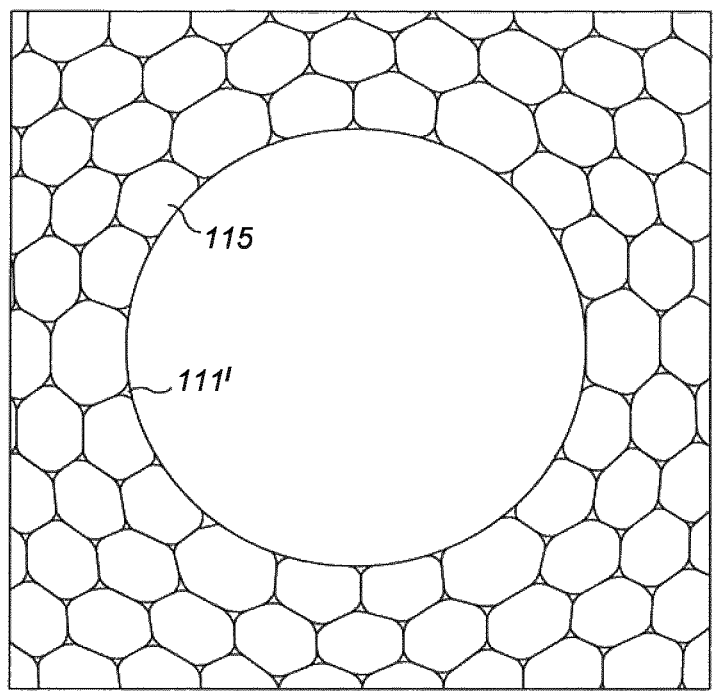
Figure 11:
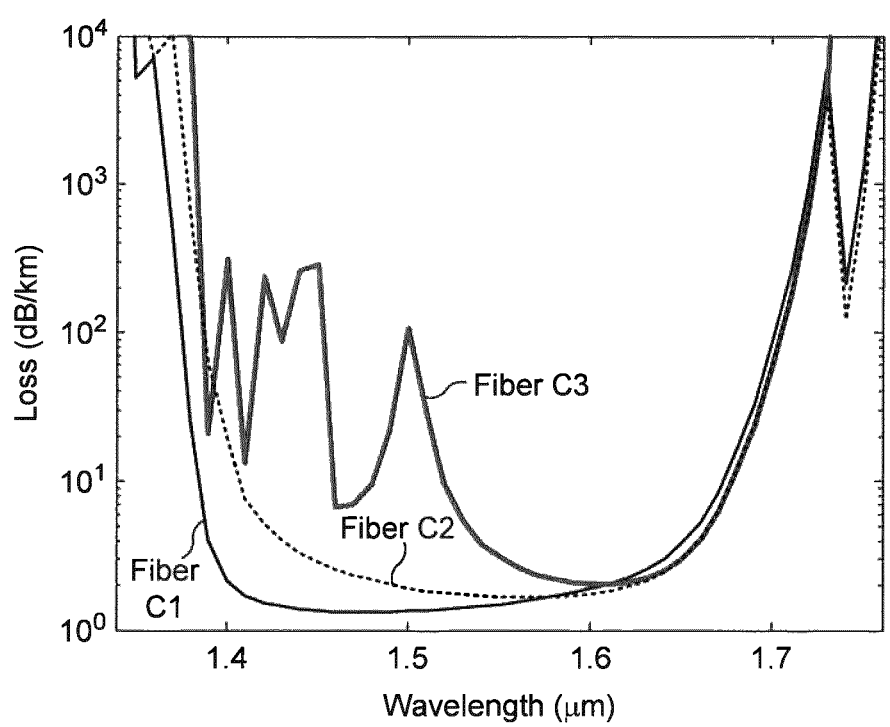
Figure 11:
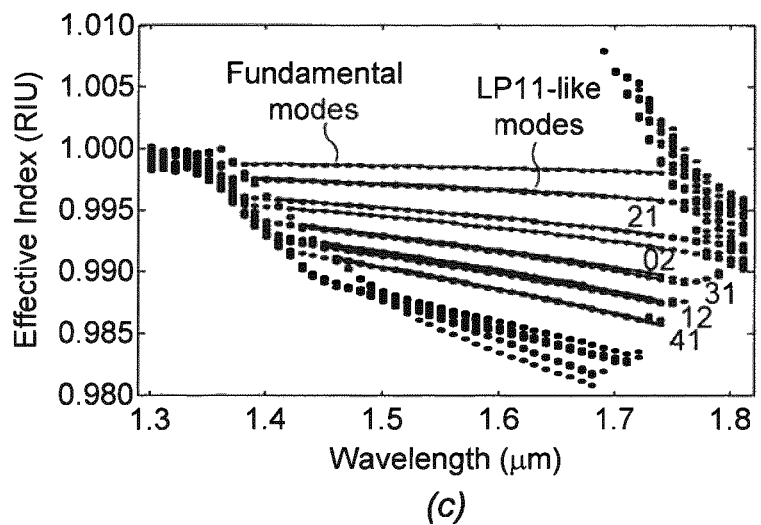
Figure 11:
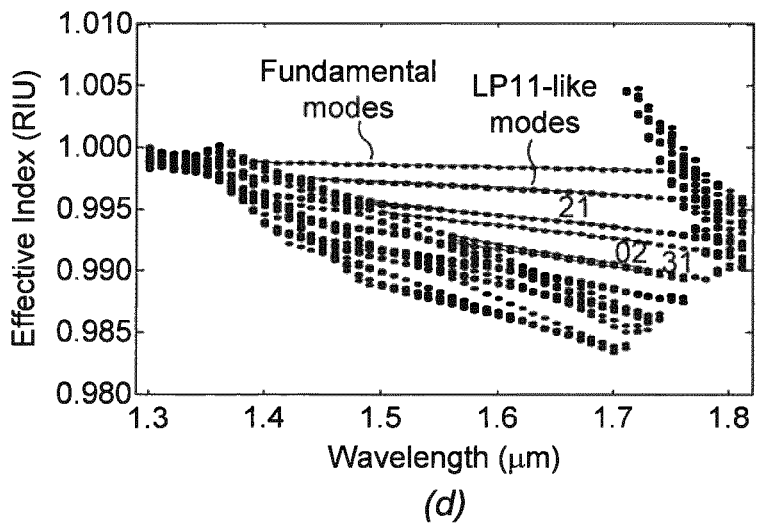
Figure 11:
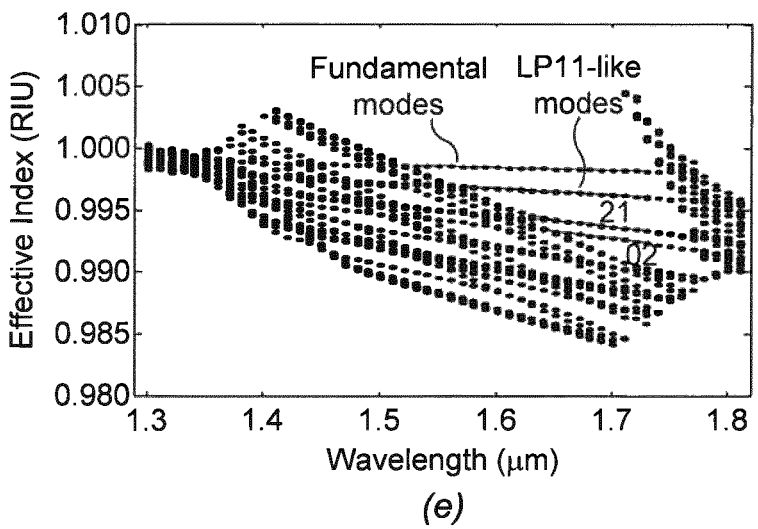
Figure 12:
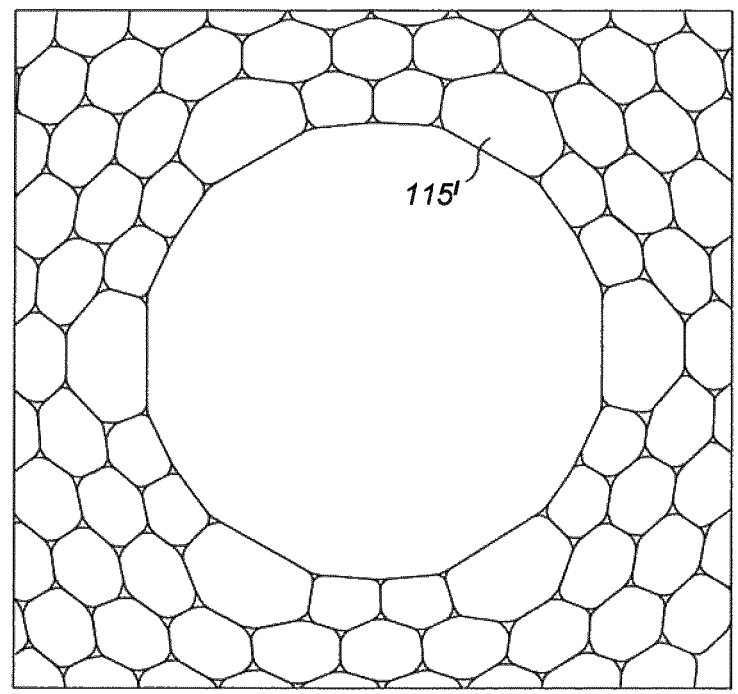
Figure 12:
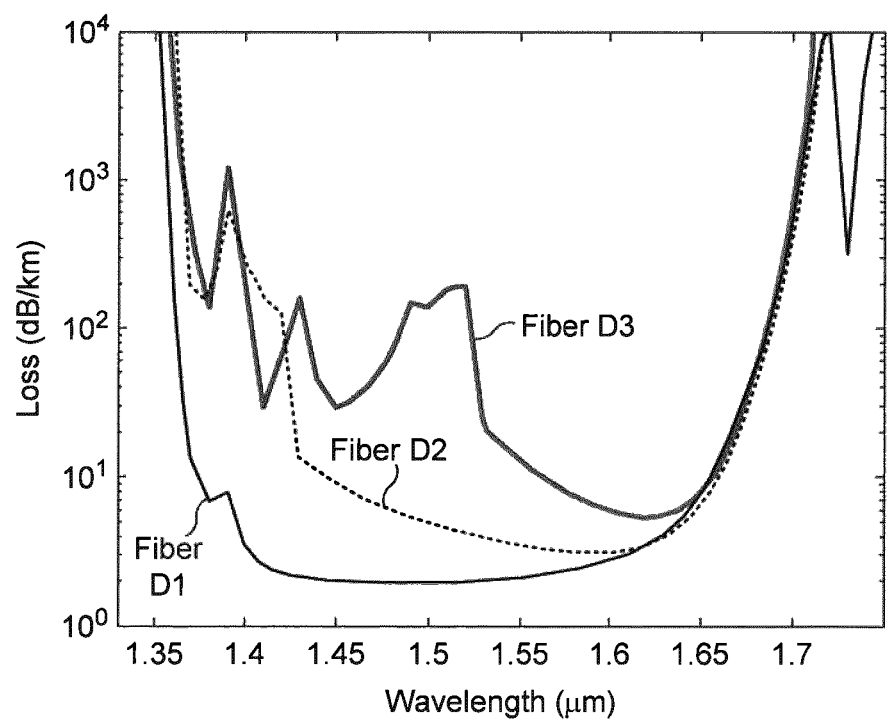
Figure 12:
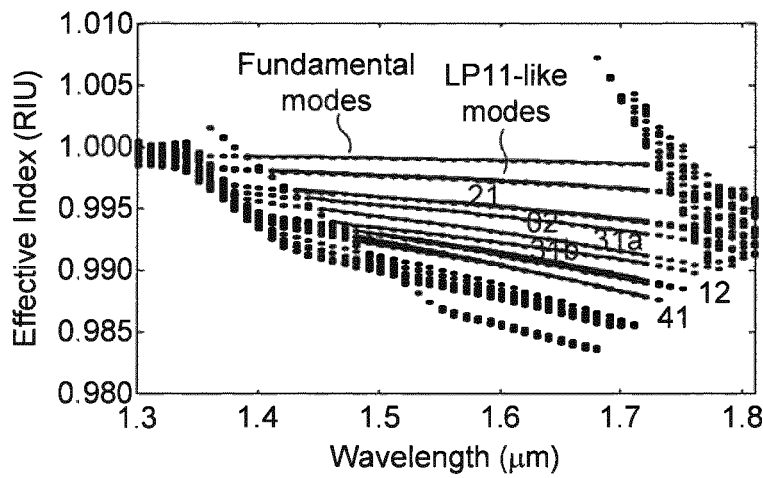
Figure 12:
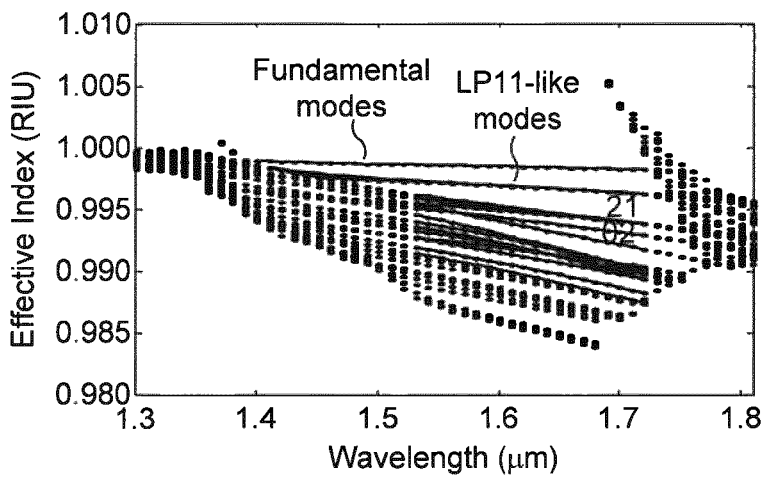
Figure 12:
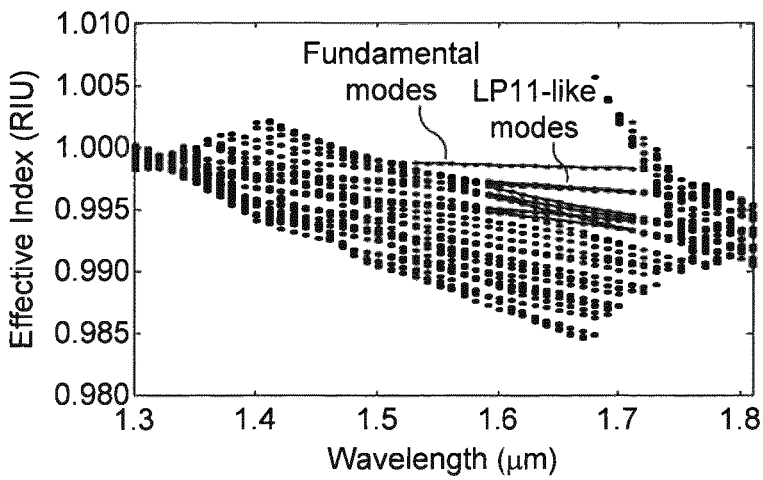
Figure 13:
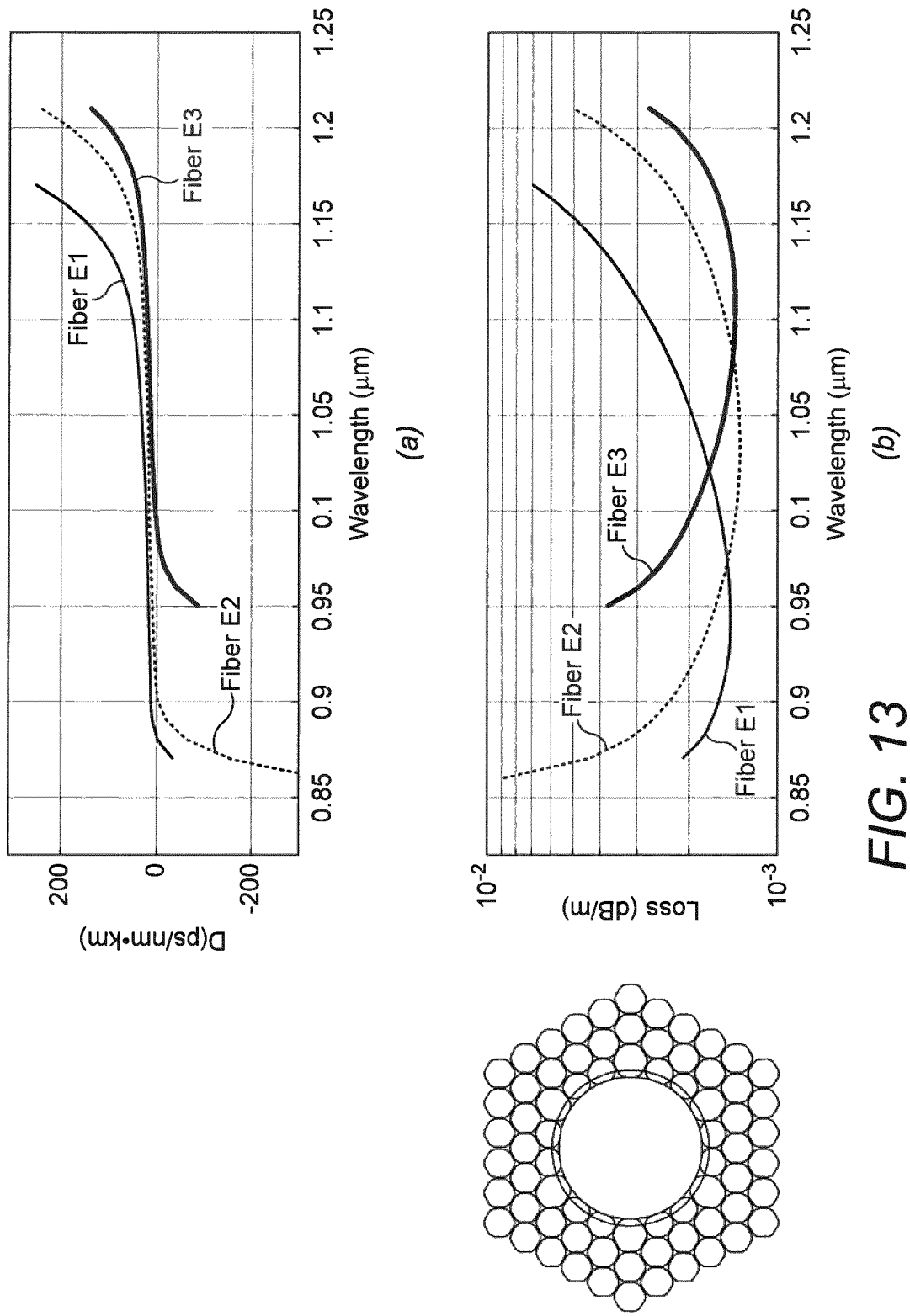
Figure 15A:
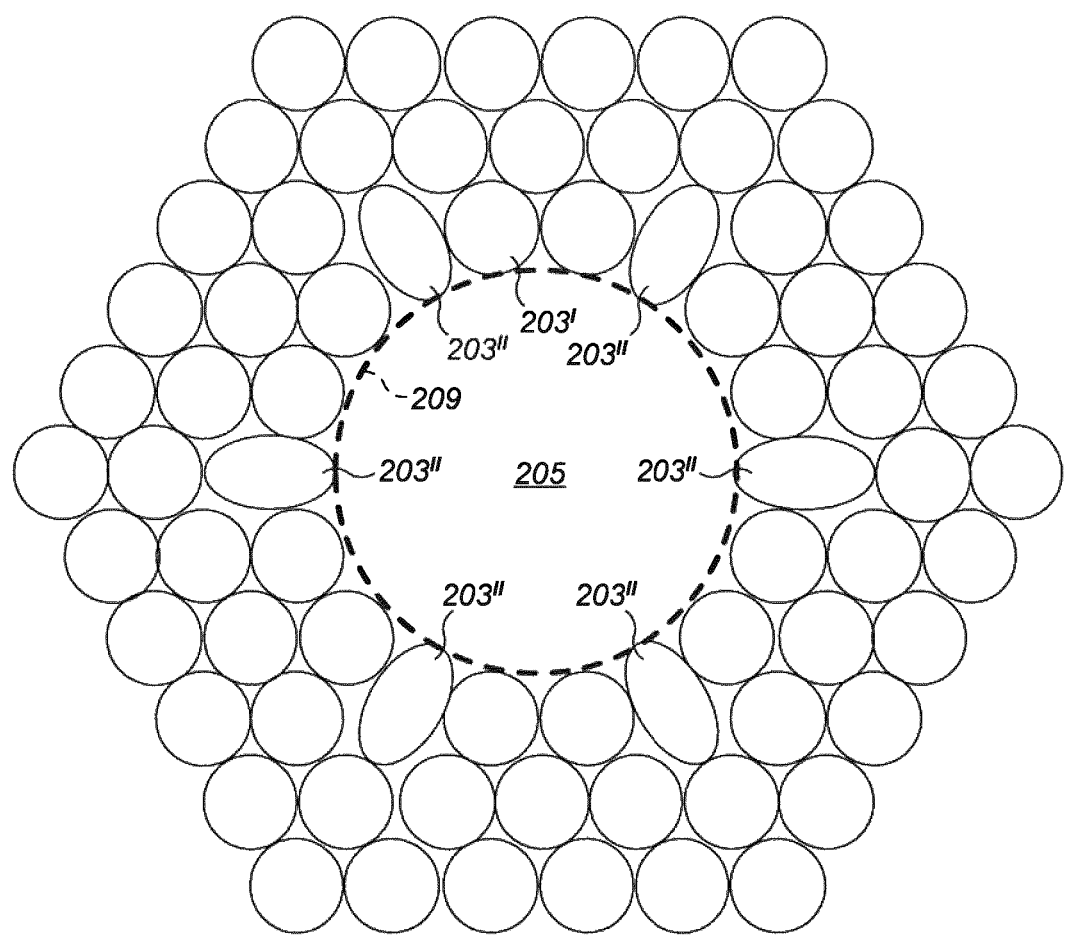
Figure 17:
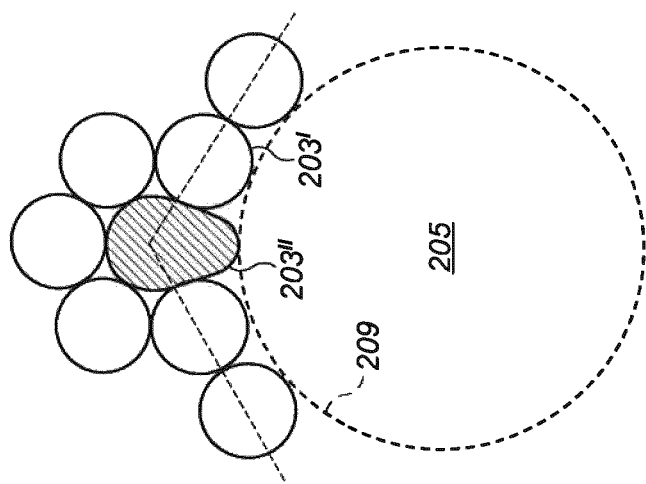
Figure 16:
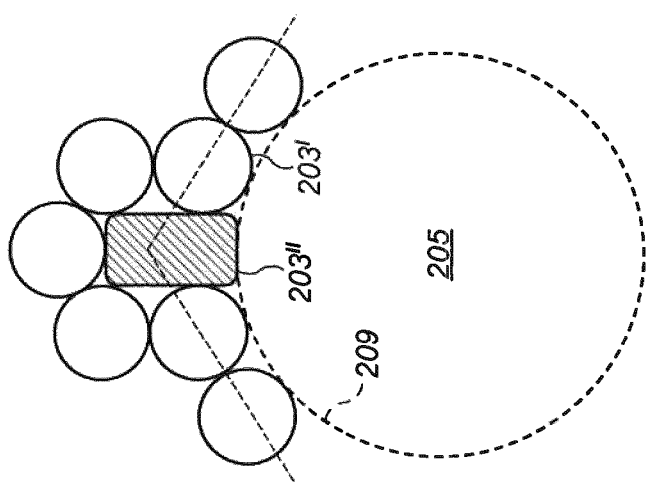
Figure 19:
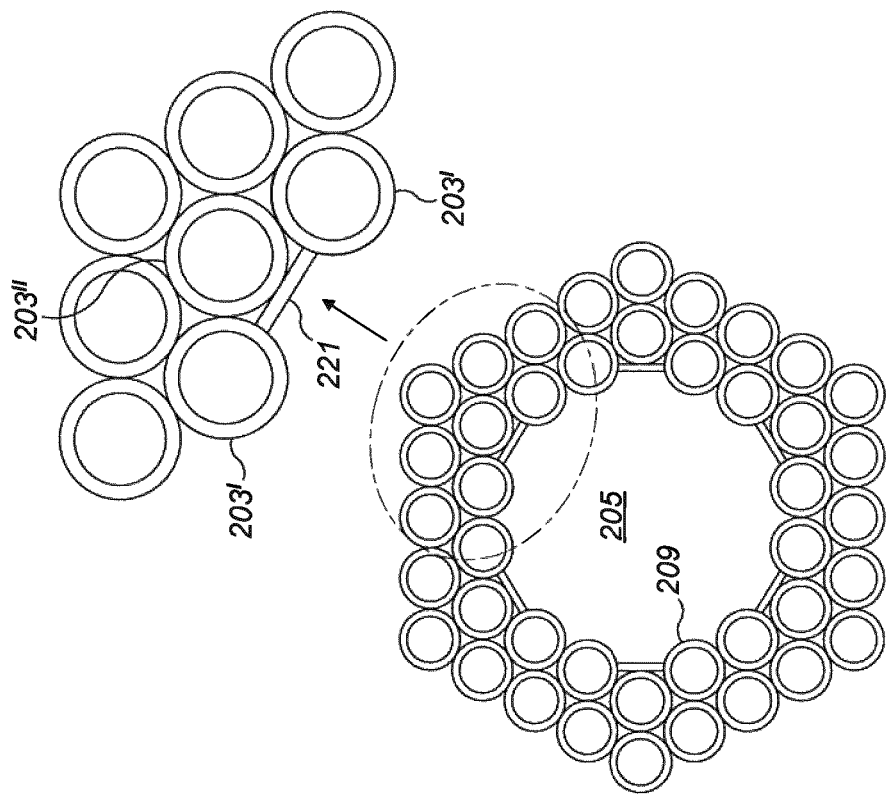
Figure 18:
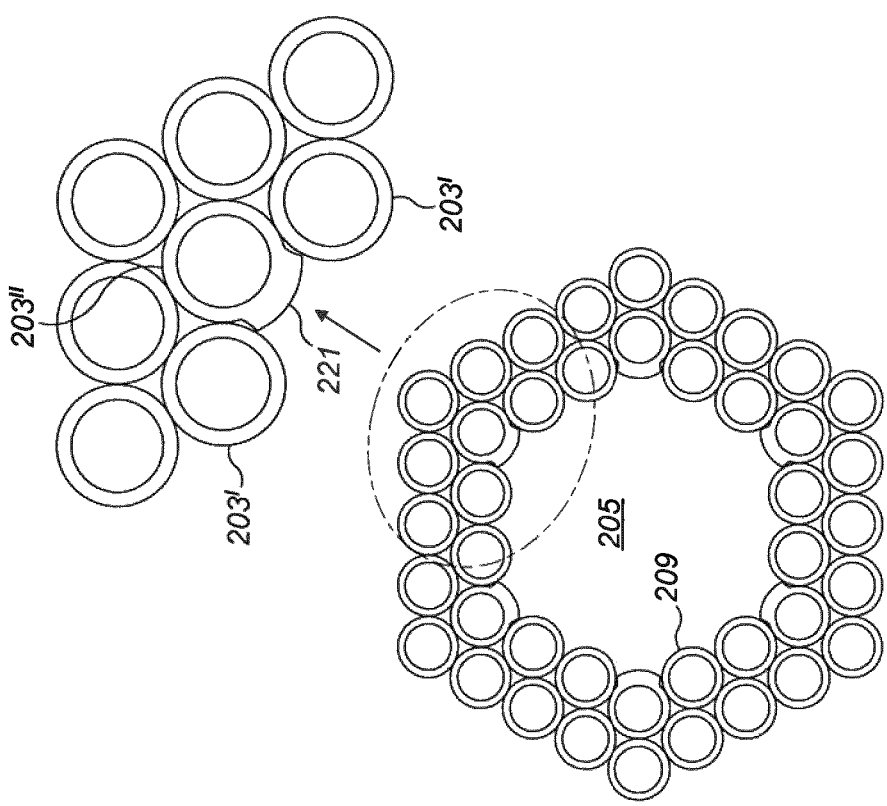
Figure 21:
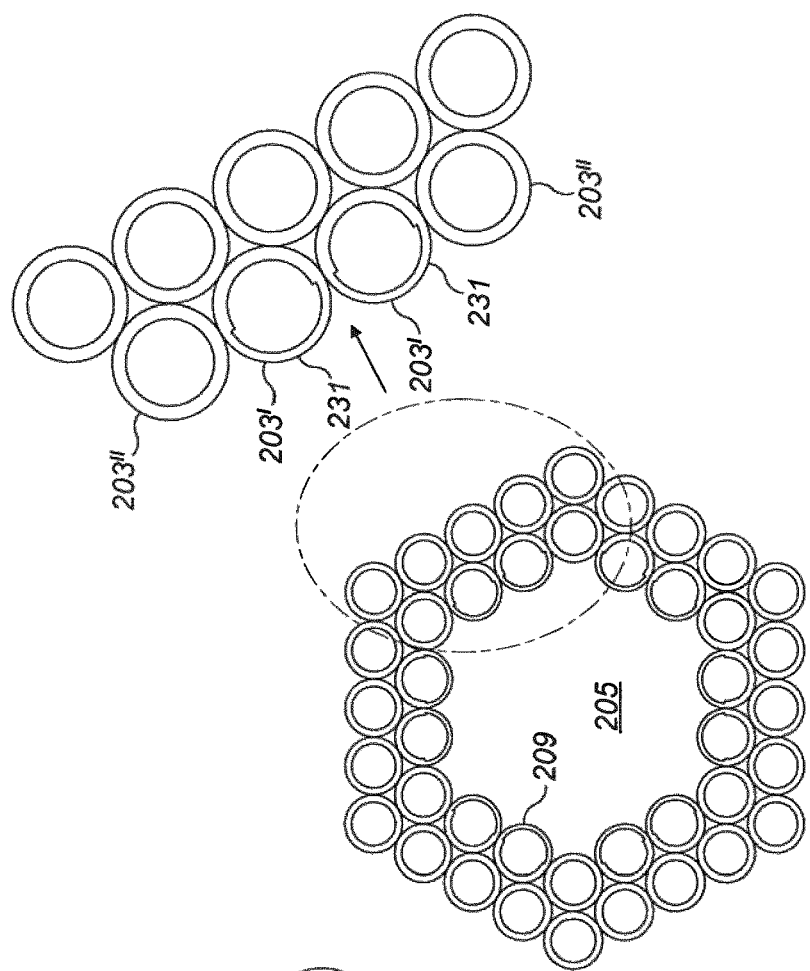
Figure 20:
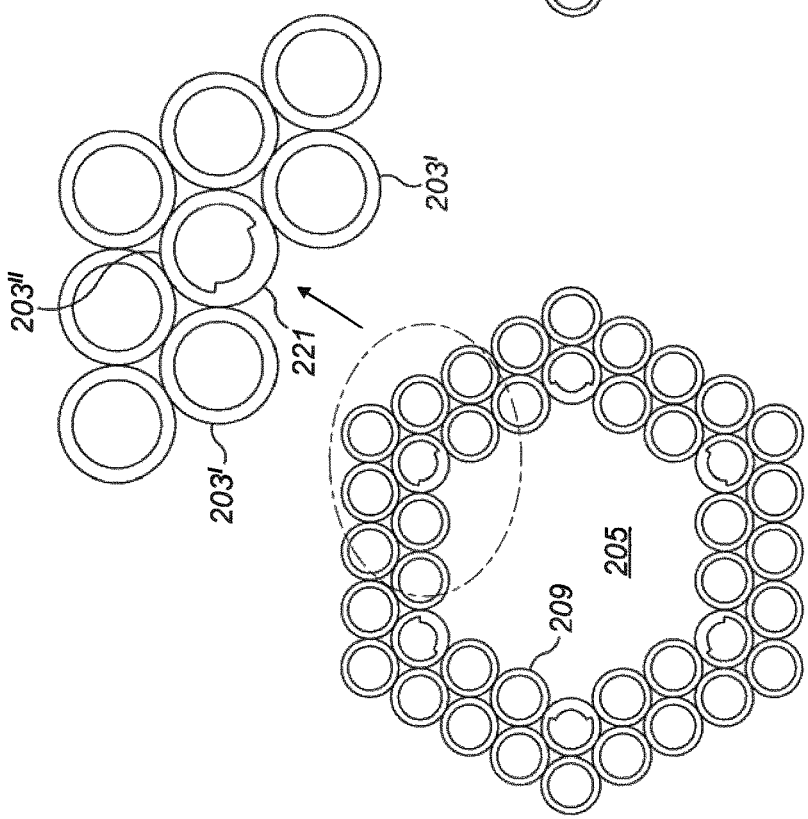
Figure 22:
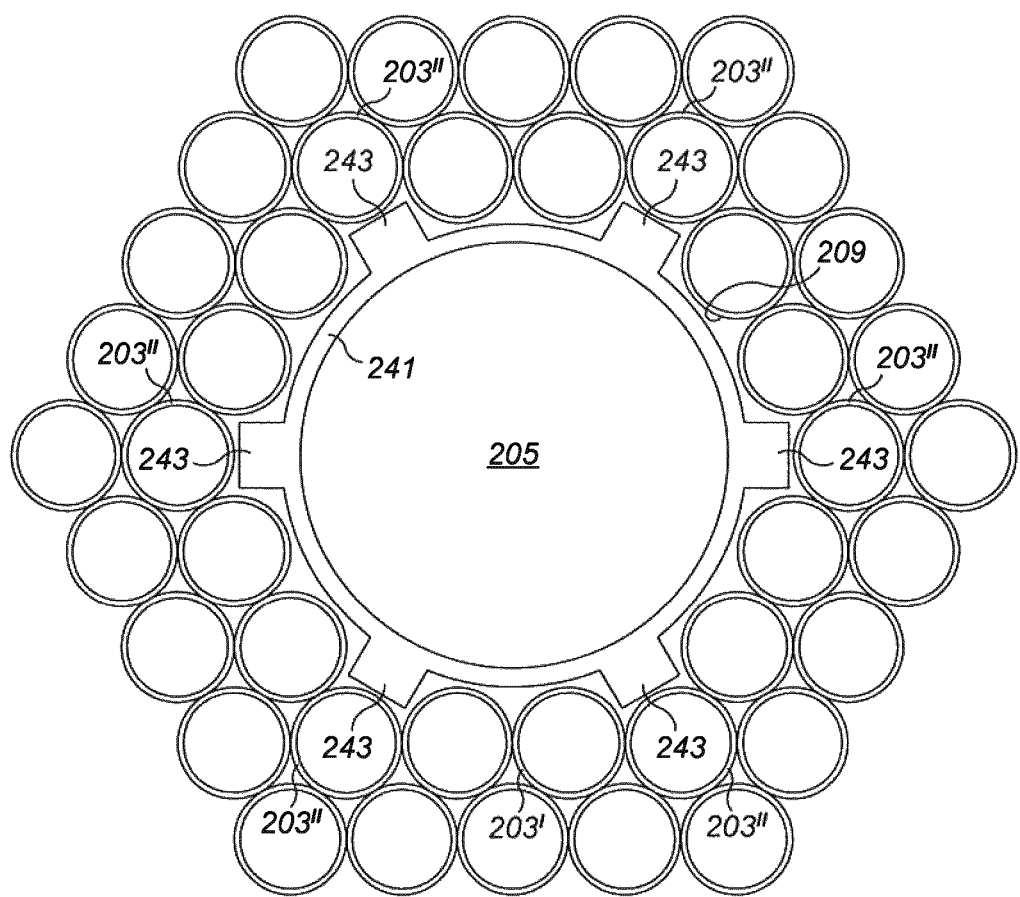
Figure 23:
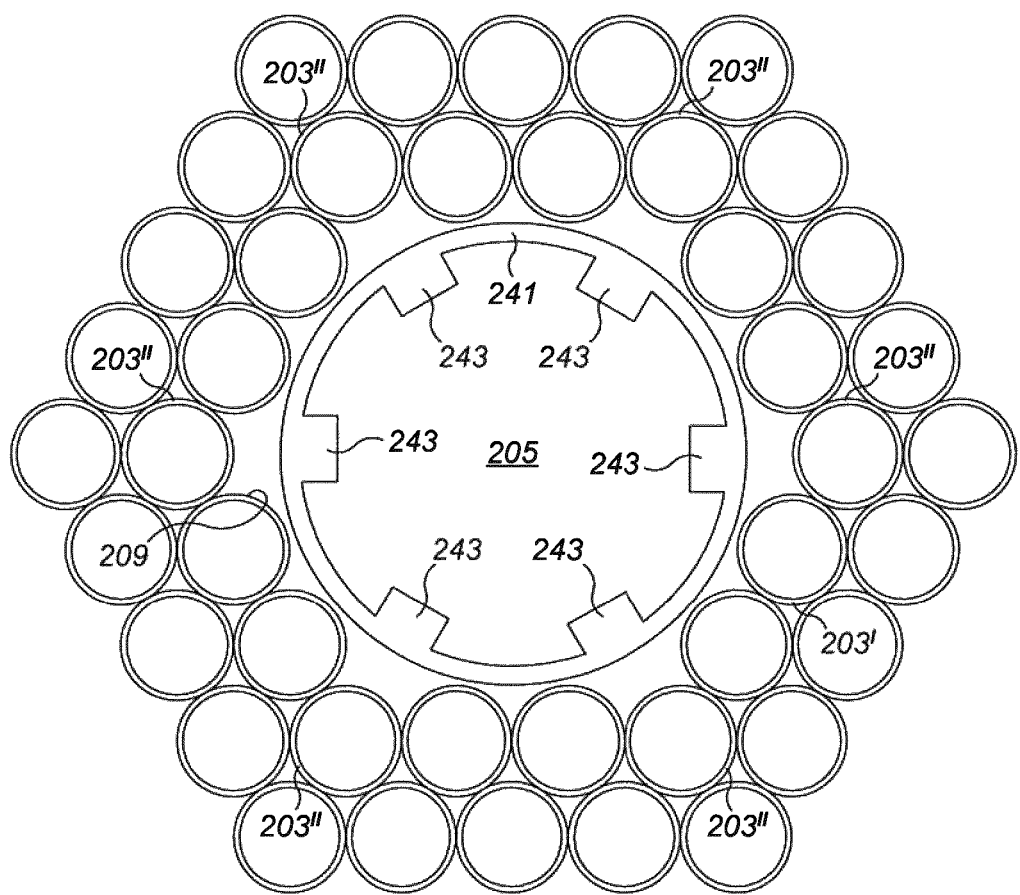
Figure 24:
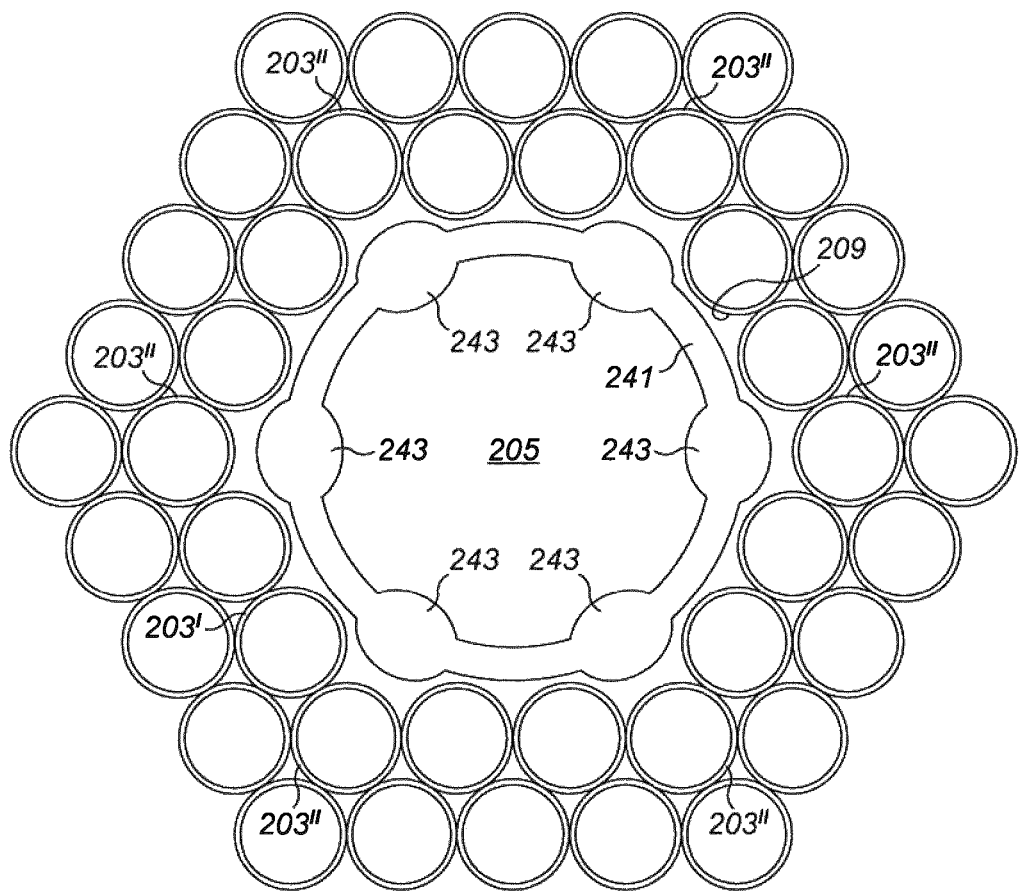
Figure 25:
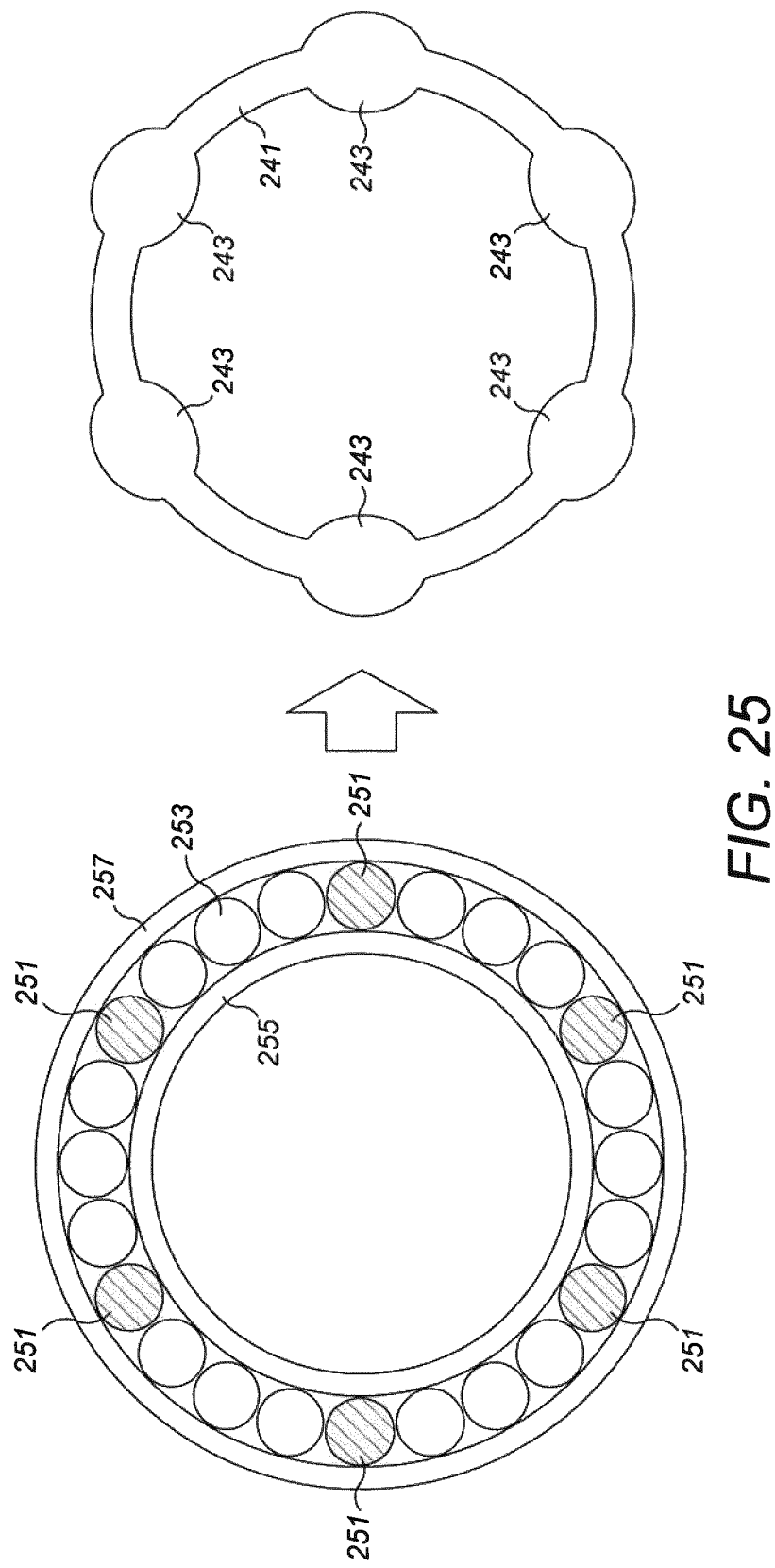
Figure 26A:
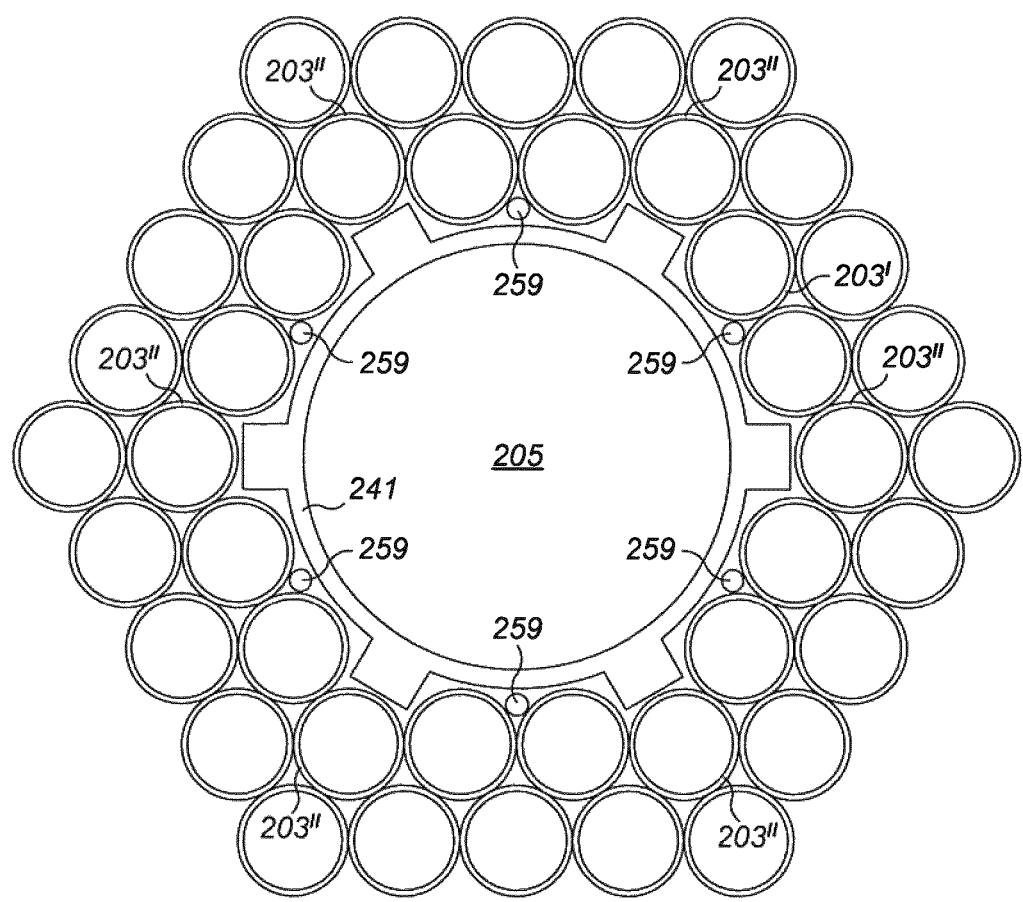
Figure 26B:
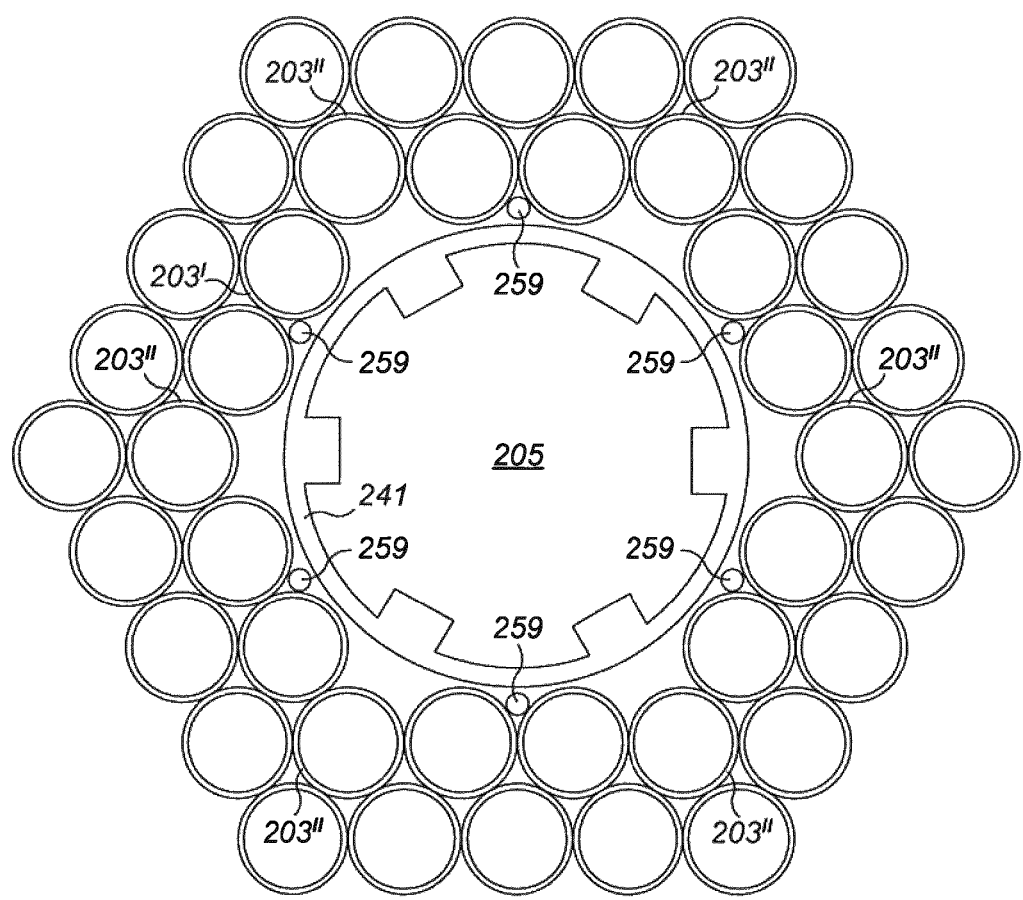
Figure 26C:
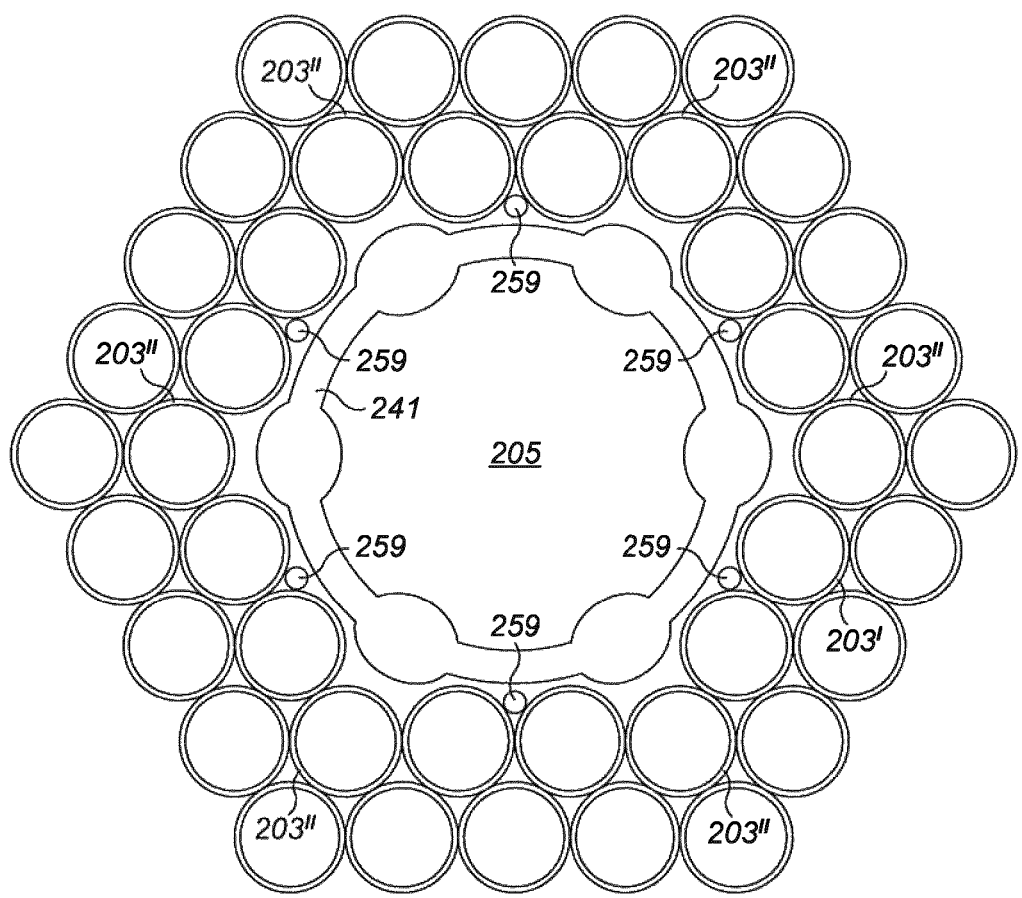
Figure 27:
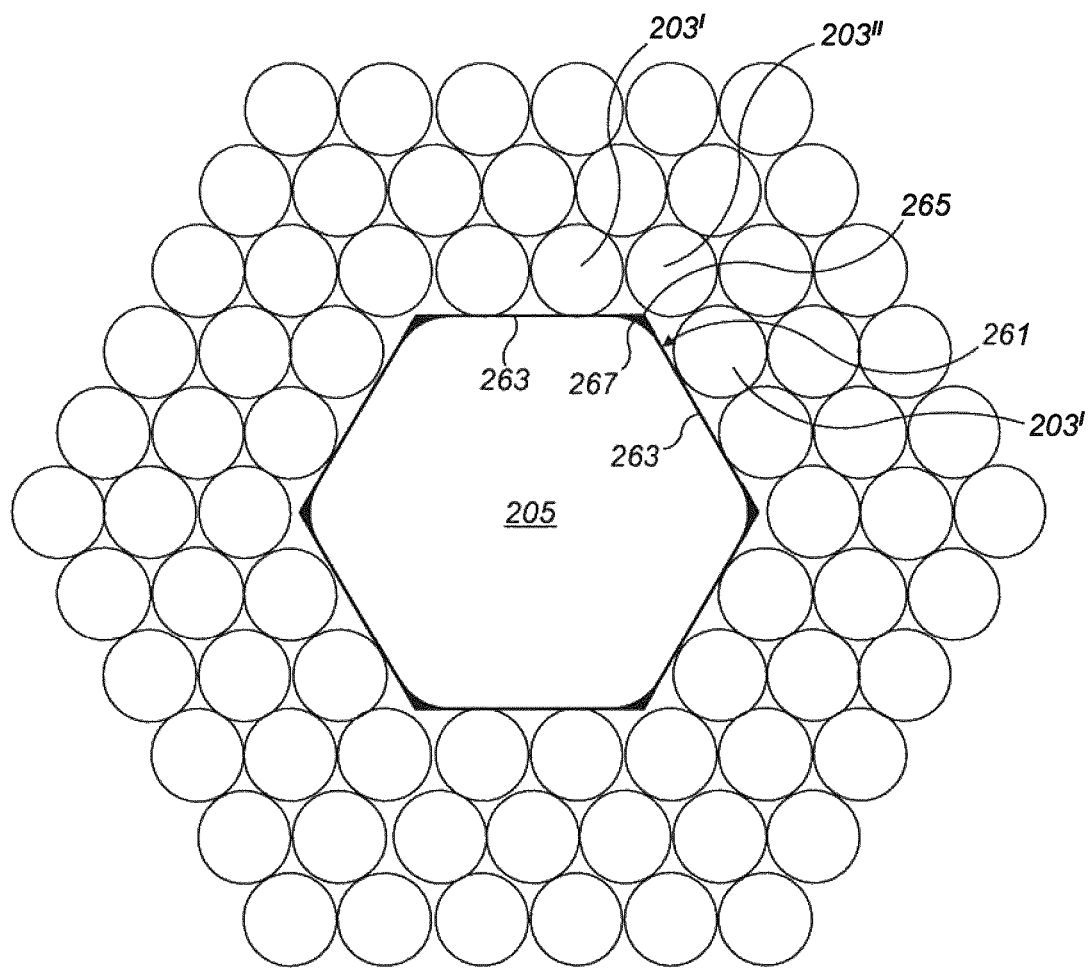
Figure 28:
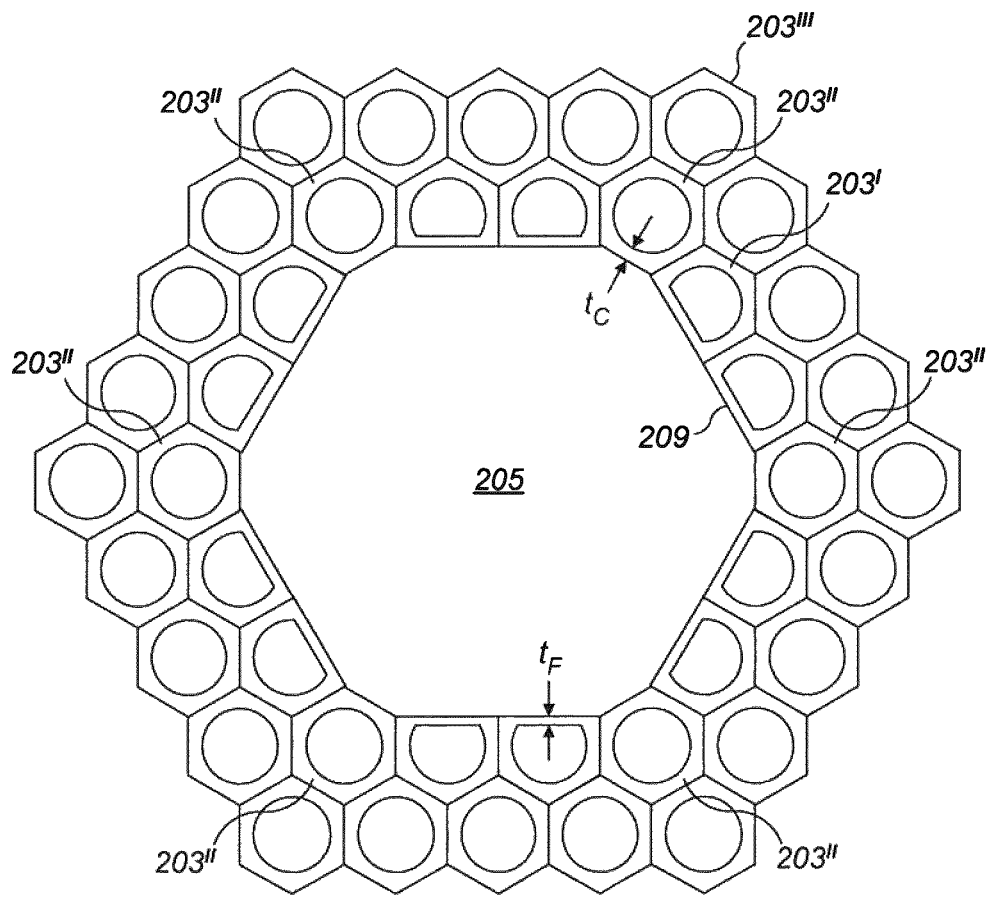
Figure 29:
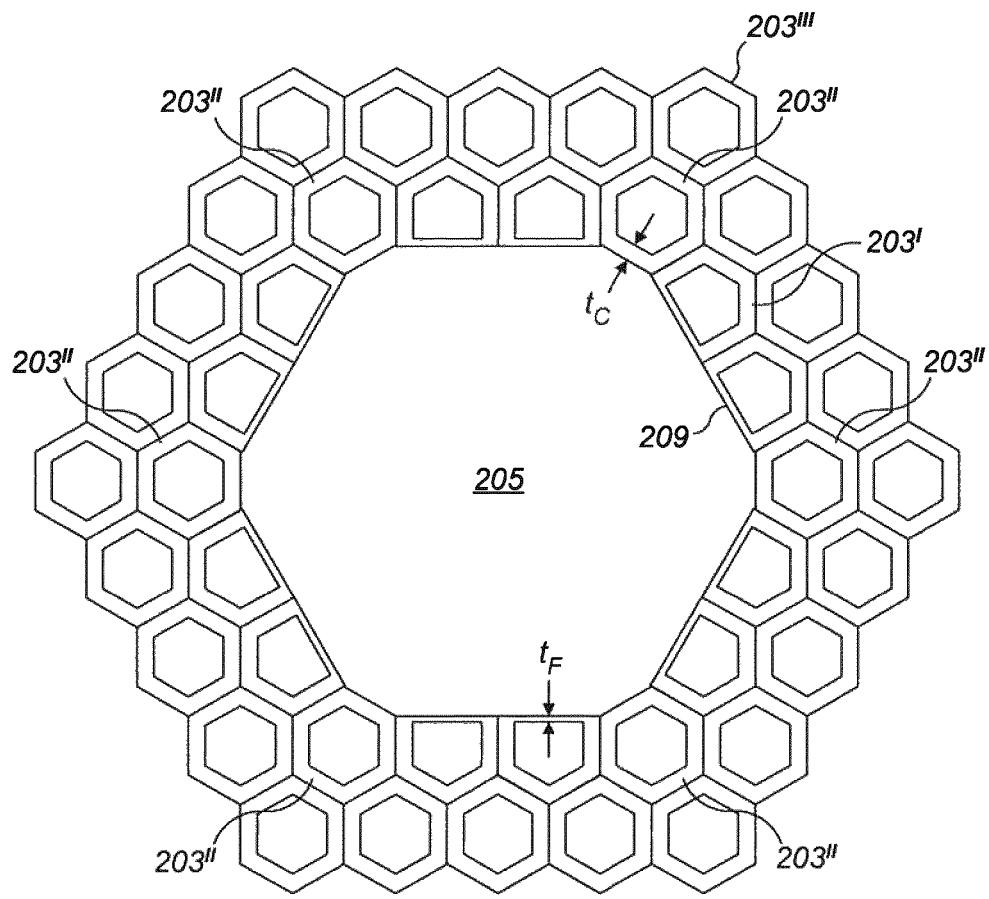
Figure 30:
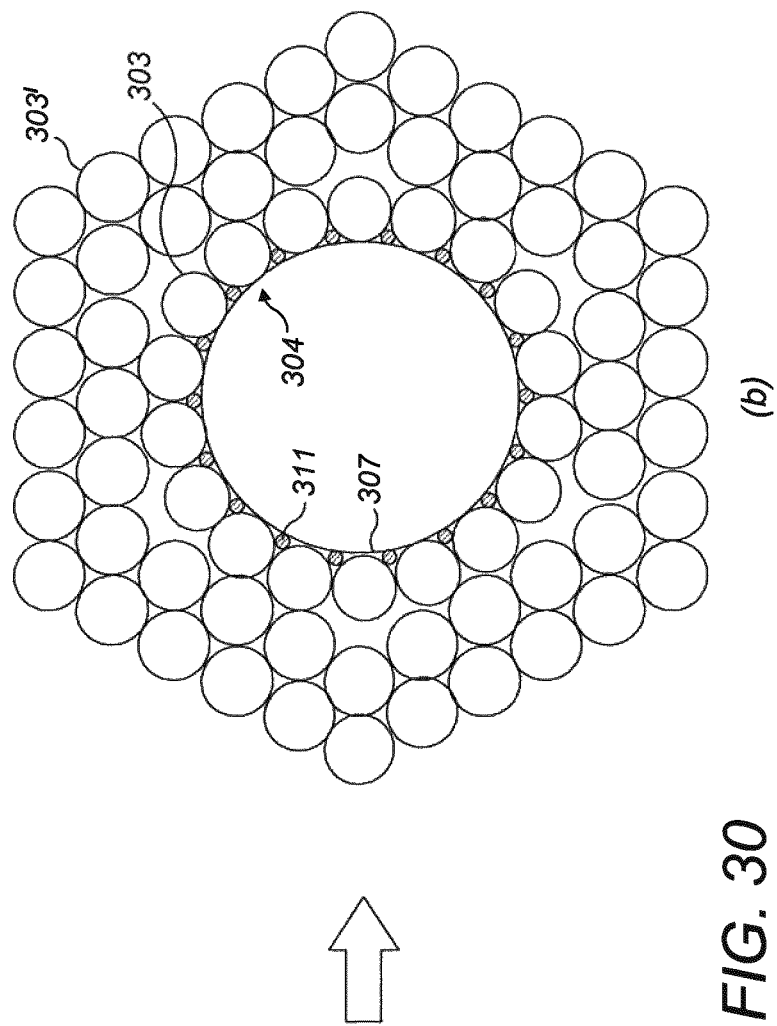
Figure 30:
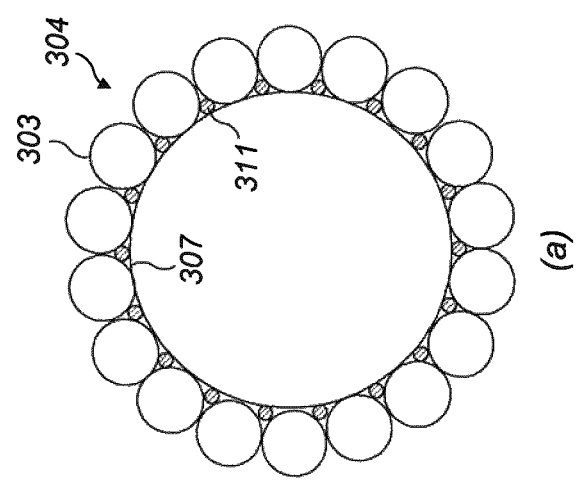
Figure 31:
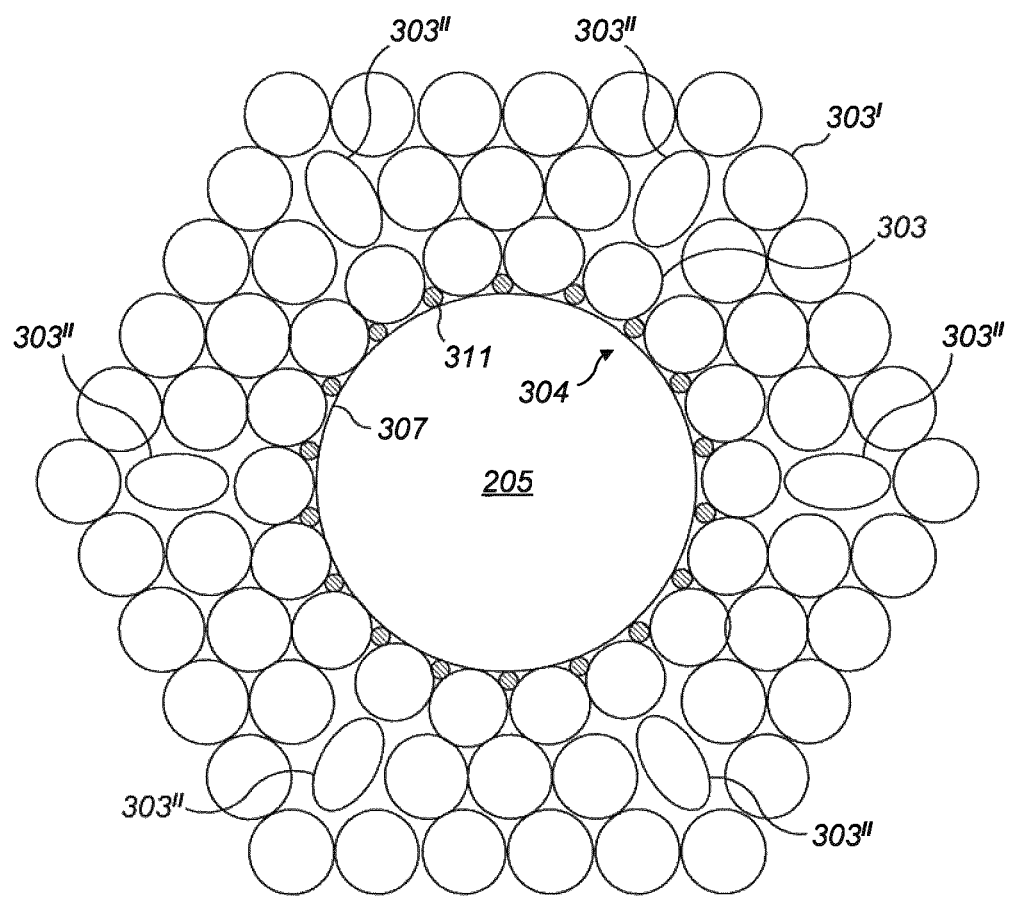
Figure 32:
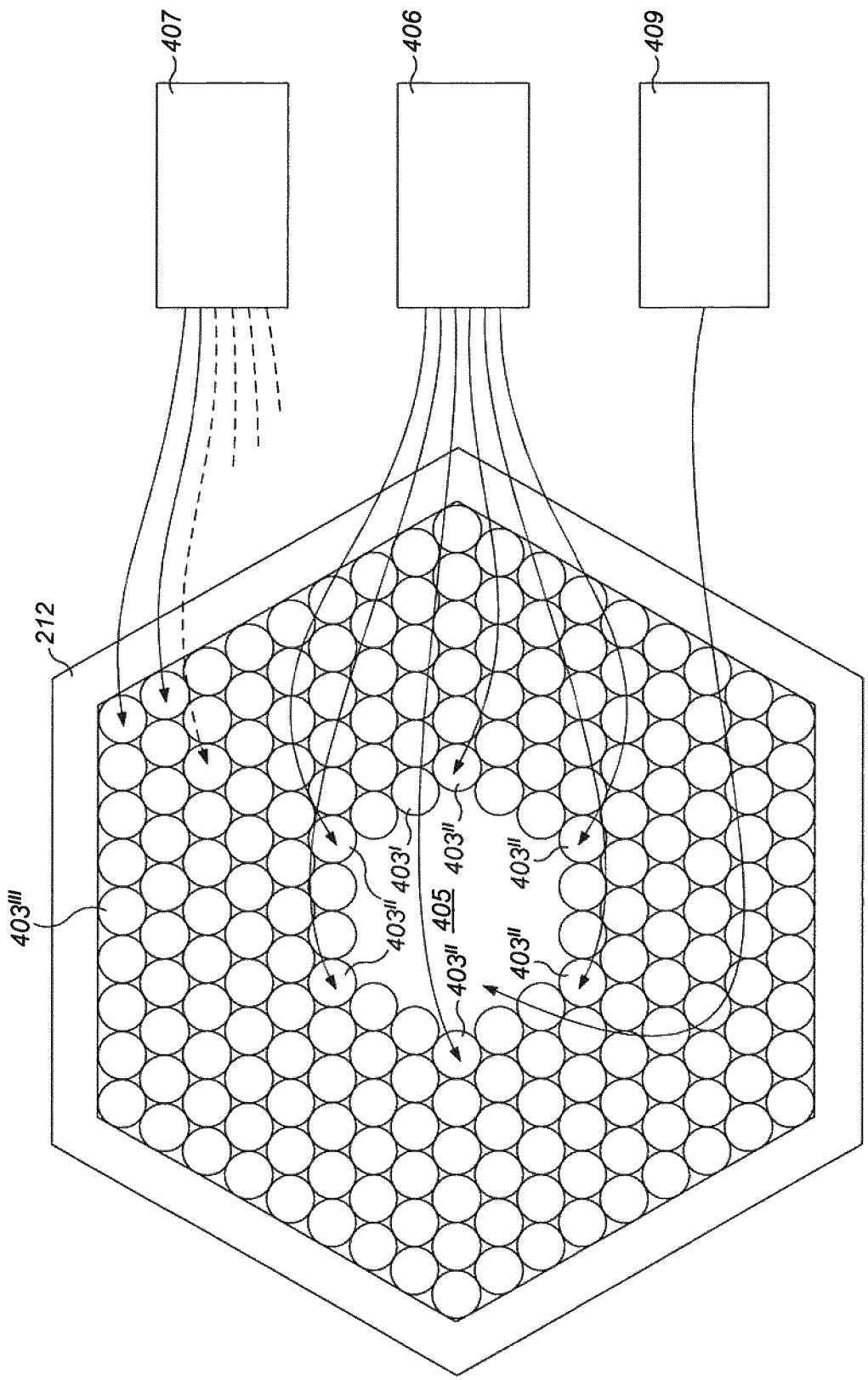
Figure 33:
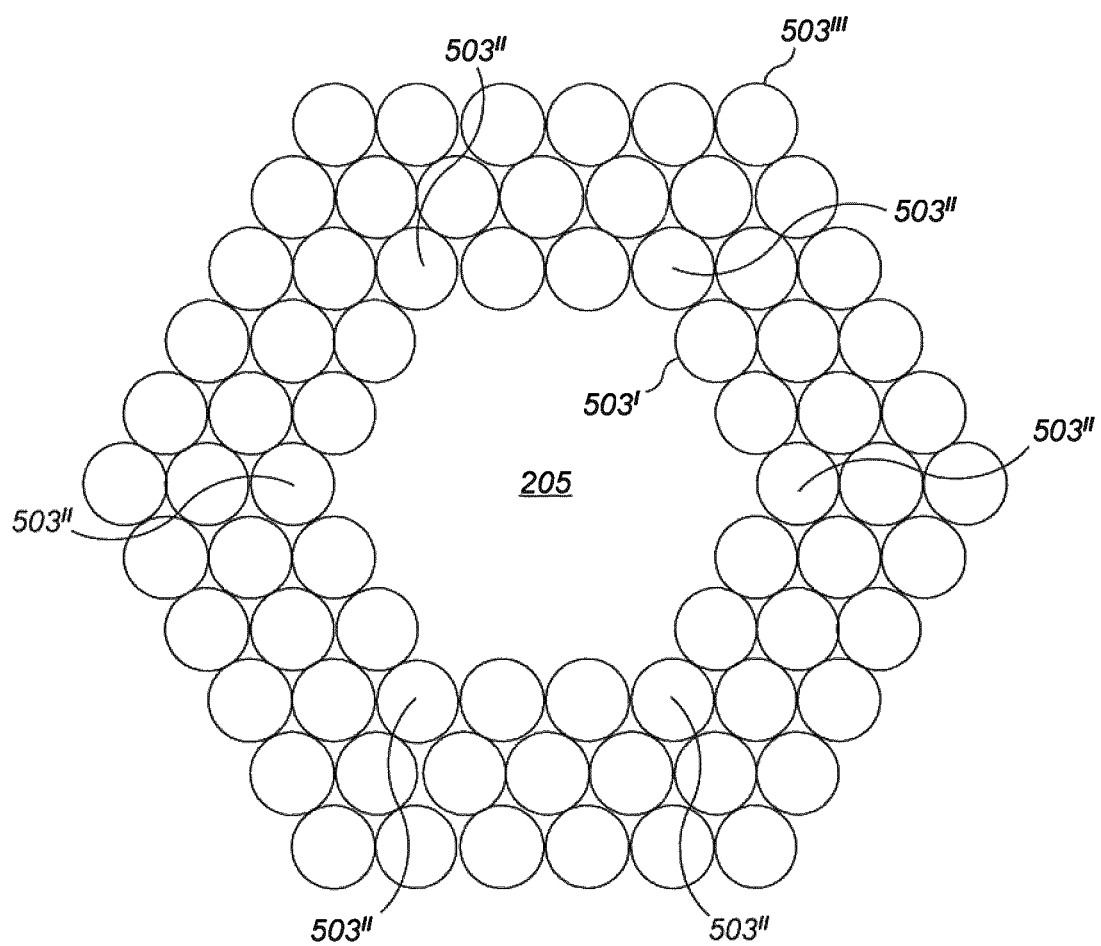
Figure 34:
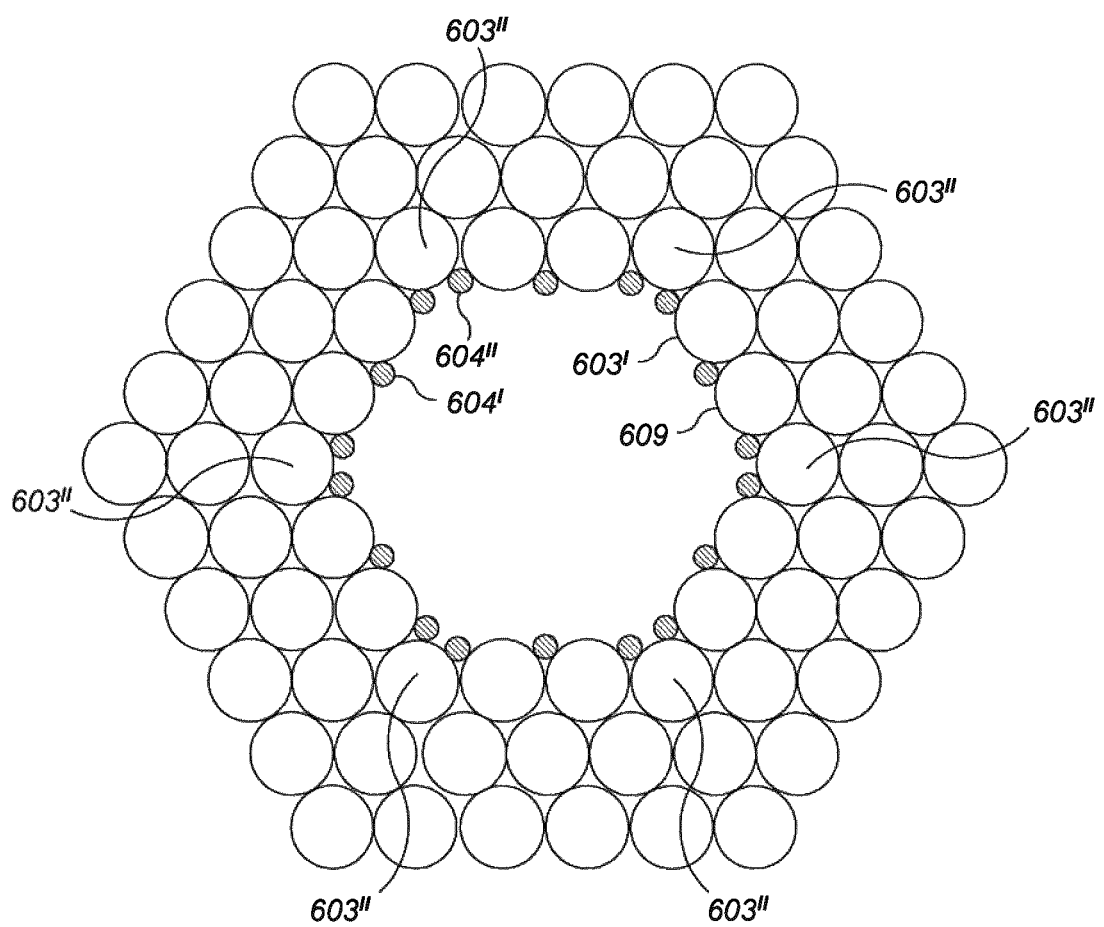
Figure 35:
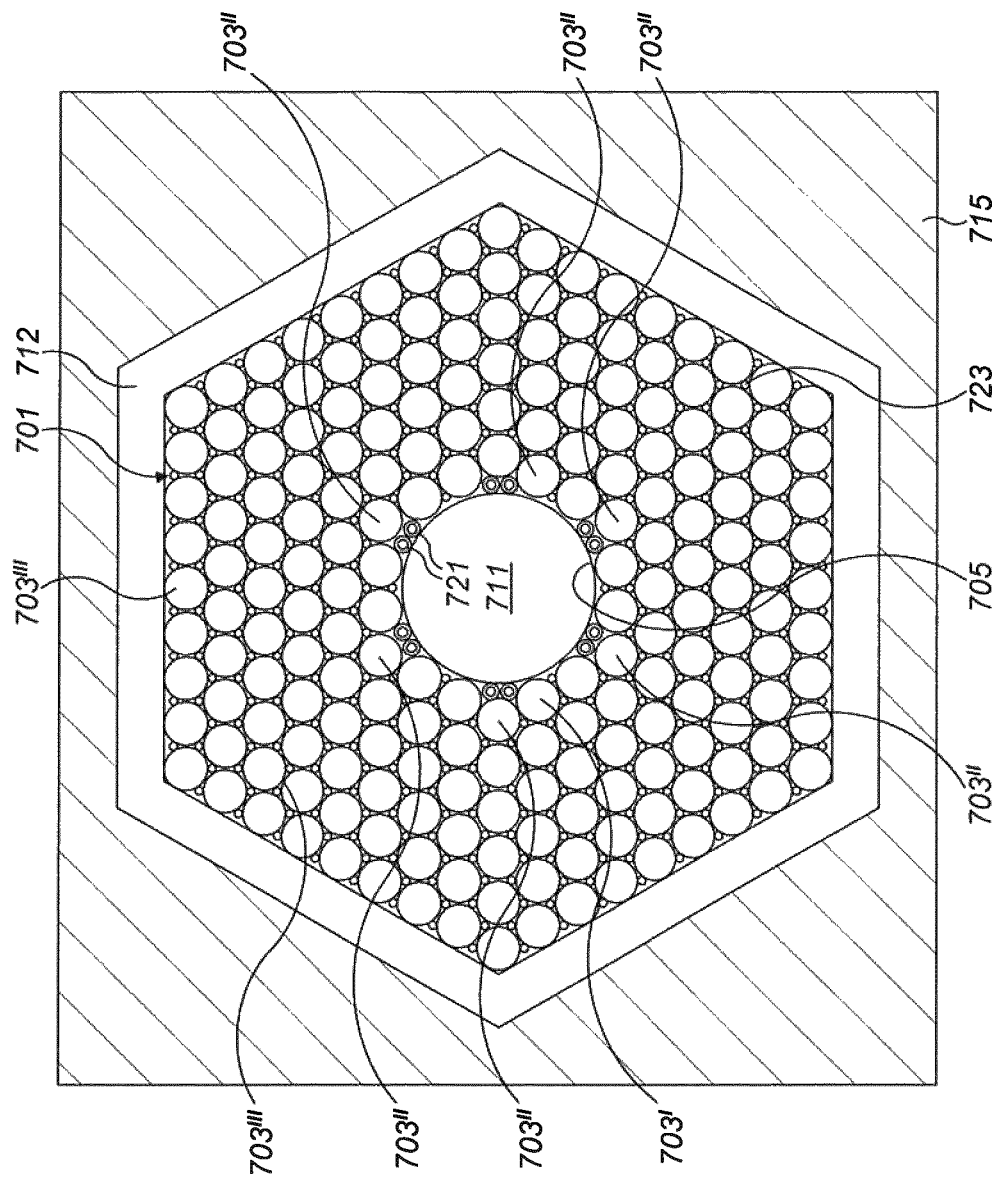

FIGS. 10(a) and (b) illustrate contour plots of the average power flow in the z-direction from Fibers B1 and B6, respectively, of the fiber of FIG. 3;

FIG. 11 illustrates plots of the simulated loss as a function or core wall thickness for fibers in accordance with the embodiment of FIG. 3, where each having equi-spaced core nodes and having no core tube and core tubes of the same thickness as the capillaries in the starting stack and 1.25 times the thickness of the capillaries in the starting stack;

FIG. 12 illustrates plots of loss as a function or core wall thickness for fibers in accordance with the embodiment of FIG. 3, where each having oversized "corner" cavities and having no core tube and core tubes of the same thickness as the capillaries in the starting stack and 1.25 times the thickness of the capillaries in the starting stack;

FIG. 13(a) illustrates plots of the simulated dispersion for fibers in accordance with the embodiment of FIG. 3, having increasing node sizes at the core boundary;

FIG. 13(b) illustrates plots of the simulated loss as a function of node size, corresponding to FIG. 13(a);

FIG. 14(a) to (g) illustrate a conventional fabrication method for the fabrication of HC-PBGFs;

FIGS. 15(a) and (b) illustrate a fabrication method for fabricating HC-PBGFs in accordance with a first embodiment of the present invention;

FIG. 16 illustrates a modified stack for use in the method of FIGS. 15(a) and (b);

FIG. 17 illustrates another modified stack for use in the method of FIGS. 15(a) and (b);

FIG. 18 illustrates a fabrication method for fabricating HC-PBGFs in accordance with a second embodiment of the present invention;

FIG. 19 illustrates a modified stack for use in the method of FIG. 18;

FIG. 20 illustrates another modified stack for use in the method of FIG. 18;

FIG. 21 illustrates a fabrication method for fabricating HC-PBGFs in accordance with a third embodiment of the present invention;

FIG. 22 illustrates a fabrication method for fabricating HC-PBGFs in accordance with a fourth embodiment of the present invention;

FIG. 23 illustrates a modified core tube for use in the method of FIG. 22;

FIG. 24 illustrates another modified core tube for use in the method of FIG. 22;

FIG. 25 illustrates a method of fabricating the core tube of FIG. 24;

FIG. 26(a) to (c) illustrate modified stacks for use in the method of FIG. 22;

FIG. 27 illustrates a fabrication method for fabricating HC-PBGFs in accordance with a fifth embodiment of the present invention;

FIG. 28 illustrates a fabrication method for fabricating HC-PBGFs in accordance with a sixth embodiment of the present invention;

FIG. 29 illustrates a modified stack for use in the method of FIG. 28;

FIGS. 30(a) and (b) illustrate a fabrication method for fabricating HC-PBGFs in accordance with a seventh embodiment of the present invention;

FIG. 31 illustrates a modified stack for use in the method of FIGS. 30(a) and (b);

FIG. 32 illustrates a fabrication method for fabricating HC-PBGFs in accordance with an eighth embodiment of the present invention;

FIG. 33 illustrates a fabrication method for fabricating HC-PBGFs in accordance with a ninth embodiment of the present invention;

FIG. 34 illustrates a fabrication method for fabricating HC-PBGFs in accordance with a tenth embodiment of the present invention; and FIG. 35 illustrates a fabrication method for fabricating HC-PBGFs in accordance with an eleventh embodiment of the present invention.

In the present embodiments the fiber loss accounts for contributions from both leakage (or confinement) loss and scattering from surface roughness. The latter is known to impose a fundamental limit on the achievable attenuation in HC-PBGFs, and as recently shown, is the major loss contribution in fibers with ~dB/km loss levels with six or more rings of air holes outside the core defect [3, 4]. For computation purposes, but without loss of generality, the scattering loss is computed here not by the rigorous treatment formulated in [4], but through the simplified method of calculating the normalized interface field intensity of the fiber on the air-glass interfaces [3]:

$$F = \left(\frac{\varepsilon_0}{\mu_0}\right)^{\frac{1}{2}} \frac{\oint_{hole\text{-}perimeters} |E|^2 ds}{\iint_{cross\text{-}section} E \times H^* dA}$$

where E and H are the electric and magnetic field vectors of the fundamental mode. In addition, the scattering loss is calibrated by comparing multiple measurements and simulations so that a loss value of 3.5 dB/km around a wavelength of 1.5 μm corresponds to an interface field intensity (F) of 0.0116 μm$^{-1}$.

Figure 2:
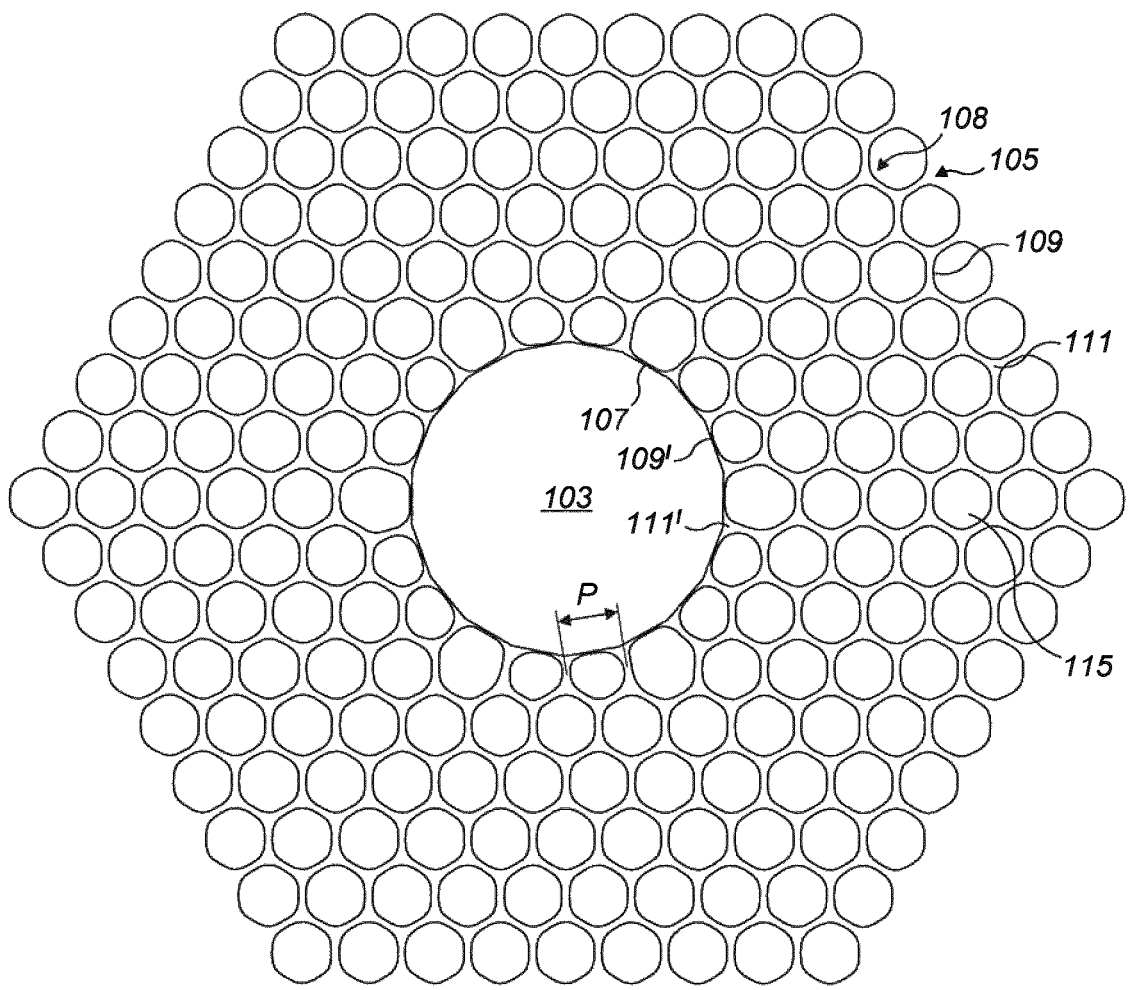
FIG. 2 illustrates a lateral cross-section through a HC-PBGF in accordance with a first embodiment of the present invention.

FIG. 2 illustrates a HC-PBGF in accordance with a first embodiment of the present invention.

The HC-PBGF comprises an elongate fiber body having a hollow core 103 and a cladding 105 which surrounds the core 103 at a boundary 107.

In this embodiment the core 103 is gas filled, here air filled. In other embodiments the core 103 could be filled with any of argon, xeon, helium or hydrogen.

In an alternative embodiment the core 103 could be a vacuum.

In another alternative embodiment the core 103 could contain a liquid.

In this embodiment the core 103 is substantially circular in section.

The cladding 105 comprises a lattice or network 108 of struts 109, 109' and interstitial nodes 111, 111', which together define a plurality of cavities 115, in this embodiment extending along the length of the fiber body, which are arranged in packed relation around the core 103.

In this embodiment the network 108 is formed of glass, such as silicate glasses, fluoride glasses, telluride glasses or chalcogenicide glasses.

In an alternative embodiment the network 108 could be formed of a polymer.

In one embodiment different materials, glasses or polymers, may be used in the cladding 105 for an inner region at the core boundary 107 and for an outer region.

In one embodiment different materials, glasses or polymers, can be used in regions across the cross-section of the cladding 105.

In this embodiment the cavities 115 comprise gas-filled holes, here air-filed holes. In other embodiments the cavities 115 could be filled with any of argon, xeon, helium or hydrogen.

In an alternative embodiment the cavities 115 could be a vacuum.

In another alternative embodiment the cavities 115 could contain a liquid.

In this embodiment the cavities 115 are arranged in triangular-packed relation,

In alternative embodiments the cavities 115 could be packed in other relation, such as square-packed or hexagonal-packed.

In this embodiment the struts 109' at the core boundary 107 have substantially equal length, and the nodes 111' at the core boundary 107 are substantially equi-spaced at a pitch p.

Figure 1:
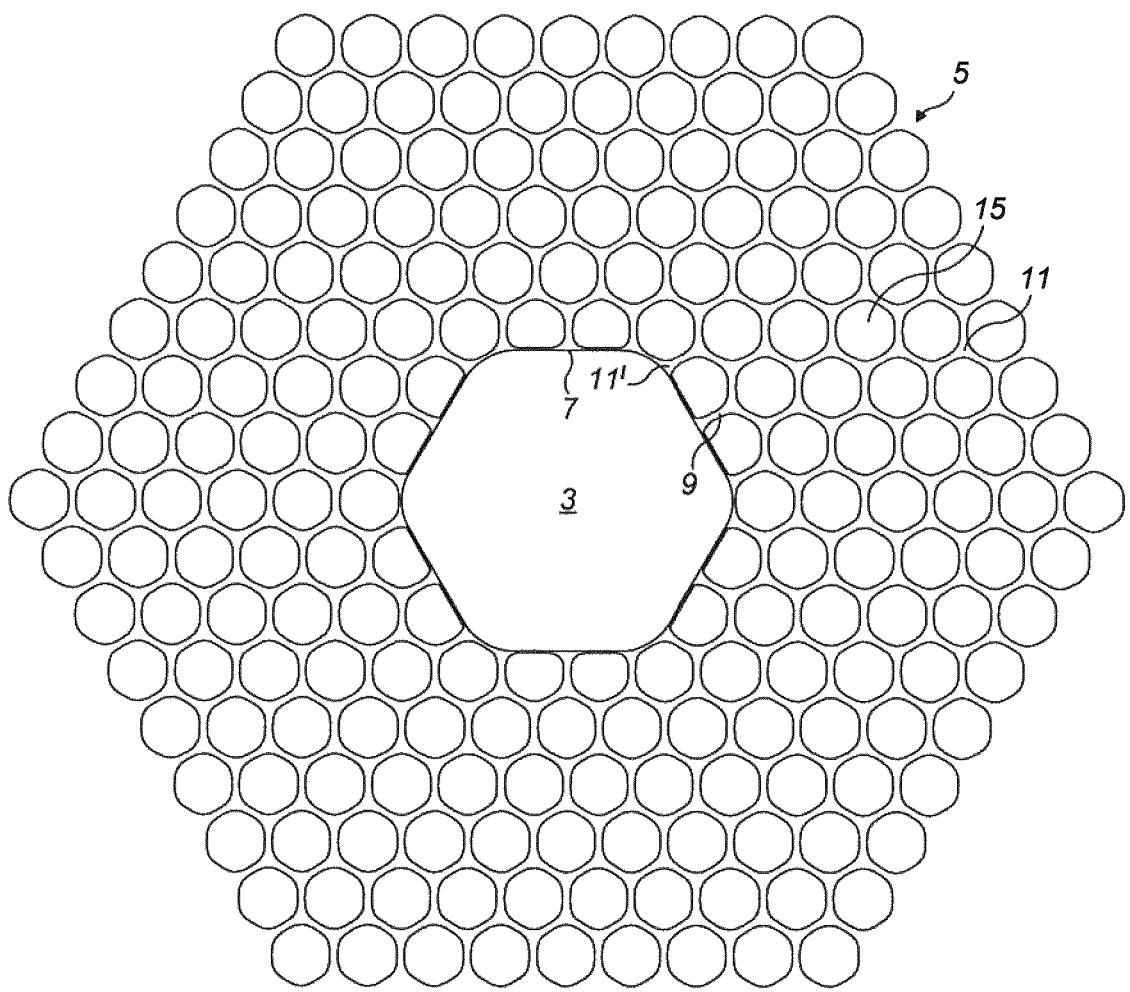
FIG. 1 illustrates a lateral cross-section through an "ideal" HC-PBGF in accordance with the prior art.
Figure 4:
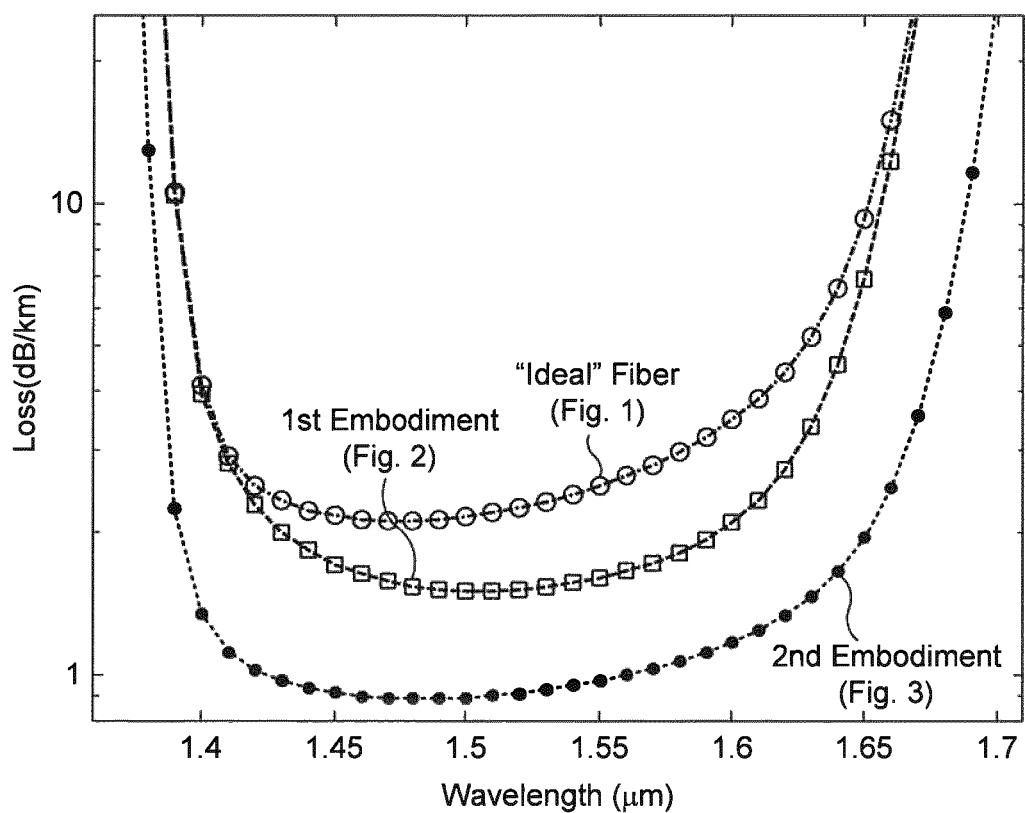
FIG. 4 illustrates plots of the simulated losses for the "ideal" fiber of FIG. 1, the fiber of FIG. 2 and the fiber of FIG. 3.

The present inventors have established that surprisingly, and contrary to the understanding in the art which requires an exact periodicity of the structure of the cladding 103, as illustrated in the "ideal" fiber of FIG. 1, by arranging the core struts 109' to have substantially equal length and the core nodes 111' to be substantially equi-spaced, there is a significant reduction in fiber loss over a much broader operational bandwidth. As illustrated in FIG. 4, the loss value is about 40% lower than the loss seen in the "ideal" fiber of FIG. 1.

The present inventors postulate that the broader operational bandwidth is provided by improved uniformity of the core struts 109' in terms of length and mass, arising from equi-spacing of the core nodes 111', and that the reduction in fiber loss arises as a result of the field being equally prevented from overlapping each of the core struts 109'.

In one embodiment the core nodes 111' have substantially the same size as the nodes 111 within the body of the cladding 105 which arrangement yields the lowest fiber loss.

In this embodiment the core struts 109' have an average thickness ($t_c$) of about 23 nm, the cladding struts 109 have an average thickness ($t_c$) of 47 nm, the average cladding node area is 0.47 µm² and the overall effective fiber diameter ($D_{cladding}$) is 80 µm, which are the same as for the "ideal" fiber of FIG. 1.

In this embodiment the fiber is a nineteen cell (19c) fiber, having an effective core diameter of 5Λ, where Λ is the average spacing of the cavities 115, which is the same size as the "ideal" fiber of FIG. 1.

In an alternative embodiment the fiber could have a different core size, for example, a thirty-seven cell (37c) fiber, having an effective core diameter of 7Λ, or a sixty-one cell (61c) having an effective core diameter of 9Λ.

FIG. 3 illustrates a fiber in accordance with a second embodiment of the present invention.

The fiber of this embodiment is quite similar to the fiber of the first-described embodiment, and thus, in order to avoid unnecessary duplication of description, only the differences will be described in detail, with like parts being designated by like reference signs.

In this embodiment the fiber has an enlarged core 103 as compared both to the "ideal" fiber of FIG. 1 and the fiber of the first-described embodiment.

In this embodiment the core 103 has an effective diameter of 1.26 times greater than that of the "ideal" fiber of FIG. 1, where the effective diameter is nΛ, here 5Λ, and where Λ is 4.4 µm In one embodiment the average cavity spacing Λ is from about 3 µm to about 6 µm in fibers operating at a wavelength of 1.55 µm.

In another embodiment the average cavity spacing Λ is from about 4 µm to about 8 µm in fibers operating at the minimum loss wavelength of 2 µm.

As illustrated in FIG. 4, the reduction in fiber loss, as compared to the "ideal" fiber of FIG. 1, is further reduced in relation to the first-described embodiment, here by a factor as high as 2.4 over the entire transmission bandwidth.

Figure 5:
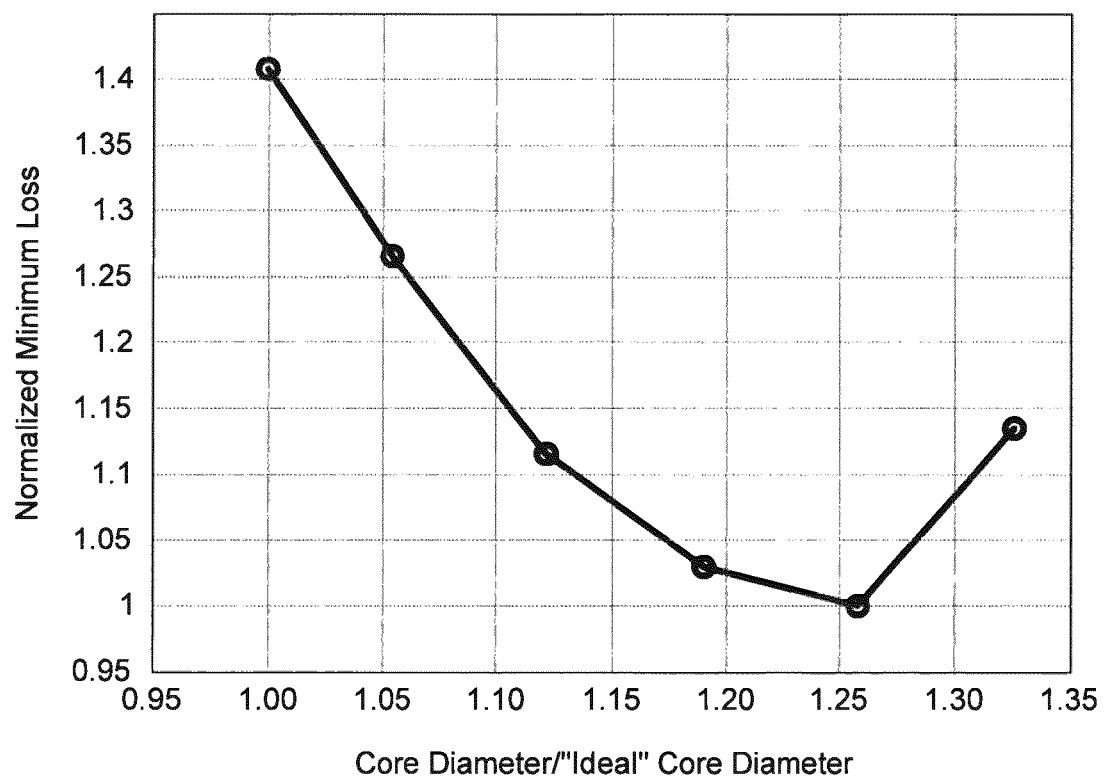
FIG. 5 illustrates a plot of the simulated loss as a function of core diameter for the fiber of FIG. 3.

FIG. 5 illustrates a plot of the simulated loss as a function of core diameter for the fiber of FIG. 3. As will be seen, the fiber of this embodiment has an optimum core diameter ratio of from about 1.05 to about 1.35 nΛ, preferably from about 1.05 nΛ, still preferably from about 1.1 to about 1.35 nΛ, and more preferably from about 1.15 to about 1.30 nΛ.

Figure 6:
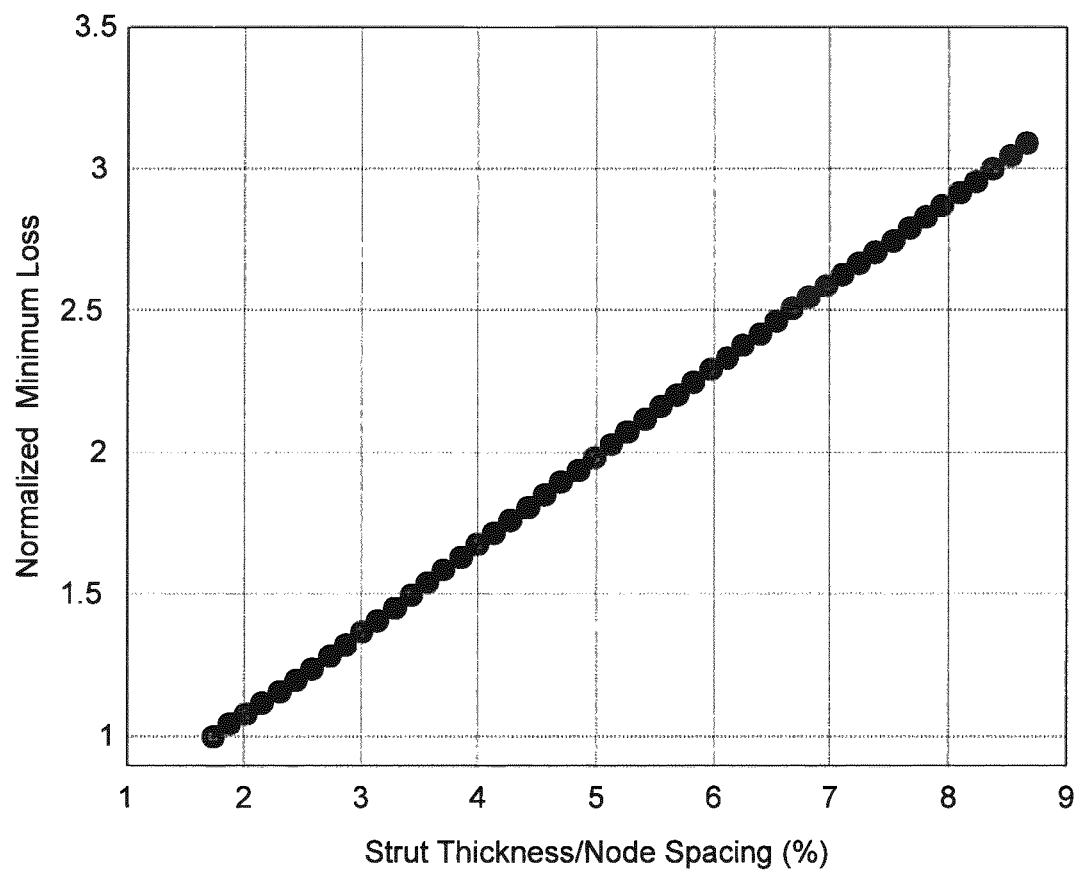
FIG. 6 illustrates a plot of the simulated loss of the fiber of FIG. 3 as a function of a ratio of the thickness ($t_c$) of the struts to the average spacing of the nodes.

In addition, as illustrated in FIG. 6, which illustrates the simulated loss for the fiber of FIG. 3 as a function of a ratio of the average thickness ($t_c$) of the struts 109 to the average spacing of the nodes 111, the present invention allows for reduction of loss by optimizing the thickness ($t_c$) of the struts 109 in relation to the spacing of the nodes 111. In the present invention, loss is minimized by providing that the ratio of the average thickness ($t_c$) of the struts 109 to the average spacing of the nodes 111 is less than about 5%, and optionally less than about 2%.

Figure 7:
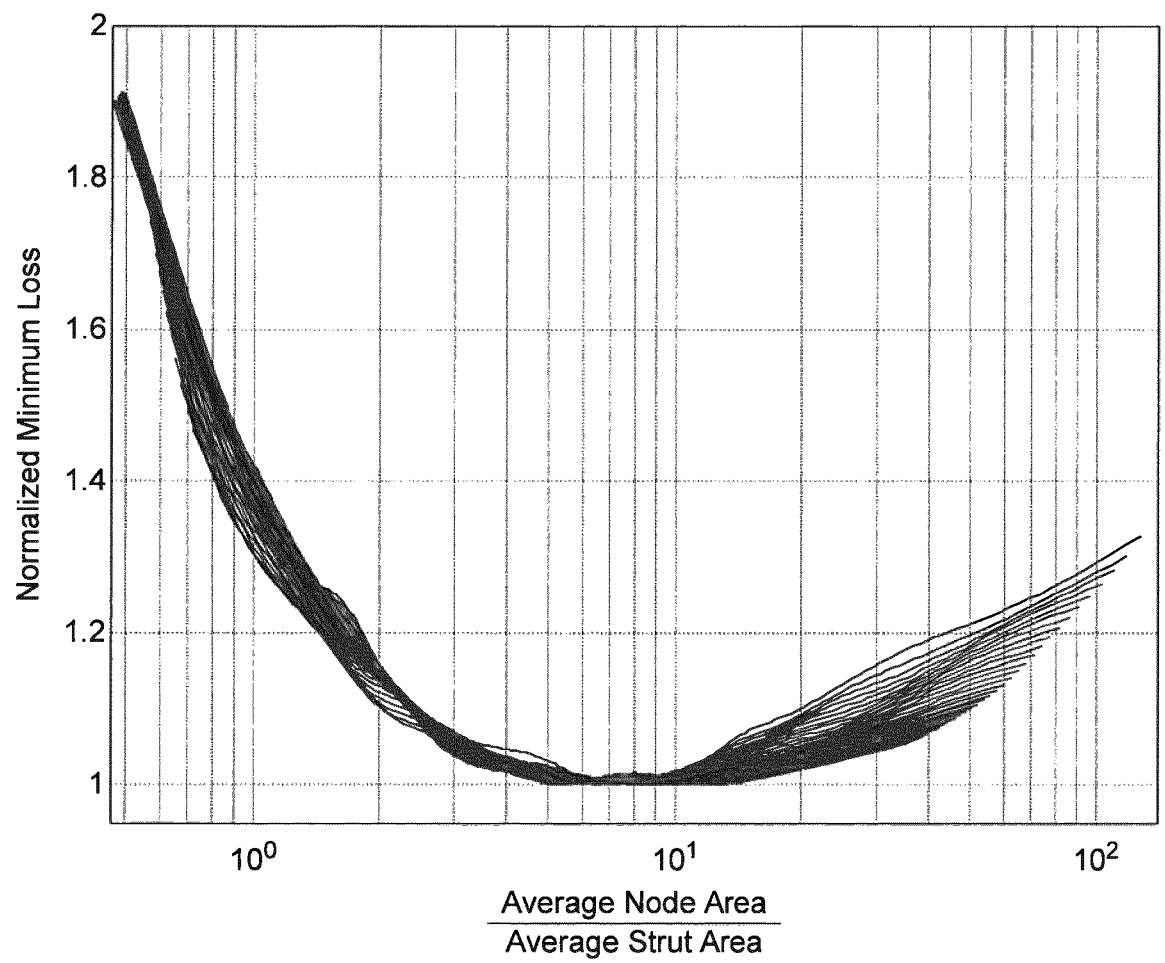
FIG. 7 illustrates plots of the simulated loss of the fiber of FIG. 3 as a function of a ratio of the area of the struts to the area of the nodes.

Furthermore, as illustrated in FIG. 7, which illustrates plots of the simulated loss for the fiber of FIG. 3 as a function of a ratio of the average area of the struts 109 to the average area of the nodes 111, the present invention allows for reduction of loss by optimizing the area of the struts 109 in relation to the area of the nodes 111; the various plots being for fibers having a ratio of the average thickness ($t_c$) of the struts 109 to the average spacing of the nodes 111 in the range of from 1.7% to 8.6%.

For the purposes of calculation, the area of each strut 109 is the area over which the strut 109 has a substantially uniform thickness, and the area of each node 111 is the area enclosed between three adjoining struts 109 of substantially uniform thickness.

In the present invention, loss is minimized by providing that the ratio of the average area of the nodes 111 to the average area of the struts 109 is from about 1 to about 30, preferably from about 1 to about 20, still more preferably from about 2 to about 20, yet more preferably from about 4 to about 13, yet still more preferably from about 4 to about 10, and still yet more preferably from about 6 to about 10.

Figure 8:
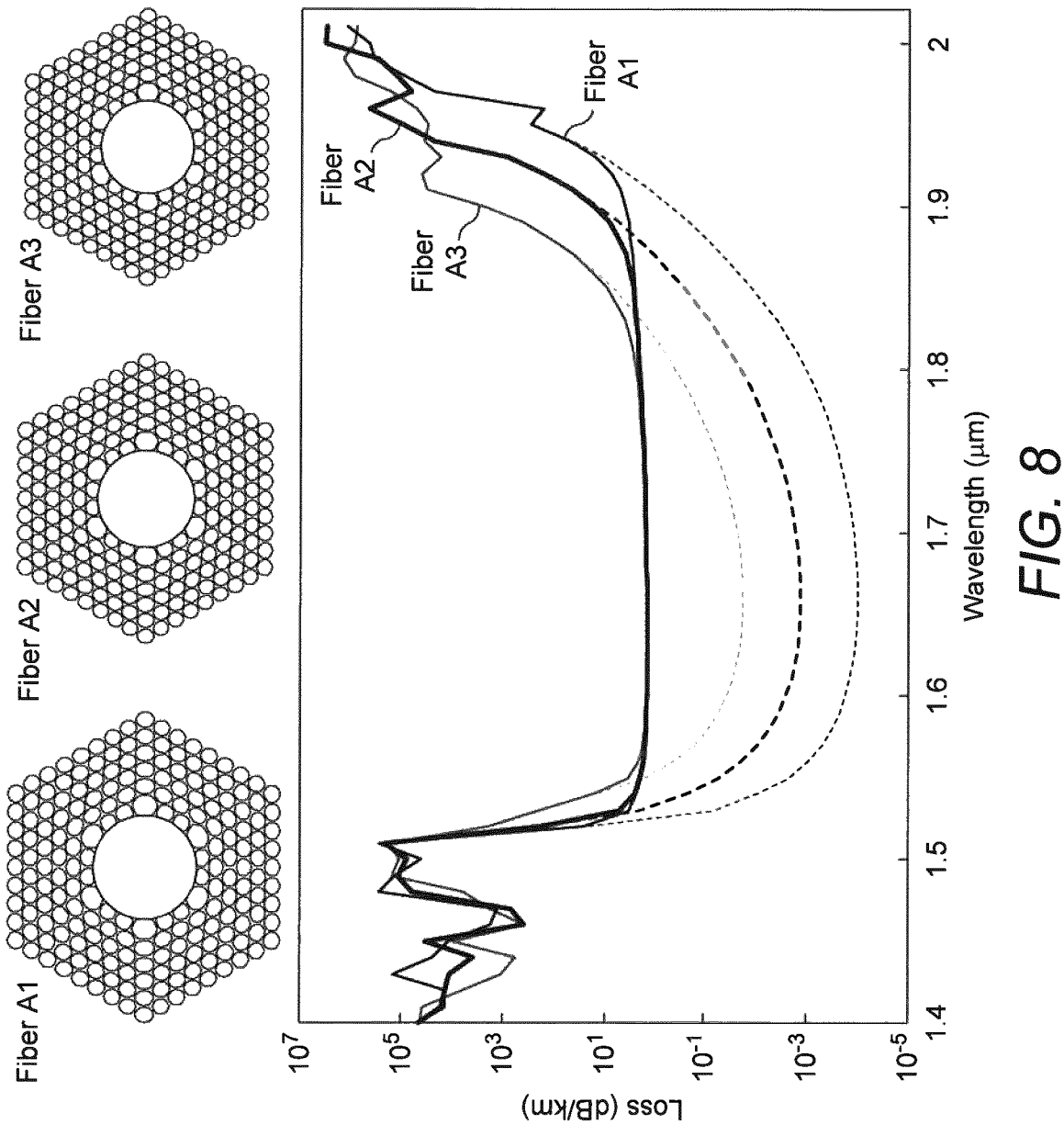
FIG. 8 illustrates plots of the simulated loss as a function of cladding thickness for the fiber of FIG. 3.

FIG. 8 illustrates plots of the simulated loss as a function of wavelength for three exemplary fibers, here in accordance with the fiber of FIG. 2, each having the same effective core diameter and the same effective diameter for the first two rings of cavities 115, but with a decreasing thickness to the remaining, outer rings of cavities 115. In this embodiment the decreased thickness of the outer rings of cavities 115 is achieved by radial compression.

In the first fiber (Fiber A1), the core 115 has an effective core radius ($R_{core}$) of 13 μm, the ratio of the effective core diameter ($D_{core}$) to the effective cladding diameter ($D_{cladding}$) is 0.31, whereby the thickness of the microstructured cladding in the radial direction is 28.93 μm, the average strut thickness ($t_c$) is 110 nm, the fillet radius ($r_c/W$) is 0.21, where W is the average diameter of the cavities 115, and the photonic bandgap is centered around a wavelength of 1.7 μm.

In the second fiber (Fiber A2), the core 115 has an effective core radius ($R_{core}$) of 13 μm, the thickness of the microstructured cladding in the radial direction is 26.84 μm (95% of that of Fiber A1), the average strut thickness ($t_c$) is 110 nm, the fillet radius ($r_c/W$) is 0.21, and the photonic bandgap is centered around a wavelength of 1.65 μm.

In the third fiber (Fiber A3), the core 115 has an effective core radius ($R_c$) of 13 μm, the thickness of the microstructured cladding in the radial direction is 24.74 μm (90% of that of Fiber A1), the average strut thickness ($t_c$) is 110 nm, the fillet radius ($r_c/W$) is 0.21, and the photonic bandgap is centered around a wavelength of 1.625 μm.

As can be seen from FIG. 8, confinement loss, plotted in dotted lines, increases by more than an order of magnitude for each progressive cladding compression, and contributes to a net reduction in the overall transmission bandwidth. The narrower bandwidth results from more closely spaced nodes (narrowing the photonic bandgap) and a thinner air cavity region surrounding the core (increasing the confinement loss). However, at wavelengths well within the bandgap, all fibers have essentially the same value of total loss, which confirms that loss is dominated by scattering from surface roughness, which is mostly unaffected by the structure beyond the second ring of cavities 115. As a result, the HC-PBGF of the present invention advantageously is robust to slight distortions beyond the second ring of air holes 115.

Figure 9:
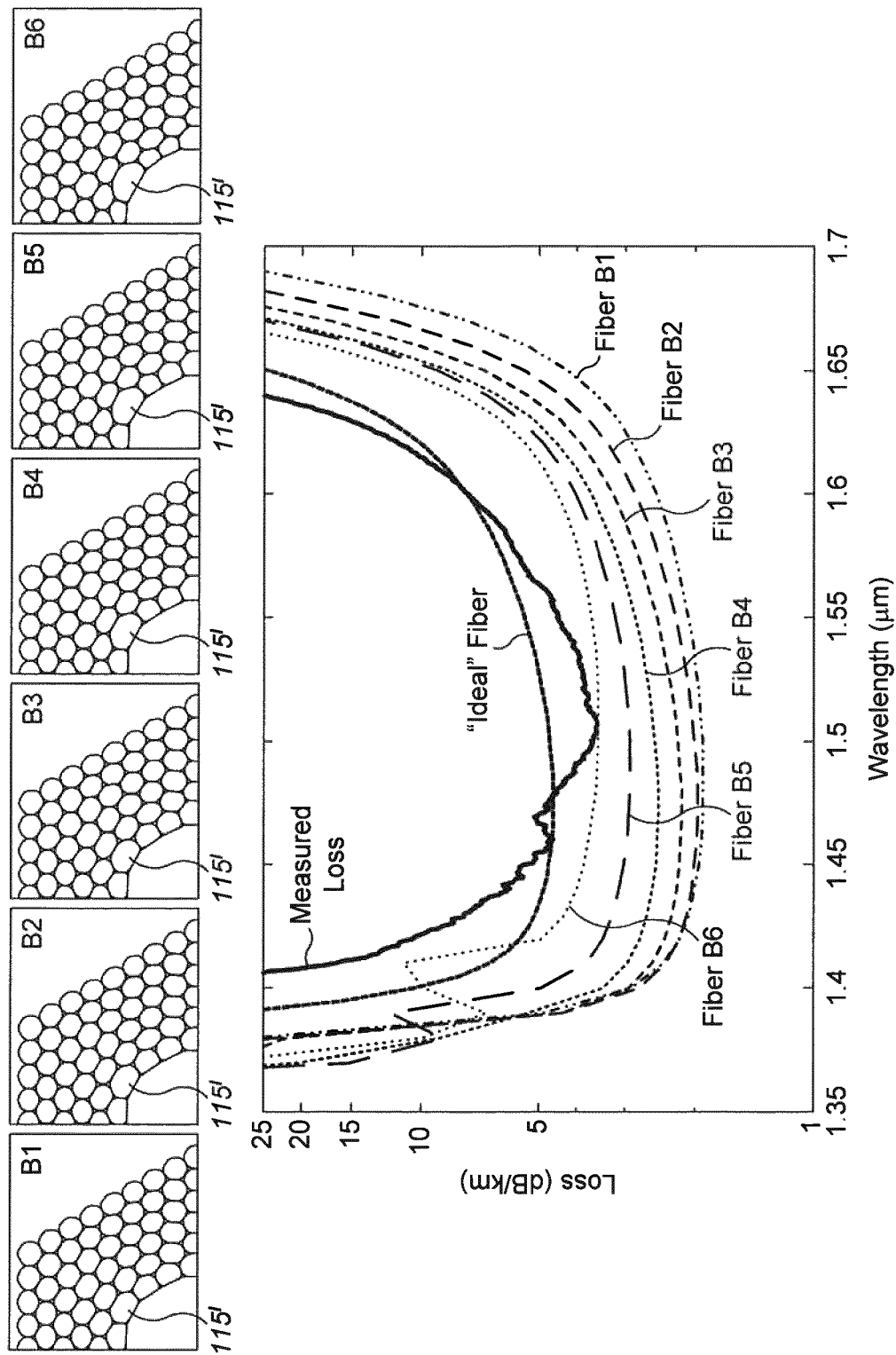
FIG. 9 illustrates plots of the simulated loss as a function of the size of the "corner" cavities for the fiber of FIG. 3 and the "ideal" fiber of FIG. 1.

FIG. 9 illustrates plots of simulated loss as a function of the size of the oversized "corner" cavities 115' at the core boundary 107 for six fibers (Fibers B1 to B6) in accordance with the embodiment of FIG. 3. Also superposed is the loss plot for the "ideal" fiber of FIG. 1, and the cutback measurement for the fabricated "ideal" fiber [1].

These oversized "corner" cavities arise as a natural consequence of surface tension trying to create a circular core surround from an original hexagonal structure, and in an alternative embodiment could be undersized.

In this embodiment the fiber has an effective core diameter ($D_{core}$) of 26 μm, the ratio of the core diameter ($D_{core}=2R_c$) to the cladding diameter ($D_{cladding}$) is 0.36 (which compares to 0.31 for the embodiment of FIG. 2), the average thickness ($t_c$) of the cladding struts 111 is 110 nm, the average thickness ($t_c$) of the core struts 111', which define the core boundary 107, is 55 nm and the fillet radius ($r_c/W$) is 0.21.

In this embodiment the length uniformity (Q) of the pitches of the adjacent core nodes 109' for each of the Fibers B1 to B6, which is given by a ratio between the length difference between the longest and shortest pitches (Δl) and the average length of the pitches of the core nodes 109' (mean(l)), is 0.01, 0.15, 0.29, 0.45, 0.57 and 0.74, which compares to a length uniformity (Q) of 0.536 for the "ideal" fiber of FIG. 1.

In addition, conservation of the glass volume in the struts 109, 109' was imposed, resulting in struts 111, 111' longer than average being thinner than and vice-versa for shorter struts 109, 109'.

In Fibers B1 to B6, the size of the corner holes was increased in incremental steps from 2.8 $R_c/(5\sqrt{3})$ to 4.8 $R_c/(5\sqrt{3})$, and the mode profiles and loss computed for all wavelengths across the bandgap.

As before, the scattering loss contribution remains dominant for the six ring structures. Although the leakage loss contribution in the fiber with the most enlarged "corner" holes 115' (Fiber B6) is twice as much as for the fiber with the least enlarged "corner" holes 115' (Fiber B1), this still only amounts to 0.035 dB/km, which is a small fraction of the total loss.

As can be seen from FIG. 9, fibers with larger corner holes 115' suffer from higher losses. The larger corner holes 115' impose larger gaps between the nodes 111' on the core boundary 107, and such gaps prompt the electric field to overlap more strongly with the scattering surfaces, generating a significantly higher scattering loss, as illustrated in the contour plots of FIGS. 10(a) and (b), which illustrate the contour lines for the time average power flow in the z-direction over a 30 dB range at 2 dB intervals for Fibers B1 and B6, Fiber B1 not only results in reduced overlap of the guided field with the scattering surfaces, but also avoids introducing surface modes within the photonic bandgap.

It is striking to note that the structure considered to date to be the "ideal" fiber design, as illustrated in FIG. 1, is that which provides the highest loss, despite featuring a core surround that preserves the periodicity of the structure. As discussed above, this is due to a smaller core diameter ($D_{core}$), but also because the pitch of the nodes 111' on the core boundary 107 is not uniform, which in combination leads to the loss in this "ideal" fiber being 2.4 times higher than that of Fiber B1, in which the nodes 111' on the core boundary are equidistant.

FIG. 11 illustrates plots of loss as a function or core wall thickness for fibers (Fibers C1 to C3) in accordance with the embodiment of FIG. 3, where each having equi-spaced core nodes 111' and having no core tube and core tubes of the same thickness as the capillaries in the starting stack and 1.25 times the thickness of the capillaries in the starting stack.

As will be seen, when mass conservation is applied to the wall at the core boundary 107 in the absence of core tube in the preform (Fiber C1), the fundamental mode bandwidth is wide and loss remains low. Additionally, the effective indices of all the guided modes are clearly separated.

When the core wall thickness is increased by, for example, introducing a core tube as thick as the cladding capillaries (Fiber C2), there is only a small bandwidth or loss penalty for fundamental mode transmission, with the minimum loss increasing from 2 to 2.4 dB/km, with a 10 nm reduction in the bandwidth.

In this embodiment the surface modes introduced cross the fundamental mode near the short wavelength edge of the photonic bandgap, ensuring that the bandwidth for the fundamental mode remains largely unaffected. Higher order modes, however, interact with these surface modes near the center of the bandgap and therefore suffer a severe reduction in bandwidth. This also confirms that the design with equal node spacing on the core boundary 107 not only provides the lowest loss but is also more tolerant to thicker in core wall.

Further increasing the core wall thickness (Fiber C3) has limiting effects on performance. As can be seen, when a core tube which is 1.25 times thicker than the capillaries is used, surface modes anti-cross with the fundamental mode near the middle of the bandgap, resulting in higher losses and severe reduction in bandwidth.

FIG. 12 illustrates plots of loss as a function or more wall thickness for fibers (Fibers D1 to D3) in accordance with the embodiment of FIG. 3, where each having oversized "corner" cavities 115' and having no core tube and core tubes of the same thickness as the capillaries in the starting stack and 1.25 times the thickness of the capillaries in the starting stack, following fibers C1 to C3.

As will be seen, the reduction in bandwidth and increase in loss is clearly more noticeable for fibers with oversized "corner" holes 115', increasing from a minimum of 2.9 dB/km over a bandwidth of 230 nm (Fiber D1) to 4.6 dB/km over a bandwidth of 160 nm (Fiber D2).

Similarly to Fiber C3, further increasing the core wall thickness (Fiber D3) has significant limiting effects on performance.

FIG. 13(a) illustrates plots of dispersion for fibers in accordance with the embodiment of FIG. 3, with the nodes 111' at the core boundary 107 having a size of approximately 0.6 (Fiber E1), 1 (Fiber E2) and 1.4 (Fiber E3) times the average size of the nodes 111 within the body of the cladding 105.

In this embodiment the pitch of the cavities 115 ($\Lambda$) is 3.03 µm, d/$\Lambda$ is 0.987 and $D_c$/W is 0.6, where W is the average effective internal diameter of the cavities 115.

As can be seen, the fiber of the present invention allows readily for engineered dispersion through adjustment of the size of the core nodes 111' at the core boundary 107.

FIG. 13(b) illustrates plots of loss as a function of node size, corresponding to FIG. 13(a).

As regards application, the HC-PBGF of the present invention has diverse application, including optical fiber communication systems, in particular ultrahigh capacity, ultralong haul systems and low latency short haul systems (such as of interest to financial trading firms/banks), datacomms, in particular low latency fiber links in datacentres and supercomputers, large scale high-energy physics (HEP), in particular use for low latency data transfer in detector arrays and for timing synchronisation, high-power laser delivery, in particular continuous-wave and pulsed radiation formats at diverse wavelengths, and gas sensing, in particular compact gas cells for environmental sensing/laser stabilisation.

FIG. 14(a) to (g) illustrate a conventional fabrication method for the fabrication of HC-PBGFs.

Figure 14A:
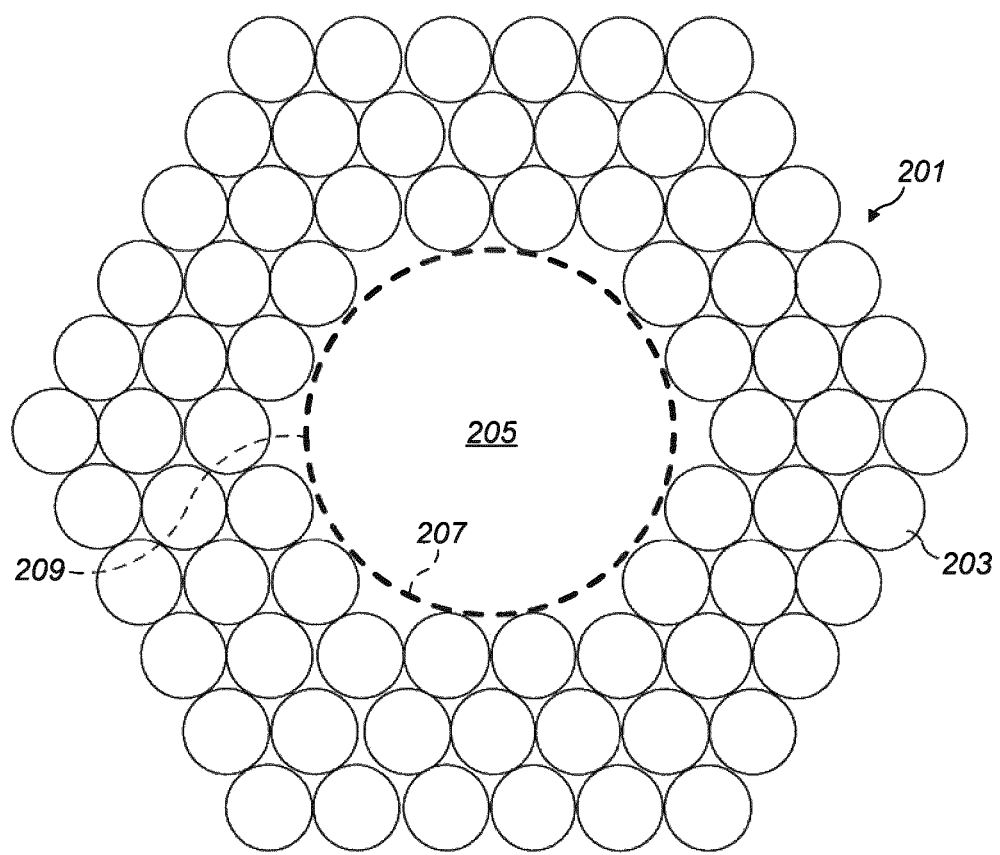

In a first step, as illustrated in FIG. 14(a), a pre-form stack 201 is formed of millimeter-sized hollow capillaries 203, with a predetermined number of capillaries 203 being omitted from a core 205 of the stack 201 in dependence upon the required size of the core of the final, finished fiber. For ease of illustration, only the innermost rings of capillaries 203 are illustrated, and, in practice, the array of capillaries 203 would be enclosed by a jacket tube, optionally with solid packaging rods to fill voids between the outermost capillaries 203 and the jacket tube. In this embodiment the pre-form stack 201 is formed around a core tube 207, which is optional and defines a core boundary 209.

The illustrated fiber is for a nineteen cell (19c) fiber, where nineteen capillaries 203 are omitted to define the core 205 of the stack 201.

As noted hereinabove in relation to FIG. 1, this conventional fabrication method yields a fiber in which the core struts 9' have unequal length and mass, as a consequence of the necessity for a periodic arrangement of the cavities 15 which are derived from the capillaries 203.

Figure 14B:
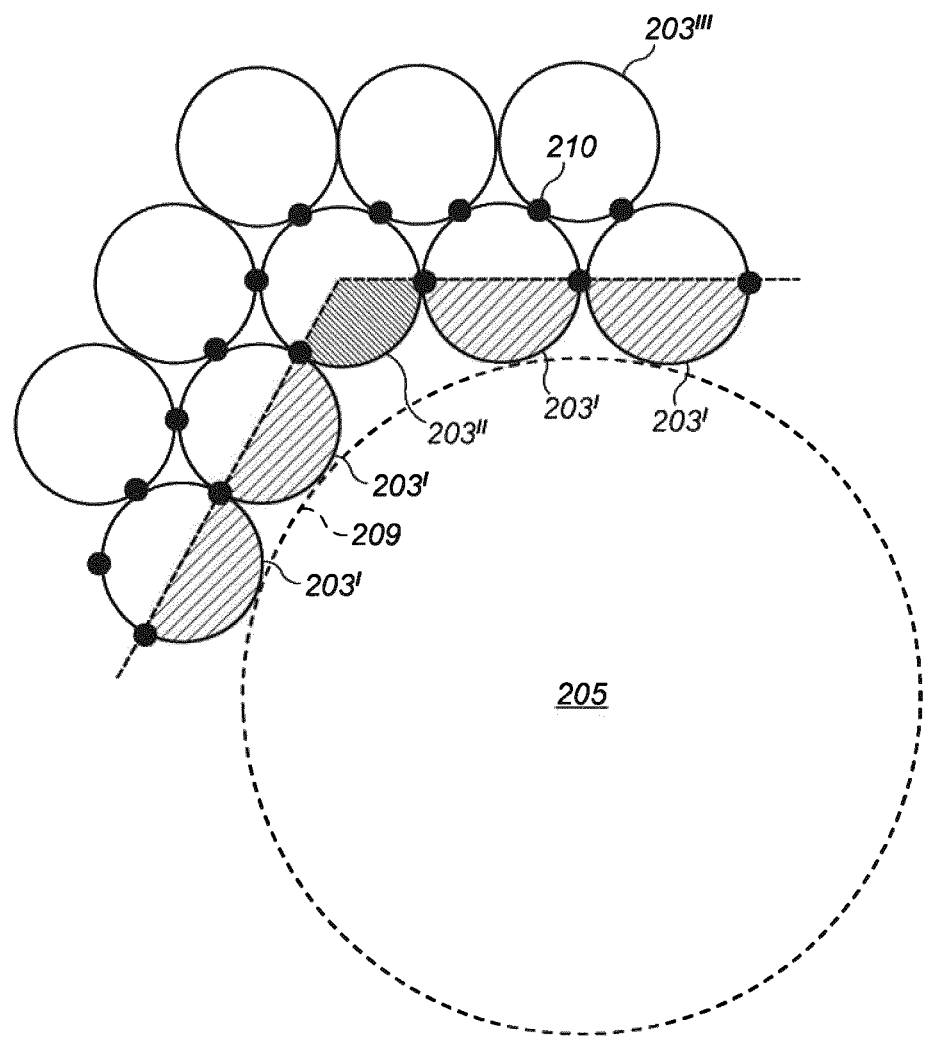

FIG. 14(b) illustrates the arrangement of the capillaries 203 at the core boundary 209 and the contact points 210 therebetween.

Figure 14C:
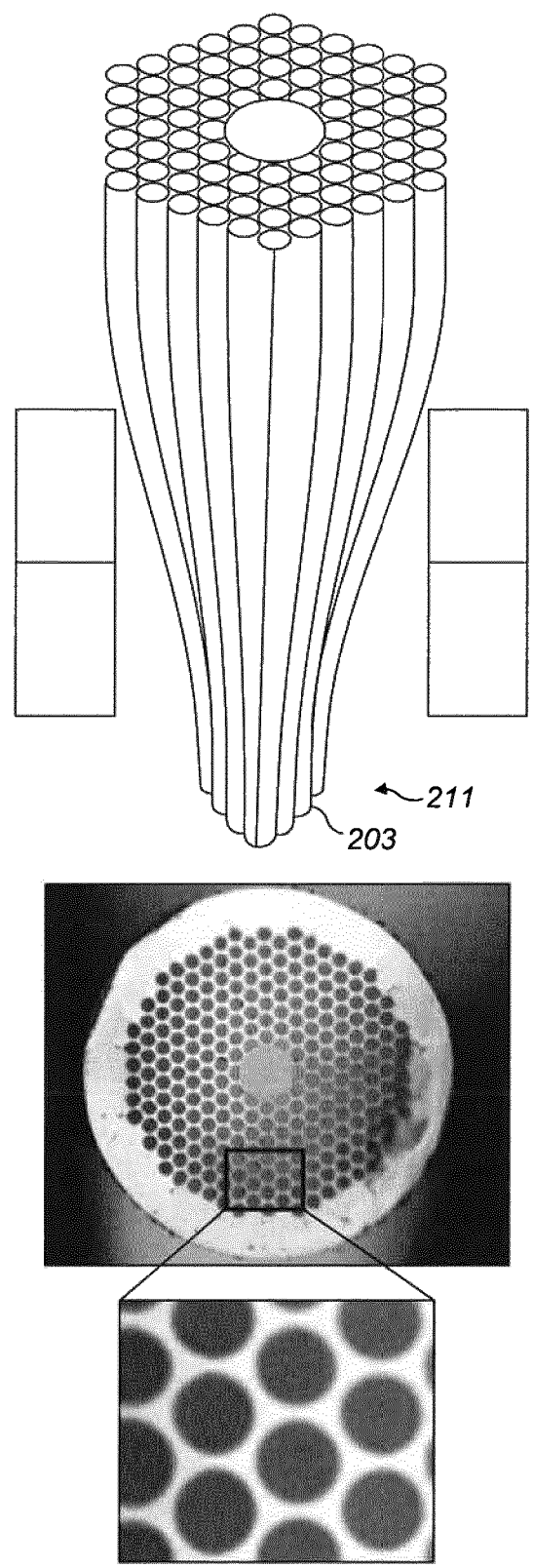

In a subsequent step, as illustrated in FIG. 14(c), the pre-form stack 201 is heated to soften the glass structure, and the stack 201 is drawn to form canes 211 which have a reduced diameter, typically a few millimeters in diameter, and in which the capillaries 203 are fused together, at least at the contact points 210. An appropriate pressure differential can be used to assist this process and collapse the gaps between the capillaries 203.

Figure 14D:
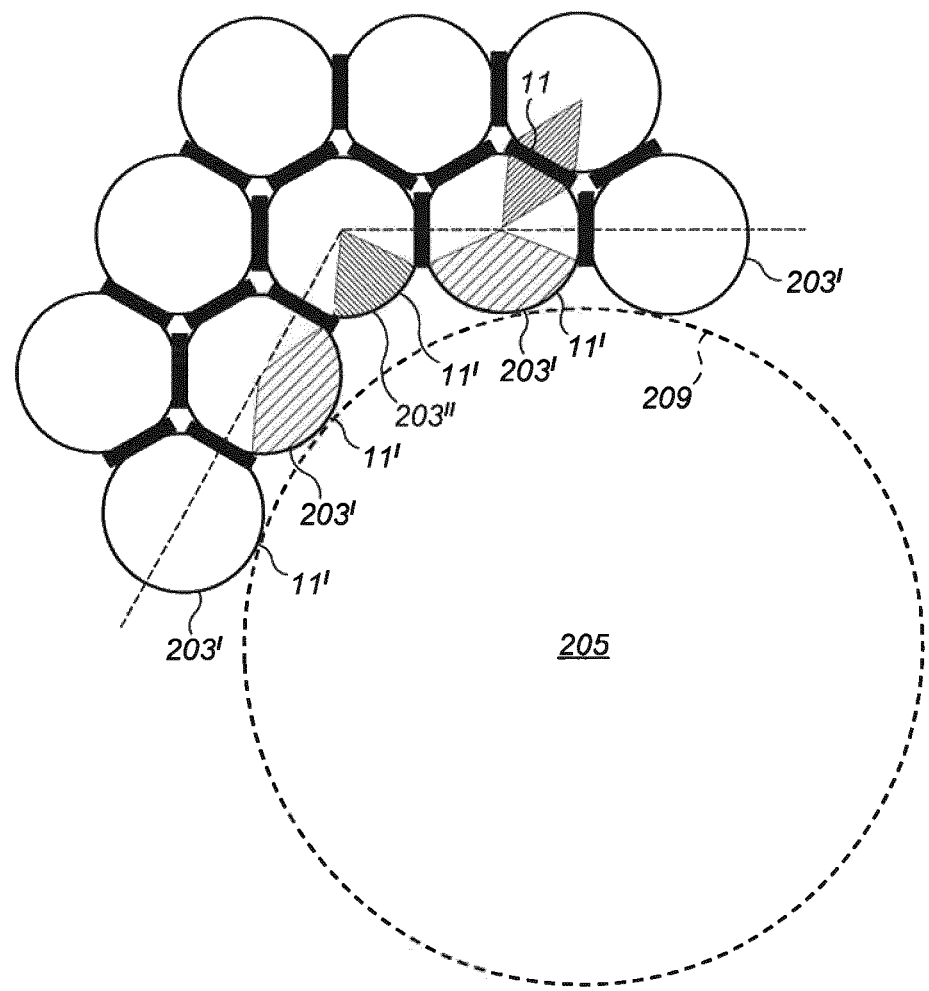

In this process, as illustrated in FIG. 14(d), cladding struts 11 of the finished fiber begin to form at the contact points 210 between adjacent capillaries 203, and core struts 11' in the finished fiber form at the surfaces of the capillaries 203 which are presented to the core 205.

Figure 14E:
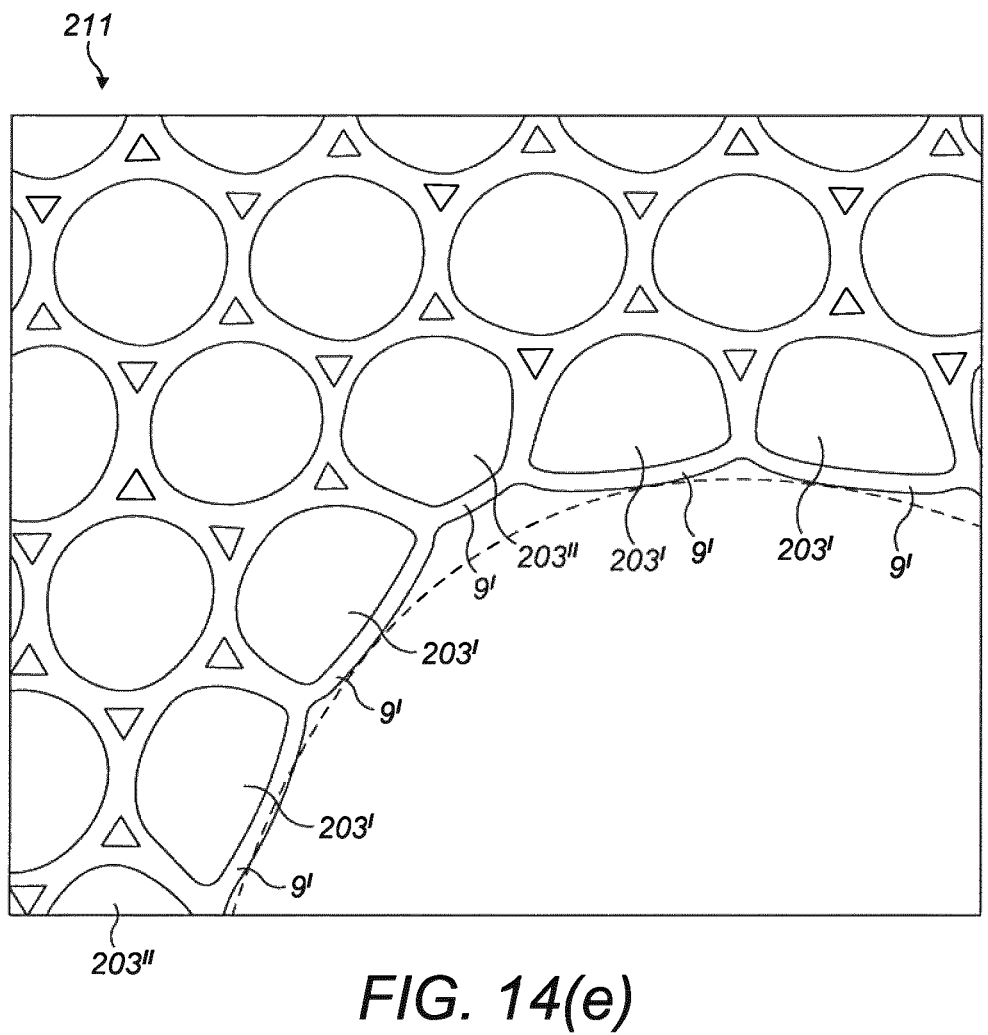

FIG. 14(e) illustrates the structure of a resulting cane 211.

Figure 14F:
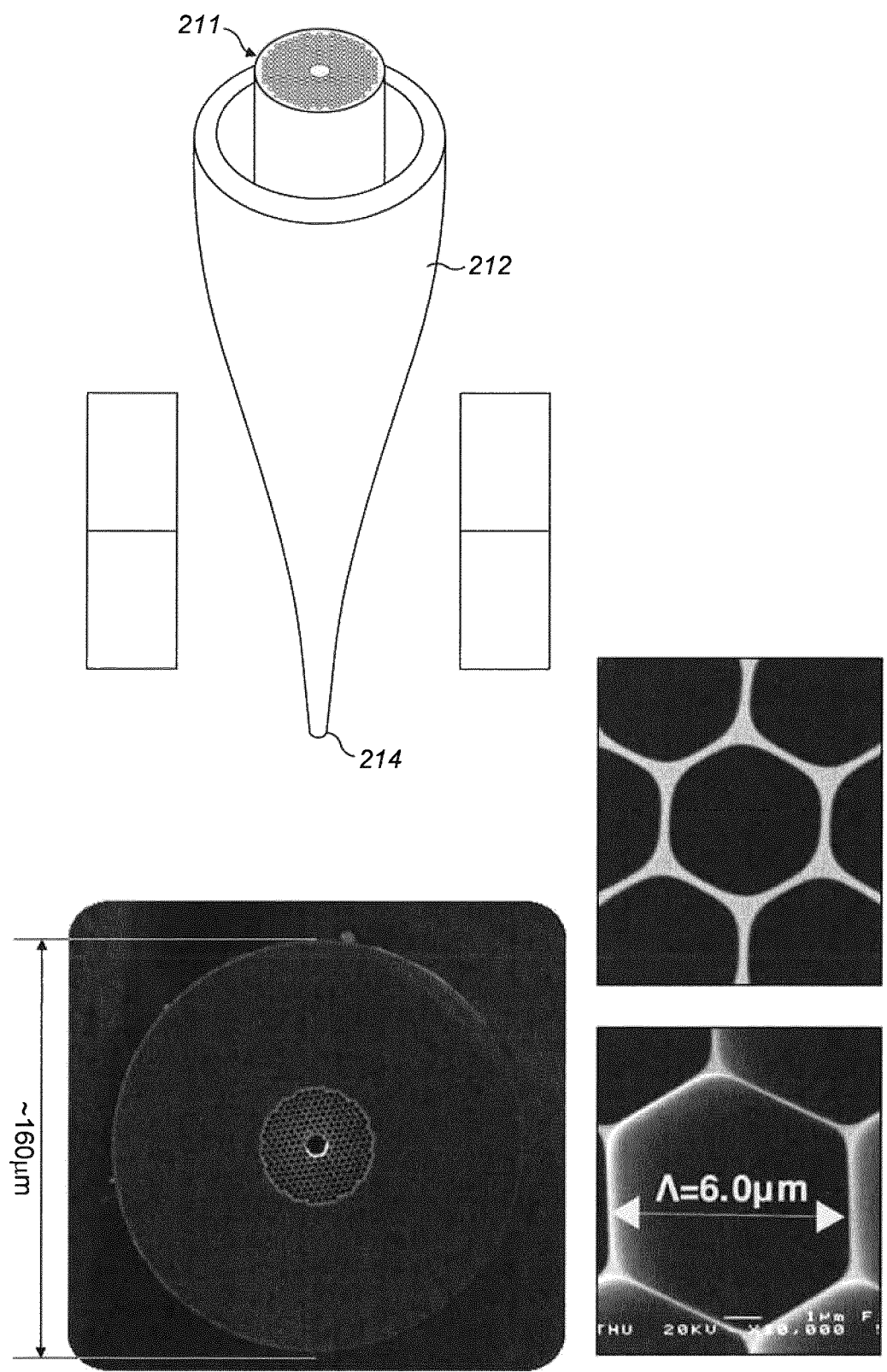

In a further step, as illustrated in FIG. 14(f), the cane 211 is clad in a jacket tube 212, here a glass tube, a vacuum is applied to the annular space between the jacket tube 212 and the exterior surface of the cane 211 and a positive pressure is separately applied within the core 205 and the capillaries 203, and the glass structure is softened by heating and drawn to form a fiber 214 of a required diameter. In the fiber draw process, the cane 211 is stretched longitudinally, but, due to the applied positive pressure within the core 205 and the capillaries 203, the core and cladding structure are also expanded (in relation to the structure of the cane 211) in the transverse plane of the fiber, as the fiber is progressively stretched, and, as a result the struts 11 of the finished fiber being formed are stretched.

Before drawing the cane 211, the corner core capillaries 203" present a shorter length between the contact points 210, as highlighted in FIG. 14(d), and hence present less mass to the core boundary 209 as compared to the intermediate core capillaries 203', with the arcuate segments of the corner core capillaries 203" each presenting a volume of $\frac{2}{3}.\pi Rt$ and the arcuate segments of the intermediate core capillaries 203' each presenting a volume of $\pi Rt$, where R is the radius of the capillaries 203', 203" and t is the thickness of the walls of the capillaries 203', 203".

Figure 14G:
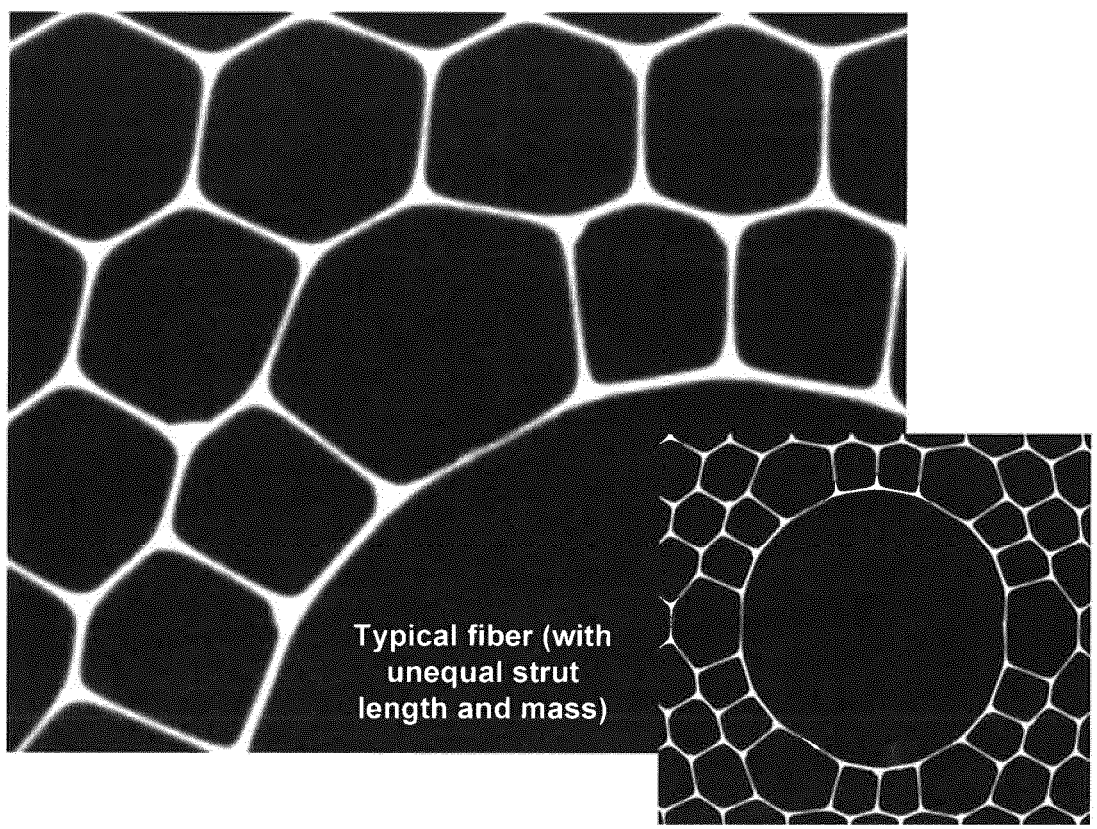

FIG. 14(g) illustrates a fiber which results from this conventional fabrication method. As will be seen, because of the reduced volume of glass available at the corner core capillaries 203", the corner core capillaries 203" are preferentially stretched in relation to the intermediate core capillaries 203', and the resulting corner core struts 9' in the finished fiber are longer and have a reduced thickness as compared to the intermediate core struts 9' in the finished fiber, which results in the core struts 9' having a significant variation in length.

It is an aim of the present invention to provide improved or alternative fabrication methods for fabricating HC-PBGFs as compared to the conventional fabrication method.

FIGS. 15(a) and (b) illustrate a fabrication method for fabricating HC-PBGFs in accordance with a first embodiment of the present invention.

In this embodiment the corner core capillaries 203" have a non-circular section, such that the length, and hence mass, presented by the corner core struts 109' in the finished fiber, as derived from the corner core capillaries 203", is equivalent to the length, and hence mass, presented by intermediate core struts 109' in the finished fiber, as derived from the intermediate core capillaries 203'.

With this arrangement, the core struts 109' in the finished fiber have substantially equal length and mass, but the cavities 115 are non-periodic. As noted hereinabove, the present inventors have recognized that periodicity of the cavities 115 is not an essential requirement where the core struts 109' in the finished fiber have substantially equal length.

In this embodiment the corner core capillaries 203" are oval in cross-section, but other sections could be employed, especially elongated sections, such as rectangular and teardrop sections, as illustrated in FIGS. 16 and 17.

FIG. 18 illustrates a fabrication method for fabricating HC-PBGFs in accordance with a second embodiment of the present invention.

In this embodiment the corner core capillaries 203" include an additional mass segment 221 at a surface thereof which is arranged to face the core 205 between adjacent intermediate core capillaries 203', whereby the mass presented by the corner core struts 109' in the finished fiber, as derived from the corner core capillaries 203", is equivalent to that presented by the intermediate core struts 111' in the finished fiber, as derived from the intermediate core capillaries 203'.

In this embodiment the mass segment 221 is at an external surface of the corner core capillary 203".

In this embodiment the mass segment 221 is integrally formed with a body of the corner core capillary 203", here comprising a thickened wall section of the corner core capillary 203".

In this embodiment the mass segment 221 is arcuate in section, but could have other shape which provides for equalization of the volumes of the core struts 109' in the finished fiber.

With this arrangement, the core struts 109' in the finished fiber have equal length and mass, but the cavities 115, as derived from the capillaries 203, are non-periodic. As noted hereinabove, the present inventors have recognized that periodicity of the cavities 115 is not an essential requirement where the core struts 111' in the finished fiber have substantially equal length.

In an alternative embodiment, as illustrated in FIG. 19, the mass segment 221 could be an element separate to a body of the corner core capillary 203". In this embodiment the mass segment 221 is a strip, here a flat strip, but could have other shape which provides for equalization of the volumes of the core struts 109' in the finished fiber.

In another alternative embodiment, as illustrated in FIG. 20, the mass segment 221 could be provided at an internal surface of the corner core capillary 203".

FIG. 21 illustrates a fabrication method for fabricating HC-PBGFs in accordance with a third embodiment of the present invention.

In this embodiment the intermediate core capillaries 203' include a reduced mass segment 231 which is arranged to face the core 205, whereby the mass presented by the intermediate core struts 109', as derived from the intermediate core capillaries 203', is equivalent to that presented by the corner core struts 109', as derived from the corner core capillaries 203".

In this embodiment the reduced mass segment 231 comprises a thinned wall section of the intermediate core capillaries 203'.

In this embodiment the reduced mass segment 231 is a thinned internal wall section.

In an alternative embodiment the reduced mass segment 231 could be a thinned external wall section.

In this embodiment the reduced mass segment 231 is arcuate in section.

With this arrangement, the core struts 109' in the finished fiber have equal length and mass, but the cavities 115 are non-periodic. As noted hereinabove, the present inventors have recognized that periodicity of the cavities 115 is not an essential requirement where the core struts 109' have substantially equal length.

FIG. 22 illustrates a fabrication method for fabricating HC-PBGFs in accordance with a fourth embodiment of the present invention.

In this embodiment a core tube 241 is utilized, which includes additional mass segments 243 at a surface thereof in correspondence to the positions of the corner core capillaries 203", whereby the mass of the additional mass segments 243 supplements the mass of the corner core capillaries 203", such that the mass provided by each additional mass segment 243 and respective corner core capillary 203" in combination is equivalent to the mass presented by the intermediate core capillaries 203'.

In this embodiment the additional mass segments 243 are at an external surface of the core tube 241.

With this arrangement, the core struts 109' in the finished fiber have equal length and mass, but the cavities 115 are non-periodic. As noted hereinabove, the present inventors have recognized that periodicity of the cavities 115 is not an essential requirement where the core struts 109' in the finished fiber have substantially equal length and mass.

In an alternative embodiment, as illustrated in FIG. 23, the mass segments 243 could be at an internal surface of the core tube 241.

In another alternative embodiment, as illustrated in FIG. 24, the mass segments 243 project both from internal and external surfaces of the core tube 241.

In this embodiment, as illustrated in FIG. 25, the core tube 241 is fabricated by collapsing an arrangement of higher-mass elements 251 and lower-mass elements 253 between two concentric tubes 255, 257, here by application of vacuum in a heated environment which causes melting of the glass structure.

In this embodiment the higher-mass elements 251 are located at positions corresponding to the corner core capillaries 203".

In this embodiment the higher-mass elements 251 comprise solid rods and the lower-mass elements 253 comprise capillaries.

In one embodiment, as illustrated in FIG. 26(a) to (c), additional mass elements 259 can be utilized in combination with the core tube 241, in order to control the size of the intermediate core nodes 111' in the finished fiber, as derived from junctions intermediate the corner core capillaries 203".

In this embodiment the additional mass elements 259 comprise solid rods of smaller diameter than the core capillaries 203', 203", but alternatively could comprise capillaries which collapse to rods during fabrication.

In an alternative embodiment the core tube 241 could include the additional mass elements 259 as an integral part thereof.

FIG. 27 illustrates a fabrication method for fabricating HC-PBGFs in accordance with a fifth embodiment of the present invention.

In this embodiment a hexagonal core tube 261 is utilized, which provides six planar side members 263, adjacent ones of which meet at corner junctions 265, which correspond in position to the corner core capillaries 203".

In one embodiment the corner junctions 265 can be arcuate.

In one embodiment the core tube 261 includes additional mass segments 267 at the corner junctions 265, whereby the mass of the additional mass segments 267 supplements the mass of the corner core capillaries 203", such that the mass provided by each additional mass segment 267 and respective corner core capillary 203" in combination is equivalent to the mass presented by the intermediate core capillaries 203'.

In this embodiment the additional mass segments 267 can be integrally formed with a body of the core tube 261, for example, as a fillet.

With this arrangement, the resulting core struts 109' in the finished fiber have equal length and mass, but the cavities 115 are non-periodic. As noted hereinabove, the present inventors have recognized that periodicity of the cavities 115 is not an essential requirement where the core struts 109' in the finished fiber have substantially equal length and mass.

FIG. 28 illustrates a fabrication method for fabricating HC-PBGFs in accordance with a sixth embodiment of the present invention.

In this embodiment the corner core capillaries 203" and the outer, cladding capillaries 203''' have a hexagonal outer section, and the intermediate core capillaries 203' have a frusto-hexagonal outer section, here a pentagonal outer profile.

With this arrangement, the core capillaries 203', 203" present a substantially continuous surface at the core 205, in this embodiment substantially hexagonal in sectional shape at the core boundary 209. In an alternative embodiment the continuous surface at the core 205 could have another polygonal sectional shape, such as octagonal. In this embodiment the core 205 will become substantially circular following drawing, as a consequence of surface tension.

In this embodiment the thicknesses ($t_c$, $t_f$) of the wall sections of the corner core capillaries 203" and the intermediate core capillaries 203' are sized such that, following drawing of the fiber, the core struts 109' in the finished fiber have substantially equal length and mass.

In this embodiment the core capillaries 203', 203" have a circular or part-circular internal section.

In an alternative embodiment, as illustrated in FIG. 29, the capillaries 203', 203", 203''' could have a hexagonal or frusto-hexagonal internal section, here pentagonal. In other embodiments the capillaries 203', 203", 203''' could have other internal sectional shapes, including other polygonal shapes or shapes intermediate circular and hexagonal.

With this arrangement, the resulting core struts 109' in the finished fiber have equal length and mass, but the cavities 115 are non-periodic. As noted hereinabove, the present inventors have recognized that periodicity of the cavities 115 is not an essential requirement where the core struts 109' in the finished fiber have substantially equal length.

FIGS. 30(*a*) and (*b*) illustrate a fabrication method for fabricating HC-PBGFs in accordance with a seventh embodiment of the present invention.

In this embodiment the core capillaries 303 are located on a circle of predetermined diameter, about which further, outer capillaries 303' are packed, here in hexagonal relation.

In this embodiment the core capillaries 303 are provided as a core assembly 304, in which the core capillaries 303 are fused together.

In this embodiment the core capillaries 303 are located about a core tube 307.

In this embodiment additional mass elements 311 are located at the junctions of each of the core capillaries 303, in order to provide for increased mass at the nodes 111' in the finished fiber which result from these junctions.

In an alternative embodiment, instead of fusing the core capillaries 303 or additionally thereto, the core capillaries 303 could be provided between the core tube 307 and an outer tube, with the outer tube being a thin tube in one embodiment, thinner than the core tube 307, for purposes of retaining the core capillaries 303 in position.

With this arrangement, the core struts 109' in the finished fiber have equal length and mass, but the cavities 115 are non-periodic. As noted hereinabove, the present inventors have recognized that periodicity of the cavities 115 is not an essential requirement where the core struts 109' have substantially equal length.

Figure 15B:
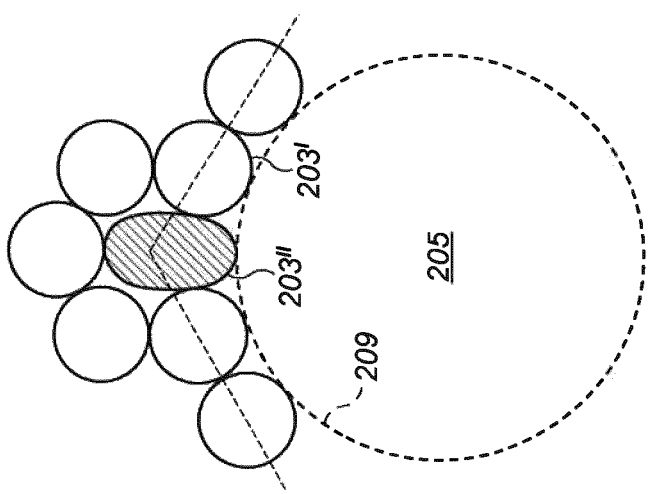

In an alternative embodiment, and similarly to the first-described embodiment of FIGS. 15(*a*) and (*b*), the corner cladding capillaries 303" in a second or subsequent capillary ring, which is outwardly of the core assembly 304, has a non-circular section, such that the outer rings have a tight packing and undesired cladding distortions are prevented.

In this embodiment the corner cladding capillaries 303" are oval in cross-section, but other sections could be employed, such as rectangular and teardrop, as illustrated hereinabove in relation to FIGS. 16 and 17.

FIG. 32 illustrates a fabrication method for fabricating HC-PBGFs in accordance with an eighth embodiment of the present invention.

In this embodiment a pressure is applied to the corner core capillaries 403" independently of the core 405, the intermediate core capillaries 403' and the outer cladding capillaries 403'''.

By providing a pressure differential, here a positive pressure differential, the size of the corner core capillaries 403" can be controlled in relation to the intermediate core capillaries 403', such that the core struts 109' in the finished fiber have equal length and mass, whilst the cavities 115 are non-periodic. As noted hereinabove, the present inventors have recognized that periodicity of the cavities 115 is not an essential requirement where the core struts 109' have substantially equal length.

In this embodiment a first pressure source 406 is applied to the corner core capillaries 403", a second pressure source 407 is applied to the intermediate core capillaries 403' and the outer cladding capillaries 403", and a third pressure source 409 is applied to the core 405.

In this embodiment a greater pressure is applied to the intermediate core capillaries 403' than to the corner core capillaries 403".

In embodiments a pressure differential of at least 0.1 kPa, and optionally less than 2 kPa, is applied between the intermediate core capillaries 403' and the corner core capillaries 403".

It will be understood that this aspect of the fabrication method has application to any of the other-described embodiments, in allowing for control of the relative size of the corner core capillaries 403".

FIG. 33 illustrates a fabrication method for fabricating HC-PBGFs in accordance with a ninth embodiment of the present invention.

In this embodiment the corner core capillaries 503" are formed of a material having a higher thermal viscosity at the drawing temperature than the material of the intermediate core capillaries 503', and also optionally the outer cladding capillaries In this embodiment the capillaries 503', 503", 503''' are formed of a glass composition.

In one embodiment the corner core capillaries 503" are formed of substantially pure silica glass and the intermediate core capillaries 503', and also optionally the outer cladding capillaries 503''', are formed of a doped silica, where the dopant reduces the glass viscosity. In an alternative embodiment the corner core capillaries 503" could also be a doped silica of different kind to the intermediate core capillaries 503' and optionally the outer cladding capillaries 503'".

In this embodiment the silica is halogen doped, here with fluorine, but alternatively the dopant could be chlorine.

In other embodiments the dopants could be any which alter thermal viscosity, such as boron, phosphorus, sodium or titanium.

By virtue of providing a viscosity differential between the corner core capillaries 503" and at least the intermediate core capillaries 503', the size of the corner core capillaries 503" can be regulated in relation to the intermediate core capillaries 503', thereby ensuring that the corner core capillaries 503" do not over-expand in relation to the intermediate core capillaries 503', whereby the core struts 109' in the finished fiber have equal length and mass, whilst the cavities 115 are non-periodic. As noted hereinabove, the present inventors have recognized that periodicity of the cavities 115 is not an essential requirement where the core struts 109' have substantially equal length.

In one embodiment, and following the method of the eighth-described embodiment above, the pressure in the corner core capillaries 503" could be lower or equal to the pressure in the other capillaries 503', 503'".

It will be understood that this aspect of the fabrication method has application to any of the other-described embodiments, in allowing for control of the relative size of the corner core capillaries 503".

FIG. 34 illustrates a fabrication method for fabricating HC-PBGFs in accordance with a tenth embodiment of the present invention.

In this embodiment additional mass segments 604', 604" are located at the junctions between the core capillaries 603', 603", whereby the mass of the additional mass segments 604', 604" supplements the mass of the corner core capillaries 603", such that the mass provided by each additional mass segment 604" and respective corner core capillary 603" in combination is equivalent to the mass presented by the intermediate core capillaries 603', and also supplements the mass at the core boundary 609.

In this embodiment the additional mass segments 604' at the junctions between intermediate core capillaries 603' can be of a different size, and hence mass, to the additional mass segments 604" at the junctions with corner core capillaries 603".

With this arrangement, the core struts 109' in the finished fiber have equal length and mass, and through control of the mass at the core boundary 107 of the finished fiber, the dispersive properties of the fiber can be controlled.

It will be understood that this aspect of the fabrication method has application to any of the other-described embodiments, in allowing for control of the mass at the core boundary 107 in the finished fiber.

FIG. 35 illustrates a fabrication method for fabricating HC-PBGFs in accordance with an eleventh embodiment of the present invention.

In this embodiment the core 705, instead of being empty, includes a core former 711 and the jacket tube 712 is disposed in a mold 715 of counterpart shape to the jacket tube 712, such that the jacket tube 712 is a close fit in the mold 715. With this arrangement, radial expansion of the stack 701 beyond the core former 711 and the mold 715 is prevented, thereby maintaining the effective radial dimension of the stack 701.

In this embodiment the core former 711 is circular in section.

In this embodiment the jacket tube 712 and the mold 715 have a counterpart hexagonal sectional shape.

In this embodiment the core former 711 and the mold 715 are formed of graphite, vitreous carbon or another suitable high-temperature, heat-resistant material.

In this embodiment the core capillaries 703', 703" and the cladding capillaries 703'" are sealed, such that each has an enclosed volume, and any other capillaries included to add to the mass of the core nodes 111' or core struts 109' are open so as to provide for collapse of any such capillaries.

In this embodiment the pre-form stack 701 is subjected to a blow-molding process prior to drawing the cane 211, in which process the stack 701 is heated while a vacuum is applied to the volume within the jacket tube 712, which causes the core capillaries 703', 703" to expand, as a consequence of being enclosed, and this expansion causes the core capillaries 703', 703" to fill voids at the surface of the core former 711. In addition, the outer, cladding capillaries 203" will expand to fill voids at the junctions thereof.

In this embodiment the corner core capillaries 703" each include at least one additional corner mass segment 721, here a plurality of additional corner mass segments 721, which are arranged to face the core 705 between adjacent intermediate core capillaries 703', whereby the mass presented by the core struts 109' in the finished fiber as derived from the corner core capillaries 703" and the corner mass segments 721 in combination is equivalent to that presented by the intermediate core struts 109' in the finished fiber as derived from the intermediate core capillaries 703'.

In this embodiment the additional corner mass segments 721 comprise hollow elements which are open and thus collapse under the applied pressure in the blow-molding process.

In this embodiment the additional corner mass segments 721 comprise capillaries of smaller radial dimension than the corner core capillaries 703".

In this embodiment additional interstitial mass segments 723 are provided at each of the interstices of the capillaries 703', 703", 703'", whereby the mass of the nodes 111, 111' is controlled.

In this embodiment the interstitial mass segments 723 comprise solid elements, here rods, but in an alternative embodiment could be capillaries which are closed in the blow-molding process.

Finally, it will be understood that the present invention has been described in its preferred embodiments and can be modified in many different ways without departing from the scope of the invention as defined by the appended claims.

REFERENCES

1. F. Poletti, N. V. Wheeler, M. N. Petrovich, N. Baddela, E. Numkam Fokoua, J. R. Hayes, D. R. Gray, Z. Li, R. Slavik, and D. J. Richardson, "Towards high-capacity fibre-optic communications at the speed of light in vacuum," Nature Photonics 7, 279-284 (2013).
2. Y. Jung, V. A. J. M. Sleiffer, N. Baddela, M. N. Petrovich, J. R. Hayes, N. V. Wheeler, D. R. Gray, E. Numkam Fokoua, J. P. Wooler, H. H.-L. Wong, F. Parmigiani, S.-U. Alam, J. Surof, M. Kuschnerov, V. Veljanovski, H. de Waardt, F. Poletti, and D. J. Richardson, "First demonstration of a broadband 37-cell hollow core photonic bandgap fiber and its application to high capacity mode division multiplexing," in *Proceedings of the Optical Fiber Communications conference* (2013), paper PDP5A.3 (Postdeadline).

3. P. J. Roberts, F. Couny, H. Sabert, B. J. Mangan, D. P. Williams, L. Farr, M. W. Mason, A. Tomlinson, T. A. Birks, J. C. Knight, and P. S. J. Russell, "Ultimate low loss of hollow-core photonic crystal fibres," Opt. Express 13, 236-244 (2005).
4. E. Numkam Fokoua, F. Poletti, and D. J. Richardson, "Analysis of light scattering from surface roughness in hollow-core photonic bandgap fibers," Opt. Express 20, 20980-20991 (2012).
5. B. J. Mangan, L. Farr, A. Langford, P. J. Roberts, D. P. Williams, F. Couny, M. Lawman, M. Mason, S. Coupland, R. Flea, H. Sabert, T. A. Birks, J. C. Knight, and P. St. J. Russell, "Low loss (1.7 dB/km) hollow core photonic bandgap fiber," in *Proceedings of Optical Fiber Communication Conference* (2004), paper PDP24.
6. P. Roberts, D. Williams, B. Mangan, H. Sabert, F. Couny, W. Wadsworth, T. Birks, J. Knight, and P. Russell, "Realizing low loss air core photonic crystal fibers by exploiting an antiresonant core surround," Opt. Express 13, 8277-8285 (2005).
7. C. M. Smith, N. Venkataraman, M. T. Gallagher, D. Muller, J. A. West, N. F. Borrelli, D. C. Allan, and K. W. Koch, "Low-loss hollow-core silica/air photonic bandgap fibre," Nature 424, 657-659, (2003).
8. R. Amezcua-Correa, N. G. Broderick, M. N. Petrovich, F. Poletti, and D. J. Richardson, "Optimizing the usable bandwidth and loss through core design in realistic hollow-core photonic bandgap fibers," Opt. Express 14, 7974-7985 (2006).
9. R. Amezcua-Correa, N. G. R. Broderick, M. N. Petrovich, F. Poletti, and D. J. Richardson, "Design of 7 and 19 cells core air-guiding photonic crystal fibers for low-loss, wide bandwidth and dispersion controlled operation," Opt. Express 15, 17577-17586 (2007).
10. R. Amezcua-Correa, F. Gèrôme, S. G. Leon-Saval, N. G. R. Broderick, T. A. Birks, and J. C. Knight, "Control of surface modes in low loss hollow-core photonic bandgap fibers," Opt. Express 16, 1142-1149 (2008).
11. M. H. Frosz, J. Nold, T. Weiss, A. Stefani, F. Babic, S. Rammler, and P. St. 3. Russell, "Five-ring hollow-core photonic crystal fiber with 1.8 dB/km loss," Opt. Lett. 38, 2215-2217 (2013).
12. Kunimasa Saitoh and Masanori Koshiba, "Leakage loss and group velocity dispersion in air-core photonic bandgap fibers," Opt. Express 11, 3100-3109 (2003).
13. Ming-Jun Li, James A. West, and Karl W. Koch, "Modeling Effects of Structural Distortions on Air-Core Photonic Bandgap Fibers," J. Lightwave Technol. 25, 2463-2468 (2007).
14. F. Poletti, M. N. Petrovich, R. Amezcua-Correa, N. G. Broderick, T. M. Monro, and D. J. Richardson, "Advances and Limitations in the Modeling of Fabricated Photonic Bandgap Fibers," in *Optical Fiber Communication Conference and Exposition and The National Fiber Optic Engineers Conference*, Technical Digest (CD) (Optical Society of America, 2006), paper OFC2.
15. Kiarash Zamani Aghaie, Michel J. F. Digonnet, and Shanhui Fan, "Experimental Assessment of the Accuracy of an Advanced Photonic-Bandgap-Fiber Model," J. Lightwave Technol. 31, 1015-1022 (2013).
16. Francesco Poletti, "Hollow core fiber with an octave spanning bandgap," Opt. Lett. 35, 2837-2839 (2010).
17. F. Poletti, and E. Numkam Fokoua "Understanding the Physical Origin of Surface Modes and Practical Rules for their Suppression," accepted for oral presentation at ECOC 2013.
18. Tadashi Murao, Kunimasa Saitoh, and Masanori Koshiba, "Structural Optimization of Air-Guiding Photonic Bandgap Fibers for Realizing Ultimate Low Loss Waveguides," J. Lightwave Technol. 26, 1602-1612 (2008)

The invention claimed is:

1. A method of fabricating a hollow-core photonic-bandgap fiber, comprising the steps of:
providing a stack of capillaries, wherein the stack has a hollow core and comprises core capillaries at a boundary of the core which comprise a plurality of first core capillaries at respective corners of the core boundary and a plurality of second core capillaries intermediate respective ones of the first core capillaries at the core boundary;
applying pressure differentials between the core, the first core capillaries and the second core capillaries, wherein a pressure is applied to the first core capillaries separately of the second core capillaries, whereby a size of the first core capillaries can be controlled in relation to the second core capillaries; and
reducing the stack to a fiber, wherein the fiber has a hollow core and a cladding which surrounds the core at a core boundary and comprises a lattice or network of struts and interstitial nodes which together define an array of cavities;
wherein the pressure differentials provide that, in the finished fiber, a ratio between a difference in a length of a longest and shortest pitch spacing of the nodes at the core boundary to an average pitch spacing of the nodes at the core boundary is less than 0.3.

2. The method of claim 1, wherein the stack comprises cladding capillaries outwardly of the core capillaries, and a pressure is applied to the first core capillaries separately of the second core capillaries and the cladding capillaries.

3. The method of claim 1, wherein the stack comprises cladding capillaries outwardly of the core capillaries, and pressure is applied to the first core capillaries separately of the second core capillaries, the cladding capillaries and the core.

4. The method of claim 3, wherein a first pressure source is applied to the first core capillaries, a second pressure source is applied to the second core capillaries and the cladding capillaries, and a third pressure source is applied to the core.

5. The method of claim 1, wherein a greater pressure is applied to the second core capillaries than to the first core capillaries.

6. The method of claim 1, wherein a pressure differential of at least 0.1 kPa is applied between the second core capillaries and the first core capillaries.

7. The method of claim 6, wherein a pressure differential of at least 0.1 kPa and less than 2 kPa is applied between the second core capillaries and the first core capillaries.

* * * * *